United States Patent
Ito et al.

(10) Patent No.: US 8,986,882 B2
(45) Date of Patent: Mar. 24, 2015

(54) ELECTRODE, AND CURRENT COLLECTOR USED THEREFOR

(75) Inventors: Shuji Ito, Nara (JP); Yasutaka Kogetsu, Osaka (JP); Kazuya Iwamoto, Osaka (JP); Kazuyoshi Honda, Osaka (JP); Taisuke Yamamoto, Nara (JP); Yasuhiro Ueyama, Hyogo (JP); Keisuke Ohara, Osaka (JP); Hitoshi Katayama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 954 days.

(21) Appl. No.: 12/306,854

(22) PCT Filed: Dec. 26, 2007

(86) PCT No.: PCT/JP2007/074890
§ 371 (c)(1),
(2), (4) Date: Dec. 29, 2008

(87) PCT Pub. No.: WO2008/078755
PCT Pub. Date: Jul. 3, 2008

(65) Prior Publication Data
US 2009/0280407 A1    Nov. 12, 2009

(30) Foreign Application Priority Data

| Dec. 27, 2006 | (JP) | 2006-352768 |
| May 1, 2007 | (JP) | 2007-120768 |
| May 14, 2007 | (JP) | 2007-128460 |
| Jun. 13, 2007 | (JP) | 2007-156012 |
| Sep. 13, 2007 | (JP) | 2007-237715 |
| Sep. 28, 2007 | (JP) | 2007-253199 |

(51) Int. Cl.
*H01M 4/02* (2006.01)
*H01M 4/70* (2006.01)
(Continued)

(52) U.S. Cl.
CPC *H01M 4/70* (2013.01); *H01M 4/66* (2013.01); *H01M 4/662* (2013.01); *H01M 10/0525* (2013.01); *H01M 4/04* (2013.01); *Y02E 60/122* (2013.01); *Y02T 10/7011* (2013.01)
USPC .............................. 429/209; 427/58

(58) Field of Classification Search
USPC .............................. 429/209; 427/58
See application file for complete search history.

(56) References Cited

U.S. PATENT DOCUMENTS

| 5,949,637 A | 9/1999 | Iwaida et al. |
| 2005/0064291 A1 | 3/2005 | Sato et al. |

(Continued)

FOREIGN PATENT DOCUMENTS

| JP | 56-120074 | 9/1981 |
| JP | 04-188568 | 7/1992 |

(Continued)

OTHER PUBLICATIONS

English Translation of JP 2004-127561.*

(Continued)

*Primary Examiner* — Ula C Ruddock
*Assistant Examiner* — Frank Chernow
(74) *Attorney, Agent, or Firm* — McDermott Will & Emery LLP

(57) ABSTRACT

The present invention relates to a current collector including a base portion with a flat face, primary projections projecting from the flat face, and secondary projections projecting from the top of the primary projections. The present invention also relates to a current collector including a base portion with a flat face and primary projections projecting from the flat face, wherein the roughening rate of the top of the primary projections is 3 to 20. By using such a current collector, separation of the active material from the current collector can be inhibited when using an active material that has a high capacity but undergoes a large expansion at the time of lithium ion absorption.

35 Claims, 27 Drawing Sheets

(51) Int. Cl.
  *H01M 4/66* (2006.01)
  *H01M 10/0525* (2010.01)
  *H01M 4/04* (2006.01)

(56) References Cited

U.S. PATENT DOCUMENTS

| 2005/0118503 | A1 | 6/2005 | Honda et al. |
| 2006/0110662 | A1 | 5/2006 | Konishiike et al. |

FOREIGN PATENT DOCUMENTS

| JP | 10-284349 | 10/1998 |
| JP | 2002-079466 | 3/2002 |
| JP | 2002-313319 | 10/2002 |
| JP | 2004-127561 | 4/2004 |
| JP | 2004-127561 A | 4/2004 |
| JP | 2005-116509 | 4/2005 |
| JP | 2005-183364 | 7/2005 |
| JP | 2005-196970 | 7/2005 |
| JP | 2005-293899 | 10/2005 |
| JP | 2006-155958 | 6/2006 |
| JP | 2006-155959 | 6/2006 |
| JP | 2007-103197 | 4/2007 |
| WO | WO 01/31722 A1 | 5/2001 |
| WO | WO 2008-026595 A1 | 3/2008 |

OTHER PUBLICATIONS

European Search Report issued in European Patent Application No. EP 07860119.2 dated Dec. 8, 2010.

Japanese Office Action issued in Japanese Patent Application No. 2009-102162, mailed Aug. 19, 2010.

* cited by examiner

FIG. 14
(a)
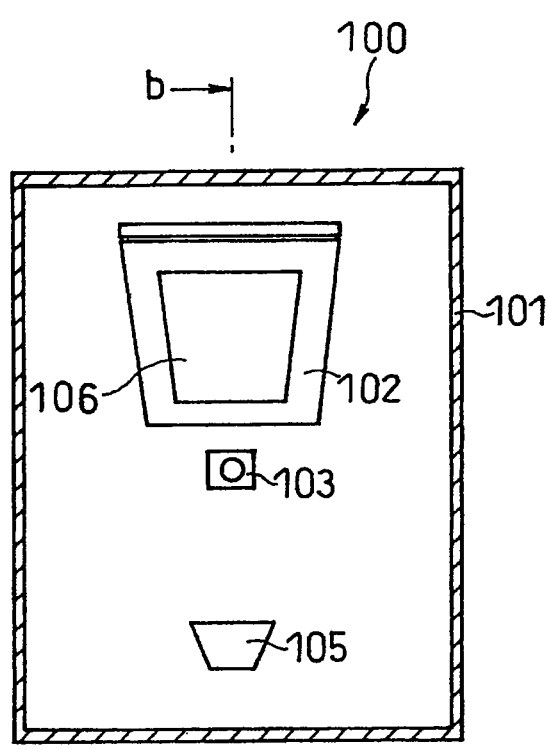
(b)
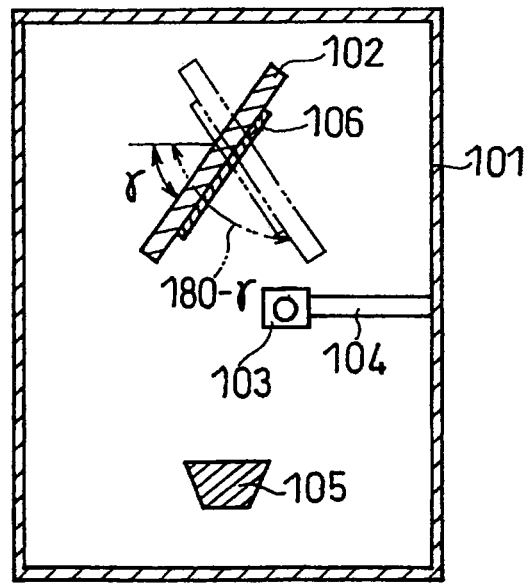

F I G. 3 1
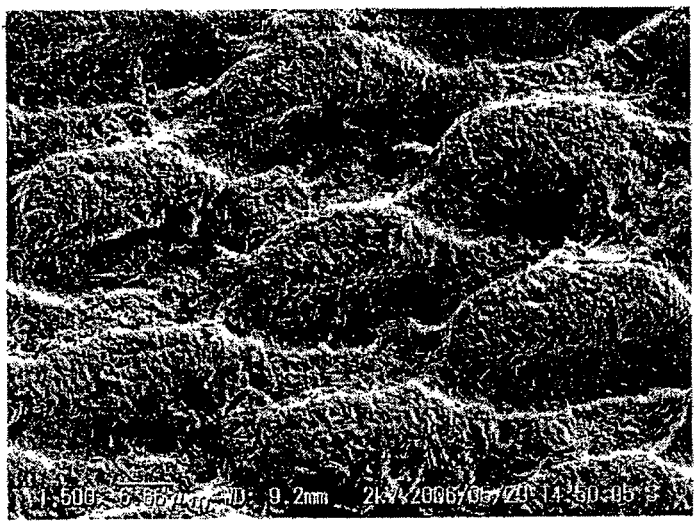
F I G. 3 2
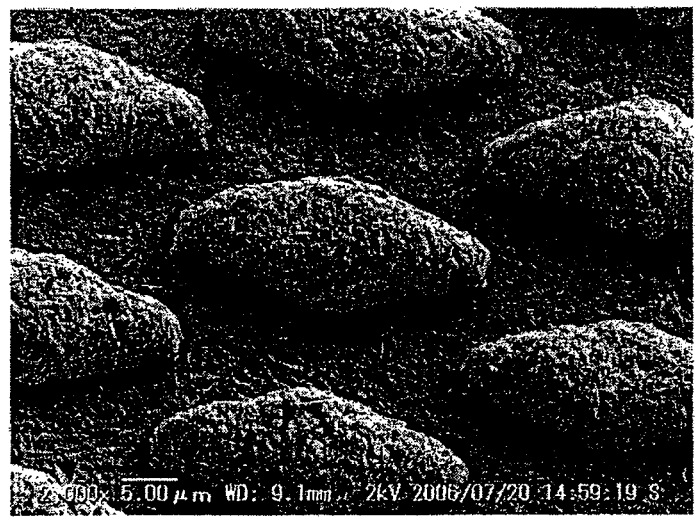

F I G. 3 5
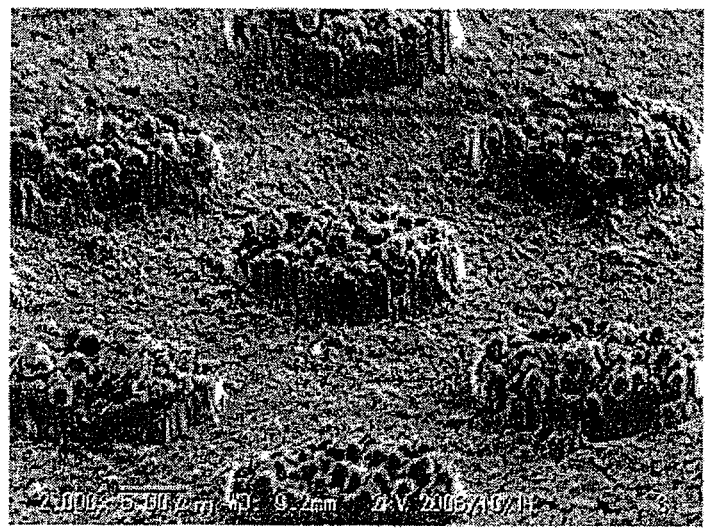

F I G. 4 0
(a) 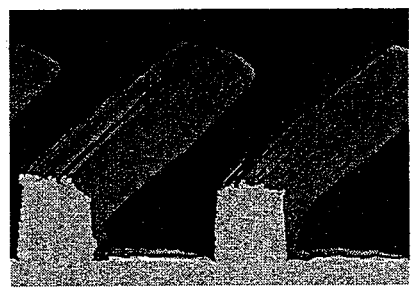
(b) 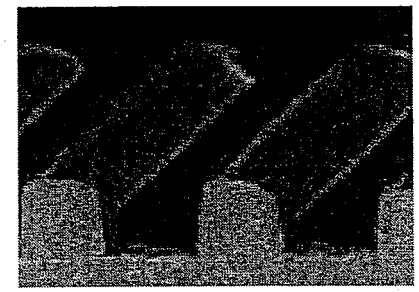

FIG. 41
(a)
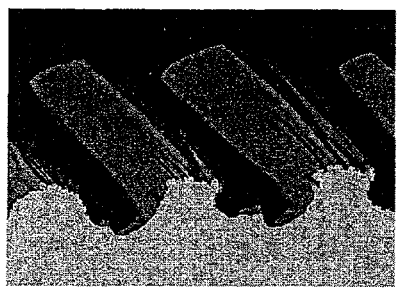
(b)
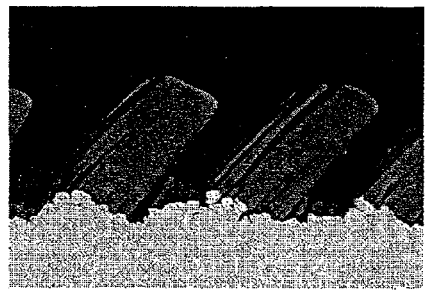
(c)
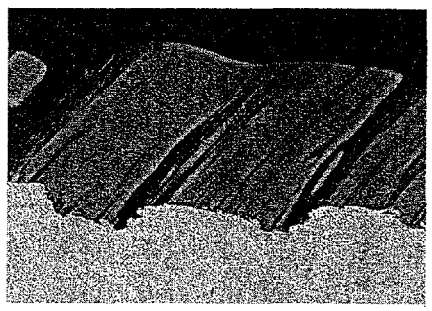
(d)
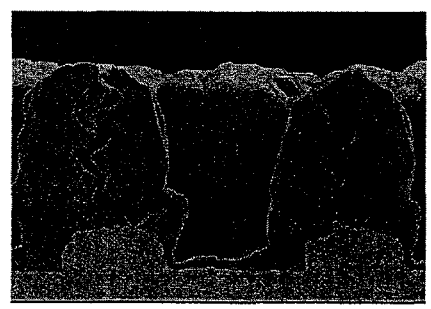
(e)
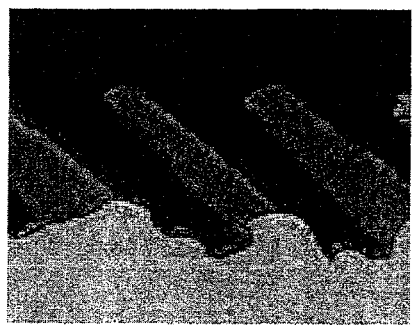

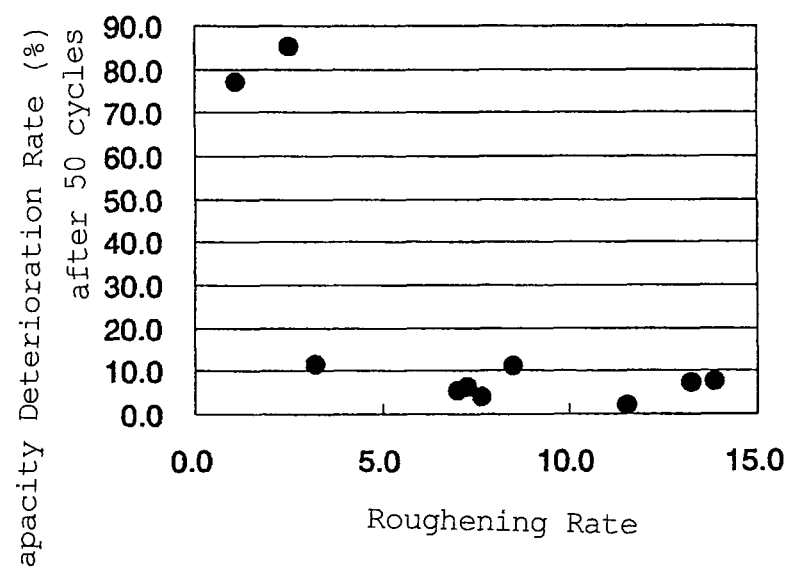
F I G. 4 2

US 8,986,882 B2

ELECTRODE, AND CURRENT COLLECTOR USED THEREFOR

RELATED APPLICATIONS

This application is the U.S. National Phase under 35 U.S.C. §371 of International Application No. PCT/JP2007/074890, filed on Dec. 26, 2007, which in turn claims the benefit of Japanese Application Nos. JP 2006-352768, filed on Dec. 27, 2006, JP 2007-120768, filed on May 1, 2007, JP 2007-128460, filed on May 14, 2007, JP 2007-156012, filed on Jun. 13, 2007, JP 2007-237715, filed on Sep. 13, 2007, and JP 2007-253199, filed on Sep. 28, 2007, the disclosures of which Applications are incorporated by reference herein.

TECHNICAL FIELD

The present invention relates to an electrode including a current collector and an active material carried on the current collector, and particularly relates to a current collector structure.

BACKGROUND ART

With recent development of portable devices such as a notebook personal computer and a mobile phone, there is an increasing demand for batteries used as a power source for those devices. The batteries used for these devices are required to have high energy density and excellent cycle performance. To meet these demands, new materials for the active materials of positive electrodes and negative electrodes have been developed. Particularly, for achieving high capacity non-aqueous electrolyte secondary batteries, materials containing Si element (Si-based materials) and materials containing Sn element (Sn-based materials) have been gaining attention as an electrode active material. For example, the theoretical discharge capacity of a Si simple substance is about 4199 mAh/g, which is about 11 times the theoretical discharge capacity of graphite.

However, the Si-based materials and the Sn-based materials undergo drastic structural change and expand when absorbing lithium ions. As a result, the active material particles crack, and the active material is separated from the current collector. This reduces electron conductivity between the active material and the current collector, thereby degrading battery performance such as cycle performance.

Therefore, compounds containing Si or Sn (for example, oxides, nitrides, and oxynitrides) have been proposed for use as the active material. The discharge capacities of these active materials are slightly lower than the discharge capacity of the simple substances, but expansion and contraction of the active material are decreased.

Easing the expansion stress at the time of lithium ion absorption by providing spaces between the active material particles in advance has also been proposed. For example, in Patent Document 1, forming an active material layer of columnar particles on a current collector in a predetermined pattern by, for example, a photoresist method and a plating method has been proposed. By forming the columnar active material, gaps are formed in the active material layer, which eases the expansion stress of the active material.

In Patent Document 2, forming an active material layer on a current collector with the surface roughness Ra of 0.01 μm or more to increase the contact area between the active material and the current collector has been proposed. By increasing the contact area between the active material and the current collector, the active material separation from the current collector can be inhibited.

Furthermore, negative electrode deformation is also a serious problem when using, for example, a Si-based material or a Sn-based material as the negative electrode active material. When such a negative electrode active material absorbs and desorbs lithium ions at the time of charging and discharging, a large stress is caused by the expansion and contraction of the negative electrode active material. Thus, the negative electrode is distorted, causing wrinkling on the current collector, and cutting of the current collector. This creates space between the negative electrode and the separator, which causes varied distance between the positive electrode and the negative electrode, leading to nonuniform charge and discharge reaction. As a result, a local property decline is caused in the battery.

To solve the above-described problem, for example, providing gaps in the active material layer has been proposed. For example, in Patent Document 3, forming gaps between the active material particles by depositing the active material particles on a current collector having an uneven surface has been proposed. In Patent Document 4, a negative electrode with secondary particles having gaps therebetween, formed by depositing the active material particles on the current collector such that primary particles aggregate to form the secondary particles has been proposed.

As described above, by providing gaps in the active material layer, the stress resulting from the active material expansion and contraction is eased, inhibiting distortion of the negative electrode. Thus, the current collector can be prevented from wrinkling, and the negative electrode active material can be prevented from being separated from the current collector; therefore, decline in battery capacity and cycle performance can be inhibited.

Patent Document 1: Japanese Laid-Open Patent Publication No. 2004-127561
Patent Document 2: WO 01/31722
Patent Document 3: Japanese Laid-Open Patent Publication No. 2002-313319
Patent Document 4: Japanese Laid-Open Patent Publication No. 2006-155958

DISCLOSURE OF THE INVENTION

Problem To be Solved by the Invention

When growing the columnar active material on the current collector, as shown in FIG. 1, it is effective to form projections on the current collector surface in view of easing the expansion stress at the time of lithium ion absorption. FIG. 1 is a cross-sectional view of a conventional current collector 10 in the direction perpendicular to a flat face 11a thereof. The current collector 10 includes a flat base portion 11, and a plurality of projections 12 are formed on the surface of the base portion 11. By depositing the active material on such a current collector from an oblique direction, the active material attaches to the projection 12 selectively owing to the shadow effect. Therefore, the active material grows in a columnar shape, forming an active material layer with gaps between the columnar particles.

However, when the projection are provided on the current collector surface and the active material is grown into a columnar shape, the bonding force between the current collector and the active material is reduced, causing the active material to be easily separated.

Furthermore, in Patent Documents 3 and 4, since the gaps between the active material particles are formed naturally in the manufacturing step of the negative electrode, the gap pattern is not controlled. Therefore, when silicon or tin which undergoes a very large degree of volume change involved with charge and discharge is used as the negative electrode active material, with the techniques disclosed in Patent Document 3 or 4, sufficient gaps cannot be secured in the active material layer. Therefore, the stress caused by the active material expansion and contraction cannot be eased sufficiently.

In the technique disclosed in Patent Document 1, since the active material particles are formed on the current collector with a regular pattern, the stress caused by the active material expansion and contraction can be eased compared with the cases in Patent Document 3 and Patent Document 4. However, the extremely large stress caused by the active material expansion and contraction cannot be eased sufficiently just by providing a regular gap between the active material particles.

As described above, with the conventional techniques, the extremely large stress caused at the interface between the current collector and the active material as a result of the active material expansion and contraction involved with charge and discharge reaction cannot be eased sufficiently. In this case, the negative electrode may deform, and the negative electrode active material may be separated from the current collector. Thus, the active material cannot be used effectively, resulting in a decreased battery capacity.

Thus, an object of the present invention is to inhibit the separation of the active material from the current collector, and/or deformation of the electrode, in the case when using an active material with high capacity but a high expansion rate upon lithium ion absorption, such as the Si-based material and the Sn-based material.

Means for Solving the Problem

The present invention relates to a current collector for an electrode including a base portion with a flat face, a plurality of primary projections projecting from the flat face, and a plurality of secondary projections projecting from the top of the primary projections. The primary projections are preferably disposed in a regular pattern on the base portion. The height and the diameter of the secondary projections are preferably smaller than the height and the diameter of the primary projections.

The height of the primary projections is preferably 3 to 15 μm.

The surface roughness $Rz_2$ of the top of the primary projections including the secondary projections is preferably 0.9 to 9 μm, and further preferably 1.5 to 7 μm. It is preferably 1.3 times or more, or 5 times or more the surface roughness $Rz_0$ of the flat face of the base portion.

The diameter of the primary projections is preferably 1.3 times or more, or 2 times or more the diameter of the secondary projections.

The maximum diameter of the secondary projections is preferably larger than the root diameter of the secondary projections.

The secondary projections may include a plurality of particulate precipitates.

The particulate precipitates may be formed in a plurality of layers in the direction normal to the current collector.

In another preferable embodiment of the present invention, the current collector includes a base portion with a flat face and a plurality of primary projections projecting from the flat face, wherein the roughening rate of the top of the primary projections is or more and 20 or less. The primary projections are preferably arranged regularly. The roughening rate of the flat face of the base portion is also preferably 3 or more and 20 or less.

In a current collector of the present invention, the plurality of primary projections are preferably disposed, at intersection points of a plurality of first virtual straight lines disposed parallel to one another with a first pitch in the flat face, and a plurality of second virtual straight lines disposed perpendicular to the first virtual straight lines with a second pitch that is smaller than the first pitch in the flat face; and at the center of a rectangle formed by two adjacent first virtual straight lines and two adjacent second virtual straight lines.

The base portion is long, and either one of the first virtual straight lines and the second virtual straight lines are further preferably parallel to the longitudinal direction of the long base portion. The first virtual straight lines are particularly preferably parallel to the longitudinal direction of the base portion.

The maximum diameter of the primary projection in the width direction of the base portion is further preferably ½ or more of the first pitch.

The present invention relates to an electrode including the above-described current collector for an electrode, and an active material layer carried on the current collector. The present invention further relates to a battery including the above-described electrode, its counter electrode, and an electrolyte.

The active material layer preferably includes a plurality of columnar particles.

The columnar particles are preferably tilted with respect to the direction normal to the current collector.

The columnar particles preferably include a stack of a plurality of grain layers that are tilted with respect to the direction normal to the current collector.

The columnar particles are preferably bonded to the top of the primary projections.

The active material layer preferably includes a material including silicon element. The material including the silicon element preferably includes at least one selected from the group consisting of a silicon simple substance, a silicon alloy, a compound containing silicon and oxygen, and a compound containing silicon and nitrogen.

In the active material layer, gaps are preferably present between the columnar particles.

In another preferable embodiment of the present invention, the columnar particles include voids therein. At this time, the surface roughness $Rz_2$ of the top of the primary projections including secondary projections is preferably 1 to 7 μm. The voids are preferably present at the interface between the projections provided on the current collector and the columnar particles. The porosity of the active material layer is preferably 10% or more and below 70%.

The present invention relates to a method for producing a current collector for an electrode, the method including the steps of:

(i) preparing a sheet substrate including a base portion with a flat face, and primary projections projecting from the flat face, and (ii) forming secondary projections on the top of the primary projections.

Step (i) of preparing the sheet substrate includes, for example, a step of forming a mask of a resist with openings in a regular pattern on the surface of a sheet material, and then plating the surface of the sheet material. Or, step (i) includes a step passing a sheet material between a pair of rollers on each of which recessed portions are disposed in a regular pattern.

Step (ii) of forming secondary projections includes, for example, step (a1) of carrying out plating at a first current density equal or higher than a limiting current density, and step (b1) of carrying out plating at a second current density equal or lower than a limiting current density (first current density>second current density).

Step (a1) preferably includes a step of forming a particulate precipitate on the top of the primary projections by carrying out cathode electrolysis in a first plating solution including copper ions at a concentration of 10 to 30 g/L and sulfuric acid at a concentration of 50 to 150 g/L, at a solution temperature of 25±5° C. and a current density of 8 to 30 A/dm$^2$.

Step (b1) preferably includes a step of forming a coating on the surface of the particulate precipitate by carrying out cathode electrolysis in a second plating solution including copper ions at a concentration of 45 to 100 g/L and sulfuric acid at a concentration of 50 to 150 g/L, at a solution temperature of 50±5° C. and a current density of 1 to 8 A/dm$^2$.

Step (ii) of forming the secondary projections may include step (a2) of carrying out plating at a first constant potential, and step (b2) of carrying out plating at a second constant potential (second constant potential>first constant potential). At this time, after a plating solution is used in step (a2), the plating solution may be used in step (b2).

Step (a2) preferably includes a step of forming a particulate precipitate on top of the primary projections by carrying out cathode constant potential electrolysis in a plating solution including copper ions at a concentration of 45 to 100 g/L and sulfuric acid at a concentration of 50 to 150 g/L, at a solution temperature of 50±5° C. and a potential of −2000 to −1700 mV (vs.Cu).

Step (b2) preferably includes a step of forming a coating on the surface of the particulate precipitate by carrying out cathode constant potential electrolysis in the plating solution used in step (a) at a solution temperature of 50±5° C. and a potential of −750 to −650 mV (vs.Cu).

The present invention relates to a method for producing a current collector for an electrode, including the steps of (a) preparing a sheet material with the surface roughness Rz$_2$ of 0.9 to 9 μm, or 1.5 to 7 μm, and (b) forming projections including projected portions on the top thereof, and a flat face by pressing the sheet material with a roller on which recessed portions with a diameter larger than projected portions on the surface of the sheet material are disposed.

The present invention relates to a method for producing an electrode, the method including the steps of: (a) preparing a sheet material with the surface roughness Rz$_2$ of 0.9 to 9 μm, or 1.5 to 7 μm, (b) forming projections including projected portions on the top thereof, and a flat face by pressing the sheet material with a roller on which recessed portions with a diameter larger than projected portions on the surface of the sheet material are disposed, and (c) allowing columnar particles that are tilted with respect to the direction normal to the current collector to grow on the top of the projections.

Step (ii) of forming the secondary projections can also be carried out by blasting. That is, step (ii) of forming the secondary projections can include a step of causing micropowder to collide with the surface of the substrate with a predetermined air pressure (for example, 0.1 to 1 MPa).

As an example of blasting, wet blasting is preferable. The wet blasting includes a step of causing micropowder and water to collide with the surface of the substrate at a predetermined air pressure.

The speed of the blasting treatment is, for example, preferably 0.1 to 10 m/min. In this case, for example, micropowder is collided with the substrate from a fixed nozzle while moving the substrate at a speed of 0.1 to 10 m/min.

Step (ii) of forming the secondary projections may include a step of bringing the substrate into contact with an etching solution. This step includes, for example, a step of immersing the substrate in an etching solution, or a step of spraying an etching solution onto the substrate. The etching solution preferably includes divalent copper ions, and the substrate preferably includes copper or a copper alloy.

Effect of the Invention

By using a current collector of the present invention, the bonding area between the active material and the current collector becomes large. Therefore, bonding between the active material and the current collector becomes strong, and the active material separation from the current collector due to the expansion stress of the active material at the time of Li absorption is inhibited. Therefore, by using an electrode of the present invention, a highly reliable battery having a high capacity and excellent cycle performance can be obtained. The present invention is suitable particularly when using a high capacity active material (for example, a material containing Si element (Si-based material), and a material containing Sn element (Sn-based material)).

Furthermore, with the active material layer containing a plurality of columnar particles and the voids provided in the columnar particles, the stress resulting from active material expansion and contraction is sufficiently eased. Thus, the negative electrode deformation can be inhibited. Therefore, even in the case of using the active material that undergoes large volume change at the time of charge and discharge, a battery electrode more excellent in cycle performance can be provided. Furthermore, when the above-described gaps are present at the interface between the columnar particles and the projections of the current collector, the stress at the interface between the current collector and the active material can be eased more sufficiently, further inhibiting the separation of the active material from the current collector. Therefore, cycle performance can be further improved.

BRIEF DESCRIPTION OF THE DRAWINGS

FIG. 14 is a schematic diagram illustrating another example of a deposition apparatus for allowing the current collector to carry an active material.

FIG. 31 is an electron micrograph showing a top oblique view of a current collector in Example 1-3.

FIG. 32 is an electron micrograph showing a top oblique view of a current collector in Example 1-4.

FIG. 35 is an electron micrograph showing a top oblique view of a current collector in Example 1-7.

FIG. 40 shows (a) an electron micrograph showing a cross-sectional view of a negative electrode made in Example 2-1, and (b) an electron micrograph showing a cross-sectional view of a negative electrode in Comparative Example 2-1.

FIG. 41 shows (a) an electron micrograph showing a cross-sectional view of a negative electrode made in Example 2-2, (b) an electron micrograph showing a cross-sectional view of a negative electrode made in Example 2-3, (c) an electron micrograph showing a cross-sectional view of a negative electrode made in Example 2-4, (d) an electron micrograph showing a cross-sectional view of a negative electrode made in Example 2-5, and (e) an electron micrograph showing a cross-sectional view of a negative electrode made in Comparative Example 2-2.

FIG. 42 is a graph illustrating relationships between the roughening rate and the capacity deterioration rate after 50 cycles.

BEST MODE FOR CARRYING OUT THE INVENTION

Figure 1:
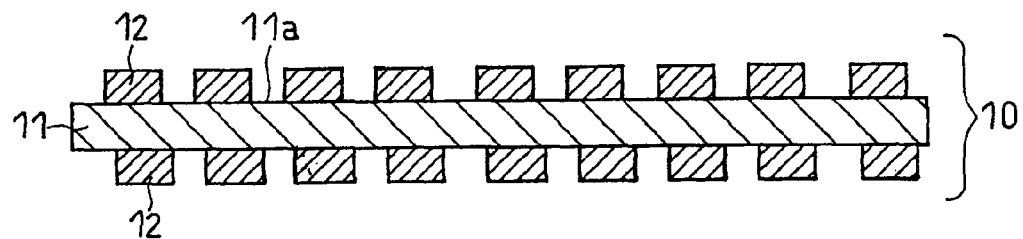
FIG. 1 is a schematic diagram illustrating a cross sectional view of a conventional current collector in the direction perpendicular to a flat face thereof.

In the following, embodiments of the present invention are described with reference to the drawings. But the present invention is not limited to the embodiments as described below.

(Embodiment 1)

A current collector for an electrode of the present invention includes a base portion having a flat face, a plurality of primary projections projecting from the flat face, and a plurality of secondary projections projecting from the top of the primary projections. The base portion is integrated with the primary projections.

The base portion and the primary projections are formed simultaneously by, for example, deforming a sheet material (for example, a metal sheet). Also, a metal may also be deposited on the surface of a sheet material serving as the base portion, thereby forming the primary projections of the deposited metal.

The secondary projections may be formed by any methods, including, for example, blasting, electrodeposition, plating, and etching.

When the base portion and the primary projections are formed simultaneously by deforming a metal sheet, the primary projections can be obtained by, for example, pressing the metal sheet with a roller having recessed portions disposed with a regular pattern on the surface thereof.

When the primary projections are formed by depositing a metal on the surface of a metal sheet serving as the base portion, the primary projections may be formed by, for example, a resist method and plating.

The shape of the primary projections is, for example, a columnar shape (cylindrical or prism), without limitation. The shape of a transverse cross-section of the primary projections may be rectangle, polygon, circle, or oval, without limitation. Diameter D of the primary projections may vary depending on the part of the primary projections. The top of the primary projections may be flat, uneven, or curved. The growth of the columnar particles forming the active material layer starts at the top of the primary projections.

Height h and diameter d of the secondary projections are preferably smaller than height H and diameter D of the primary projections. The secondary projections having a height and a diameter smaller than those of the primary projections have functions of improving adhesion between the primary projections and the active material. Therefore, separation of the active material from the current collector is inhibited when the active material repeats expansion and contraction.

Height H of primary projections is a vertical distance from the flat face of the base portion to the top of the primary projections, and height h of the secondary projections is a vertical distance from the top of the primary projections to the top of the secondary projections. When the top is not flat, the highest point from the flat face of the base portion is regarded as the top.

When the secondary projections are formed by partially removing the primary projections by blasting or etching, the top of the primary projections before carrying out blasting or etching is regarded as the top of the secondary projections, and the lowest point of the portions subjected to the removal is regarded as the top of the primary projections.

Diameter D of the primary projections is the maximum diameter at the ½ height of the primary projections parallel to the flat face of the base portion, and diameter d of the secondary projections is the maximum diameter at the ½ height of the secondary projections parallel to the flat face of the base portion. The ½ height is a midpoint of the vertical distance from the flat face of the base portion to the top of the primary projections, or a midpoint of the vertical distance from the top of the primary projections to the top of the secondary projections.

Figure 2A:
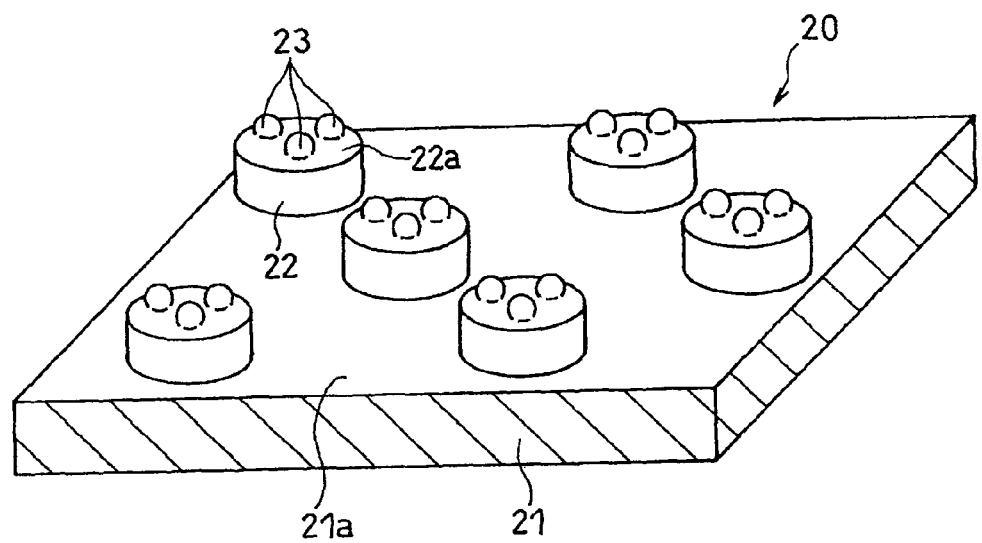
FIG. 2A is a perspective view schematically illustrating an example of a current collector of the present invention.
Figure 2B:
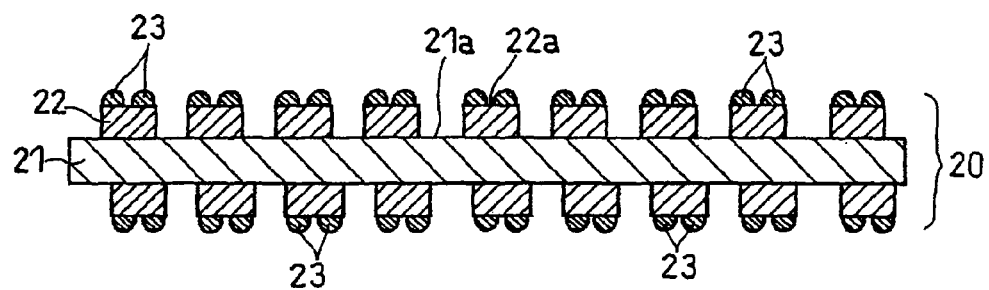
FIG. 2B is a schematic diagram illustrating a cross sectional view of an example of a current collector of the present invention in the direction perpendicular to a flat face thereof.

FIG. 2A is a perspective view schematically illustrating an example of a current collector of the present invention, and FIG. 2B is a cross-sectional view of an example of a current collector of the present invention in the direction perpendicular to the flat face thereof. In FIG. 2A and FIG. 2B, a current collector 20 includes a base portion 21 having a flat face 21a, a plurality of primary projections 22 projecting from the flat face 21a, and a plurality of second projections 23 projecting from a top 22a of the primary projections 22. The primary projections 22 are disposed on the base portion 21 with a regular pattern. On the top 22a of a single primary projection 22, a plurality of secondary projections 23 having a height and a diameter smaller than those of the primary projections are formed.

Height H of the primary projections may be 30 μm or less, preferably 3 to 20 μm, further preferably 3 to 15 μm, and particularly preferably 6 to 12 μm. With a height of the primary projections of 3 μm or more, sufficient gaps can be formed easily in the active material layer by using the shadow effect (a phenomenon in which the active material is not deposited on the portion of the current collector blocked by the primary projections). By setting the height of the primary projections to 20 μm or less, the volume ratio of the current collector in the electrode can be decreased, and therefore a high energy density electrode can be obtained easily. Also, with a height of 3 to 20 μm, the strength of the primary projections can be kept high. Furthermore, the primary projections with a height of 3 to 20 μm can be formed easily.

Diameter (maximum width) D of the primary projections is preferably 2 to 200 μm, and preferably 50 μm or less, and particularly preferably 1 to 35 μm. The primary projections with a diameter of 2 μm or more is preferable in that the deformation of the primary projections at the time of charge and discharge can be inhibited. Furthermore, the primary projections with a diameter of 200 μm or less is preferable in that the deformation of the electrode plate at the time of charge and discharge can be inhibited further efficiently.

The primary projections are preferably disposed in a regular pattern. For example, as is described in the following, a plurality of primary projections may be disposed at intersection points of a plurality of first virtual straight lines disposed parallel to one another with first pitch $S_1$ in the flat face of the base portion, and a plurality of second virtual straight lines disposed perpendicular to the first virtual straight lines with second pitch $S_2$ that is smaller than first pitch $S_1$ in the flat face; and at the center of a rectangle formed by two adjacent first virtual straight lines and two adjacent second virtual straight lines. In this case, pitch (pitch) S between a primary projection disposed at a predetermined intersection point of a first virtual straight line and a second virtual straight line and another primary projection disposed at the center of the above-described rectangle including the intersection point and at the nearest to the primary projection disposed at the intersection point is preferably 3 to 100 μm, further preferably 10 to 100 μm, still further preferably 20 to 80 μm, and particularly preferably 40 to 80 μm. Herein, pitch refers to the center-to-center distance between the primary projections, and the center of the primary projection refers to the center point of the maximum diameter of the primary projection.

The surface roughness of the current collector is described. In the present invention, the surface roughness refers to either the ten-point average roughness Rz or the arithmetic average roughness Ra.

The ten-point average roughness Rz and the arithmetic average roughness Ra can be determined in accordance with on JIS B 0601-1994.

The surface roughness (ten-point average height) $Rz_2$ of the top of the primary projections including the secondary projections is preferably 0.9 to 9 μm, and further preferably 1.5 to 7 μm. By setting $Rz_2$ to 0.9 μm or more, bonding strength between the active material and the top of the primary projections can be increased. By setting $Rz_2$ to 9 μm or less, the volume ratio of the current collector in the electrode can be decreased, and therefore a high energy density electrode can be obtained easily.

The surface roughness Ra of the top of the primary projections including the secondary projections is preferably 0.3 to 5 μm. By setting Ra to 0.3 μm or more, the bonding strength between the active material and the top of the primary projections can be increased even further. By setting Ra to 5 μm or less, the volume ratio of the current collector in the electrode can be decreased, and therefore a high energy density electrode can be obtained easily.

Diameter d of the secondary projections is preferably 0.3 to 10 μm, and further preferably 0.5 to 5 μm. By setting diameter d to 0.3 μm or more, the bonding strength between the active material and the current collector can be increased even further. On the other hand, with diameter d of 10 μm or less, separation of the active material layer from the current collector at the time of charge and discharge can be inhibited more efficiently.

Average projection pitch s of the secondary projections is preferably 0.5 to 6 μm. Average projection pitch s of the secondary projections is the center-to-center distance of adjacent secondary projections, and the center of a secondary projection refers to the center point of the maximum diameter of the secondary projection. Average projection pitch s can be determined by measuring the pitches between ten pairs of the secondary projections, and calculating their average.

The ratio of height H of the primary projections to height h of the secondary projections: H/h, is preferably 1.3 to 10, and further preferably 2 to 10. When H/h is too large, it may become difficult to sufficiently increase the bonding strength between the active material and the top of the primary projections. When H/h is too small, it may take a long time to form the secondary projections.

The ratio of diameter D of the primary projections to diameter d of the secondary projections: D/d is preferably 1.3 to 50, and further preferably 2 to 20. By setting D/d to 1.3 or more, a plurality of the secondary projections can be easily disposed on the top of the primary projections. Accordingly, there will be a large number of bonding points between the active material and the secondary projections, making it easy to increase the bonding strength between the active material and the current collector. When D/d is too small, it may become difficult to dispose a plurality of the secondary projections on the top of the primary projections. When D/d is too large, the bonding strength between the active material and the top of the primary projections may not be increased sufficiently.

The surface roughness $Rz_2$ of the top of the primary projections including the secondary projections is preferably 1.3 times or more, further preferably 5 times or more, and still further preferably 10 times or more the surface roughness $Rz_0$ of the flat face of the base portion. By setting $Rz_2$ to 1.3 times or more $Rz_0$, the bonding strength between the active material and the top of the primary projections can be increased, and generation of bubbles in the active material layer when injecting the liquid electrolyte can be decreased. When $Rz_0$ approaches $Rz_2$, the base portion adsorbs a large amount of gas, and therefore the liquid electrolyte may fail to cover the surface of the whole electrode quickly. Accordingly, the injection tends to take a long time.

Figure 3A:
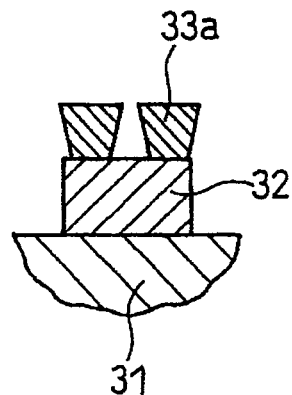
FIG. 3A is a cross-sectional view of a current collector in the direction perpendicular to a flat face thereof schematically illustrating an example of a shape of secondary projections.
Figure 3B:
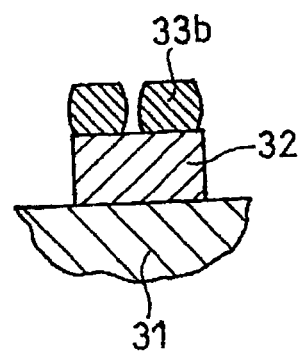
FIG. 3B is a cross-sectional view of a current collector in the direction perpendicular to a flat face thereof schematically illustrating an example of a shape of the secondary projections.
Figure 3C:
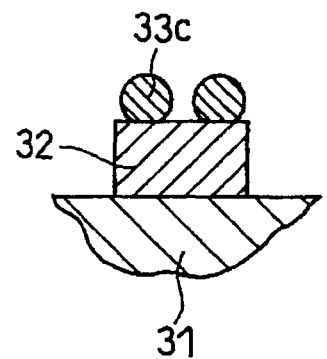
FIG. 3C is a cross-sectional view of a current collector in the direction perpendicular to a flat face thereof schematically illustrating an example of a shape of the secondary projections.

The maximum diameter of the secondary projections is preferably larger than the diameter of the root of the secondary projections. FIG. 3A to FIG. 3C are cross-sectional views of a current collector, taken in a direction perpendicular to a flat face thereof, schematically illustrating examples of a shape of the secondary projections. Secondary projections 33a in FIG. 3A have a shape of inverted truncated cone. In this case, the diameter is minimum at the bonding portion (the root of the secondary projections 33a) between the primary projections 32 on the base portion 31 and the secondary projections 33a, and maximum at the top of the secondary projections 33a. Secondary projections 33b in FIG. 3B were the shape of a barrel. Secondary projections 33c in FIG. 3C are substantially spherical. The shape of the secondary projections is not limited to these shapes.

Since the maximum diameter of the secondary projections is larger than the root diameter of the secondary projections, the secondary projections bite into the active material, which significantly improve the mechanical strength at the bonding interface between the active material and the current collector, and in the proximity of the interface. As the method for forming the secondary projections with maximum diameters larger than their root diameters, electrodeposition or plating using copper particles, for example, is effective.

The secondary projections may include a plurality of particulate precipitates. In this case, a plurality of layers of the particulate precipitate may be formed in the direction of normal to the current collector. Forming a plurality of layers of the particulate precipitate in the direction of normal to the current collector is preferable in that it makes the surface roughness high.

The secondary projections may be formed not only on the top of the primary projections, but also on a side face portion and on the flat face between the primary projections. By forming the secondary projections on the side face portion and on the flat face between the primary projections, the adhesion between the active material and the current collector becomes more strong.

The primary projections with the secondary projections on the top thereof may not necessarily be disposed on the entire surface of the current collector. The arrangement of the primary projections with the secondary projections on the top thereof is dependent on the battery design and circumstances in the production steps. Therefore, the primary projections with the secondary projections on the top thereof may be disposed only at a portion of the current collector.

The base portion, the primary projections, and the secondary projections may be formed of the same material, or may be formed of different materials. The base portion, the primary projections, and the secondary projections are each preferably formed of metal such as copper, titanium, nickel, and stainless steel. For example, when the base portion includes copper, rolled copper foil, rolled copper alloy foil, electrolytic copper foil, and electrolytic copper alloy foil may be used for the base portion. The copper alloy foil is particularly preferable. In another preferable example, a sheet metal foil is used for the base portion, and the primary projections are formed by partially deforming the metal foil.

In general, the thickness of the current collector is, for example, 1 to 50 μm, without limitation. Particularly, in view of retaining the electrode strength and securing the electrode volume energy density, the thickness of the current collector is preferably 10 to 50 μm, and particularly preferably 15 to 40 μm. The thickness of the current collector is preferably in such ranges, also in view of easy handleability. When the projections are provided on both sides of the current collector, the thickness of the current collector is the distance from the top of the secondary projections on one side of the current collector to the top of the secondary projections of the other side of the current collector. When the projections are included only at one side of the current collector, the thickness is the distance from the top of the secondary projections provided on one side of the current collector to the other side of the current collector.

In the above-described, a description is given for a produced current collector. That is, a description is given for a current collector on which the active material layer is formed. For example, as described in the following, when the secondary projections are made by plating, various sizes of the current collector after fixing the secondary projections by a thin film should fall into the above-described ranges.

Figure 4:
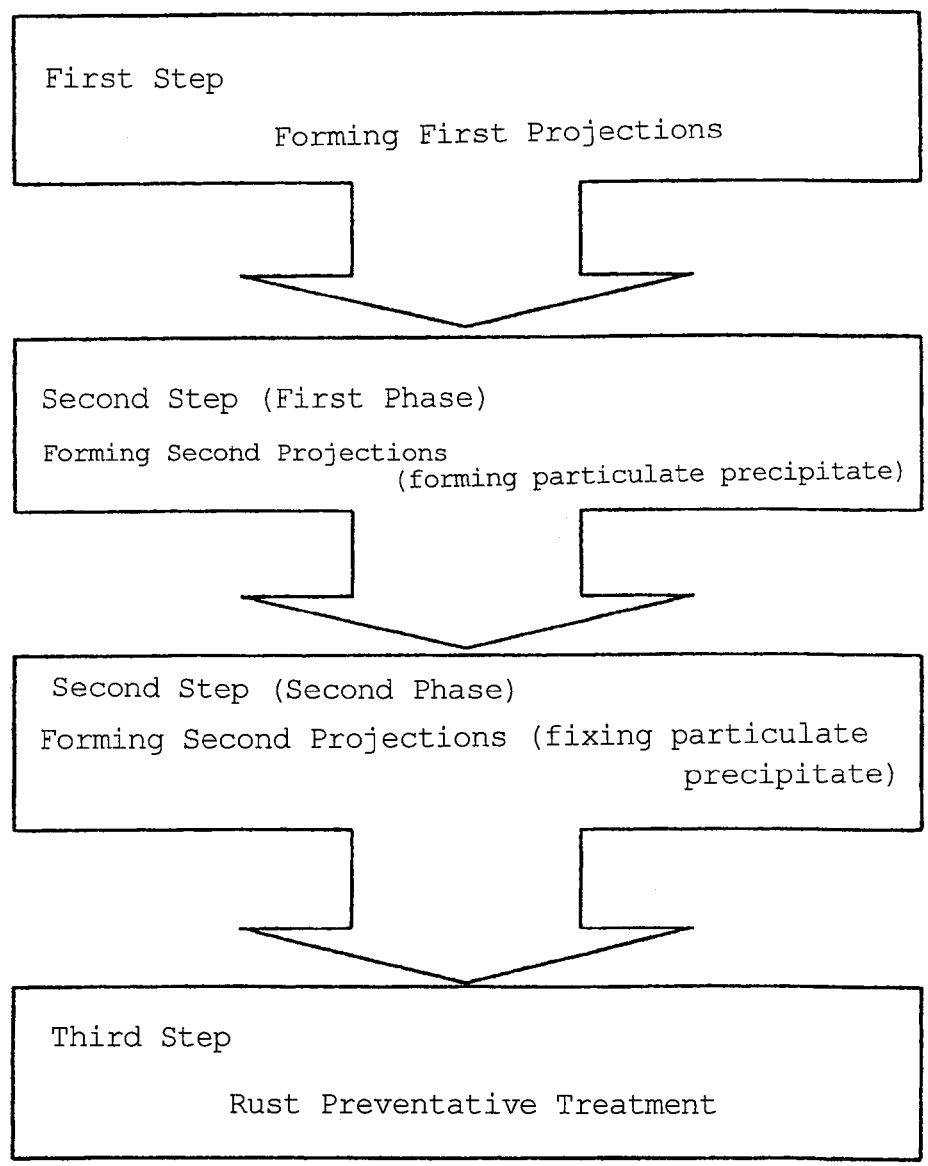
FIG. 4 is a flowchart illustrating steps for producing a current collector of the present invention.

Next, an example of a method for producing a current collector for electrodes of the present invention is described, but the production method is not limited to the following. A current collector for electrodes of the present invention can be made by the following method. In the following, a description is given with reference to FIG. 4 and FIG. 5. FIG. 4 is a flow chart illustrating steps for producing a current collector of the present invention.

Figure 5:
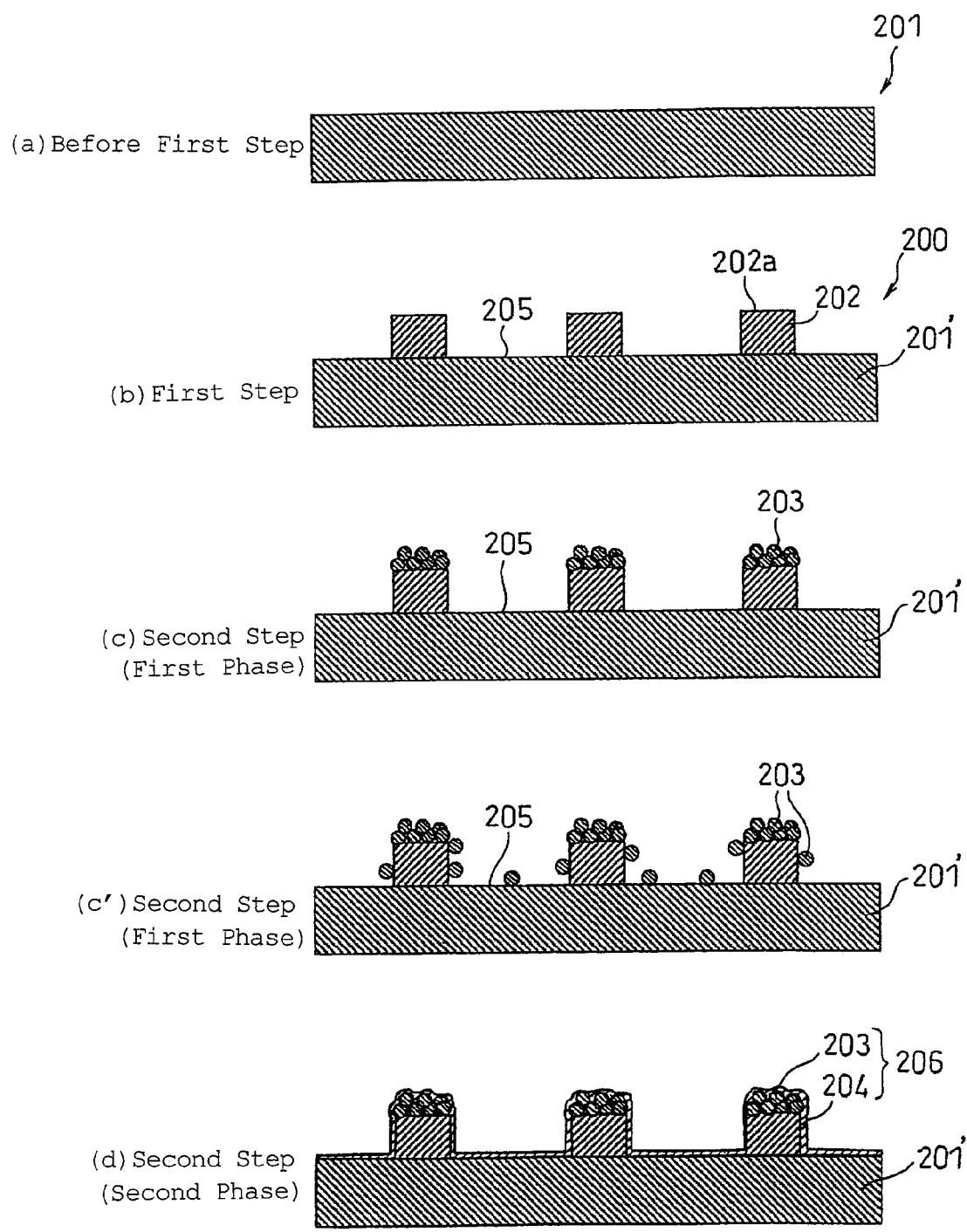
FIG. 5 is a schematic diagram illustrating an embodiment of steps for producing a current collector of the present invention.

FIG. 5 is a schematic diagram illustrating an example of steps for producing a current collector of the present invention.

First Step (Formation of Primary Projection)

A sheet substrate including a base portion with a flat face and primary projections projecting from the flat face is formed. As a starting material, a sheet material 201 shown in FIG. 5(a) is used. Examples of the method for forming the primary projections include plating and roll-pressing.

In plating, for example, a mask of a resist having regularly patterned openings is formed on the surface of the sheet material 201. Then, the surface of the sheet material 201 is plated, and primary projections 202 are formed. Afterwards, by removing the resist, a sheet substrate 200 shown in FIG. 5(b) is obtained. The sheet substrate 200 includes a base portion 201' with a flat face 205, and the primary projections 202 projecting from the flat face 205.

The plating includes electroplating and electroless plating. In electroless plating, a metal coating is formed also on a non-metal mask. This metal coating becomes an inhibiting factor when removing the resist, and tends to cause resist residues. Therefore, electroplating is preferable in that a metal coating is not formed on the mask.

In roll-pressing, the primary projections 202 are formed by mechanically processing and plastically deforming the sheet material 201 using a roller with recessed portions (or grooves) formed on the surface thereof. For example, the sheet material 201 is passed between a pair of rollers on each of which regularly patterned recessed portions are disposed. In this case, the primary projections 202 can be provided on both sides of the base portion 201'.

The line pressure in roll-pressing is preferably 0.5 to 5 t/cm. With a line pressure of below 0.5 t/cm, formation of primary projections 202 having a clearly defined shape on the surface of the sheet material 201 tends to be difficult. On the other hand, with a line pressure of more than 5 t/cm, breakage of the sheet material may occur.

The sheet material 201 is preferably made of, for example, a material that does not electrochemically react with lithium, and copper, nickel, iron, or an alloy containing these as a main component. Particularly, copper or a copper alloy is preferable in that it can be handled easily and it is a low-cost. Moreover, using copper or a copper alloy facilitates formation of the primary projection 202 or the secondary projections 206 with copper plating. Particularly, electrolytic copper foil, electrolytic copper alloy foil, rolled copper foil and the like may be preferably used as the sheet material.

For the copper alloy, for example, a precipitation hardened alloy or a composite alloy thereof may be used. Examples of metal other than copper contained in the precipitation hardened copper alloy include zinc, tin, silver, chromium, tellurium, titanium, beryllium, zirconia, iron, phosphorus, and aluminum. One of these metals may be included in the copper alloy singly, or two or more of these metals may be included in the copper alloy. The amount of metal other than copper contained in the copper alloy is preferably 0.01 wt % to 10 wt %.

Second Step (Formation of Secondary Projection)

Next, secondary projections projecting from the top of the primary projections are formed. Examples of the method for forming the secondary projections include plating, blasting, and etching.

When the secondary projections are formed by plating, the step of forming the secondary projections is preferably carried out in two phases. Examples of plating include, cathode constant current electrolysis and cathode constant potential electrolysis, without limitation.

A description of the case where cathode constant current electrolysis is carried out is given.

In the first phase, as shown in FIG. 5(c), a particulate precipitate 203 is allowed to precipitate on a top 202a of the primary projections 202. In view of allowing a metal to precipitate in particulate shape efficiently, plating in the first phase is preferably carried out at a first current density that is in the proximity of the limiting current density or not less than the limiting current density.

In view of minimizing burden on production facilities, the limiting current density is preferably reached at as low a current value as possible. To this end, it is effective to set the metal ion concentration in the plating solution low to accelerate the concentration polarization. Additionally, it is effective to set the temperature of the plating solution to low, to lower the speed of the precipitation reaction of metal.

The limiting current density is the maximum current density value where ion supply by diffusion reaches the limit and the current density no longer increases even if the voltage is increased. When the current density exceeds the limiting current density, hydrogen generation occur simultaneously with metal precipitation.

When, for example, the particulate precipitate 203 containing copper is formed in the first phase, cathode electrolysis is preferably carried out in a first plating solution containing copper ions at a concentration of 10 to 30 g/L and sulfuric acid at a concentration of 50 to 150 g/L, at a solution temperature of 25±5° C. and a current density of 8 to 30 A/dm$^2$ (preferably 9 to 25 A/dm$^2$).

As shown in FIG. 5(c'), the particulate precipitate 203 may be formed locations other than the top 202a of the primary projections 202, including for example, on the side face of the primary projections 202 and on the surface of the base portion 201'.

In a second phase, as shown in FIG. 5(d), the particulate precipitate 203 is fixed by forming a coating (cover plating layer) 204 on the surface of the particulate precipitate 203, thereby completing the secondary projections 206. The coating 204 serves to reinforce the bonding between the particulate precipitate 203, and the bonding between the primary projections 202 and the secondary projections 206.

In the second phase, plating is carried out at a second current density that is not more than the limiting current density, so as not to produce the particulate precipitate. Therefore, a second plating solution containing metal ions in a higher concentration than that of the first plating solution used in the first phase is preferably used, so that concentration polarization tends not to occur. Also, the temperature of the plating solution is preferably set high to increase the precipitate reaction rate.

When, for example, the coating 204 containing copper is formed in the second phase, cathode electrolysis is preferably carried out in a second plating solution containing copper ion at a concentration of 45 to 100 g/L and sulfuric acid at a concentration of 50 to 150 g/L, at a solution temperature of 50±5° C. and a current density of 1 to 8 A/dm$^2$ (preferably 3 to 6 A/dm$^2$).

The coating 204 may be formed not only on the surface of the particulate precipitate 203, but also on the side face of the primary projections 202 and the surface of the base portion 201'.

A description of the case where cathode constant potential electrolysis is carried out is given.

Depending on the effect of the shape of the primary projections, the electric current distribution may vary, sometimes making control over the shape of the secondary projections difficult. By carrying out cathode constant potential electrolysis, nonuniform electric current distribution can be curbed, which facilitates the control of the shape of the secondary projections.

When carrying out cathode constant potential electrolysis, in view of curbing rate limitation by copper ion diffusion, a plating solution containing copper ions in a high concentration is preferably used.

In the first phase, as shown in FIG. 5(c), the particulate precipitate 203 is precipitated on the top 202a of the primary projections 202. In view of controlling the particle size of the secondary projections, and improving the controllability of the surface roughness $Rz_2$ of the top of the primary projections including the secondary projections, plating in the first phase is carried out preferably at a first constant potential as illustrated in the following.

When, for example, the particulate precipitate 203 containing copper is formed in the first phase, cathode constant potential electrolysis is preferably carried out in a plating solution containing copper ions at a concentration of 45 to 100 g/L and sulfuric acid at a concentration of 50 to 150 g/L, at a solution temperature of 50±5° C. and a potential of −2000 to −1700 mV (vs.Cu). (vs.Cu) denotes the potential relative to copper.

The particulate precipitate 203 may be formed on locations other than the top 202a of the primary projections 202, as shown in FIG. 5(c'), for example, the side face of the primary projections 202 and the surface of the base portion 201'.

In the second phase, as shown in FIG. 5(d), the particulate precipitate 203 is fixed by forming a coating (cover plating layer) 204 on the surface of the particulate precipitate 203, thereby completing the secondary projections 206. The coating 204 serves to reinforce the bonding between the particulate precipitate 203, and the bonding between the primary projections 202 and the secondary projections 206.

In the second phase, in view of forming the coating 204 that can excellently reinforce the bonding between the particulate precipitate 203 and the bonding between the primary projections 202 and the secondary projections 206, plating is preferably carried out at a second constant potential that satisfies the relation, second constant potential>first constant potential. When using the cathode constant potential electrolysis, by controlling the potential setting, the moving speed of substances, that is, the moving amount of copper ions can be curbed to low easily compared with cathode constant current electrolysis. Therefore, in cathode constant potential electrolysis, after a plating solution is used in the first phase, the plating solution can be used for plating in the second phase. That is, the first phase and the second phase can be carried out with one plating bath, and therefore the production cost can be decreased.

When, for example, the coating 204 containing copper is formed in the second phase, cathode constant potential electrolysis is preferably carried out at a solution temperature of 50±5° C. and a potential of −750 to −650 mV (vs.Cu) in a plating solution used in the first phase.

The coating 204 may be formed not only on the surface of the particulate precipitate 203, but also on the side face of the primary projections 202 and the surface of the base portion 201'.

Examples of the copper ion source contained in the plating solution used in the first phase and the second phase in the second step include copper sulfate, copper chloride, copper nitrate, and hydrates of these. However, when using sulfuric acid for realizing an acid bath, in view of sharing anions, copper sulfate or its hydrate is preferably used. Sulfuric acid is preferable in that it is low in volatility compared with hydrochloric acid and nitric acid and thus does not easily change the composition of the plating solution.

The anode, i.e., the counter electrode at the time of plating is not particularly limited. However, it is desirable to avoid drastic compositional change of the plating solution due to dissolution of the anode. Therefore, for the anode, copper, platinum, glassy carbon, and insoluble lead can be preferably used.

Next, a description of the case where the secondary projections are formed by blasting is given.

In blasting, micropowder (blasting agent) is caused to collide with the surface of the substrate along with water and compressed air at a predetermined pressure. With the impact force when the blasting agent is caused to collide with the substrate, projections and recesses (secondary projections 207) as shown in FIG. 6(b) are formed on the top 202a of the primary projections 202 shown in FIG. 6(a).

For blasting, for example, blasting includes dry blasting that uses compressed air and a blasting agent and does not use water, and wet blasting that uses compressed air, water, and a blasting agent. Wet blasting is particularly preferably used, because it is excellent for washing the substrate (for example, removing grinding sludge caused at the time of collision of the substrate and the blasting agent), in addition to forming projections and recesses on the surface.

The air pressure at the time of causing the blasting agent to collide with the surface of the substrate is preferably about 0.1 MPa to 1 MPa. When the air pressure is too small, it may make difficult to form the projections and recesses on the substrate. On the other hand, when the air pressure is too large, the substrate may be deformed.

In the present invention, the blasting agent is preferably caused to collide with the substrate from a fixed nozzle while moving the substrate. The speed for moving the substrate (treatment rate) is preferably about 0.1 to 10 m/min. When the moving speed is too fast, it may become difficult to form the projections and recesses on the substrate. On the other hand, when the moving speed is too slow, the substrate may be deformed.

In view of inhibiting deformation of the base portion due to the collision of the blasting agent, the substrate is preferably moved along the circumferential surface of the roller. Furthermore, by allowing the blasting agent to collide with both sides of the substrate simultaneously, deformation of the base portion can be inhibited.

Examples of the blasting agent include, alumina particles, zirconia particles, and resin particles. The average particle size of the blasting agent is, for example, preferably 3 to 250 µm, and particularly preferably 5 to 15 µm. When the average particle size of the blasting agent is too small, the projections and recesses may not be formed on the substrate sufficiently. On the other hand, when the average particle size is too large, the base portion may be deformed when the blasting agent is caused to collide with the surface of the substrate.

Next, a description of the case where the secondary projections are formed by etching is given.

Examples of etching include an immersing method including a step of immersing the substrate in an etching solution, and a spraying method including a step of spraying an etching solution onto the substrate. Particularly, the spraying method is preferable in that the etching rate in the depth direction can be increased easily. In this case, the spraying pressure is, for example, preferably about 0.1 to 1.5 MPa.

The amount of etching is preferably 0.5 µm to 3 µm in an average thickness. The etching amount is determined by the weight change in the substrate. To be specific, the weight of the substrate is measured before etching and after etching, and the amount of the substrate decreased is determined. Then, the amount of the substrate decreased is divided by the specific gravity of the substrate and the etching area, to obtain the etching amount (average thickness).

Examples of the etching solution include an aqueous solution containing hydrogen peroxide and sulfuric acid, and an aqueous solution of ferric chloride. When using the aqueous solution containing hydrogen peroxide and sulfuric acid, the concentration of hydrogen peroxide is preferably 5 to 200 mol/L, and the concentration of sulfuric acid is preferably 5 to 300 g/L. When using the aqueous solution of ferric chloride, the concentration of ferric chloride is preferably 1 to 10 wt %. However, when the substrate contains copper or a copper alloy, an aqueous solution containing divalent copper ions and having a copper ion concentration of 1 to 20 mol/L, for example, an aqueous solution of cupric chloride is preferable. The temperature of the etching solution is preferably 25 to 55° C.

Figure 6:
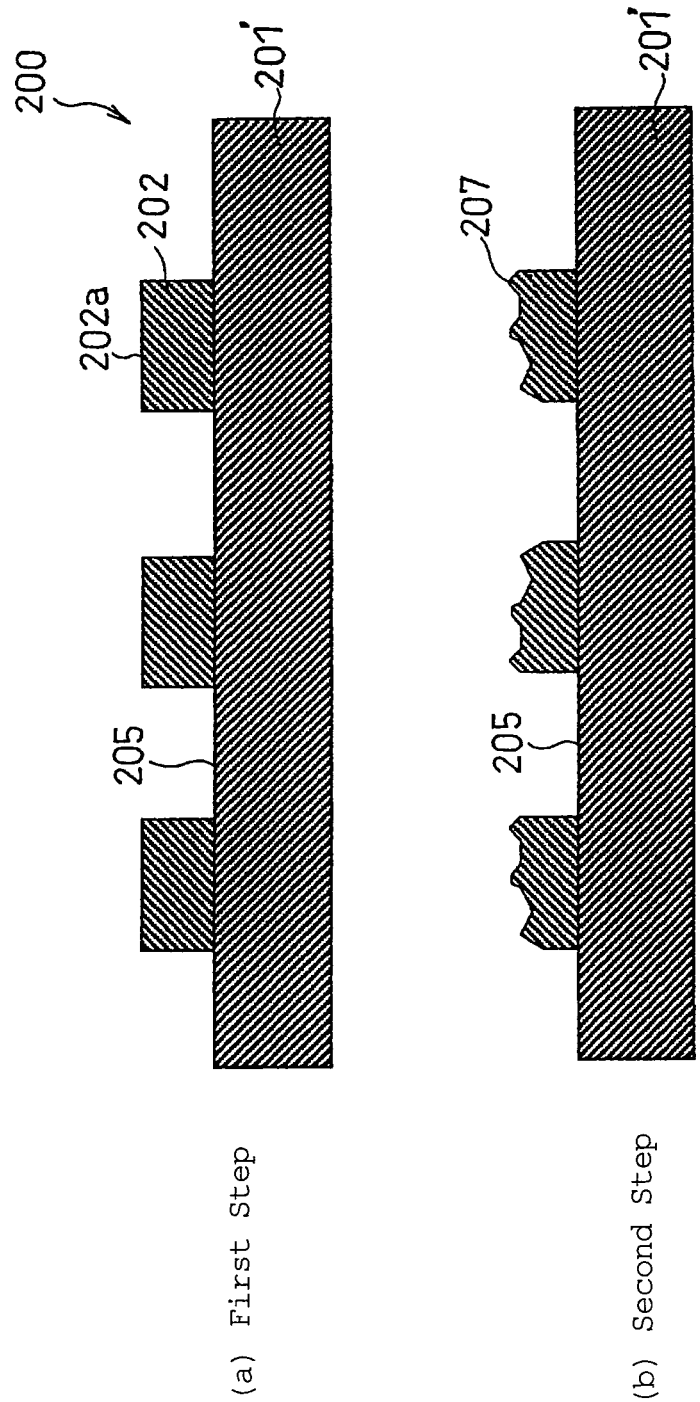
FIG. 6 is a schematic diagram illustrating another embodiment of steps for producing a current collector of the present invention.

In blasting and etching, as shown in FIG. 6, the projections and recesses are formed on the top 202a of the primary projections 202 by partially removing the primary projections 202. The lowest point of the recessed portions at this time is the top of the primary projections of the current collector of the present invention, and the highest point of the projected portions is the top of the secondary projections 207.

Third Step

A third step is a rust preventative treatment step carried out as necessary for preventing the current collector from being oxidized. The rust preventative step may be a general rust preventative treatment step. For example, a chromate treatment is carried out. Or, benzotriazole or its derivative is applied.

Figure 7:
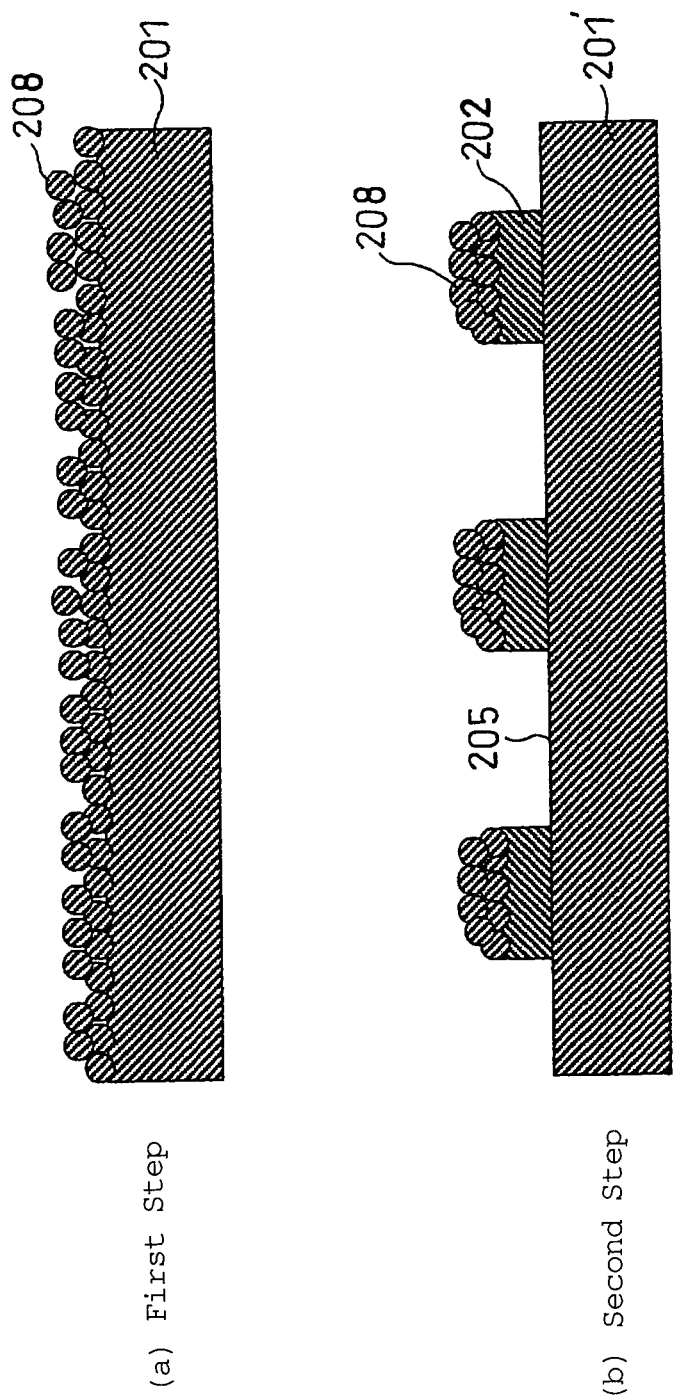
FIG. 7 is a schematic diagram illustrating still another embodiment of steps for producing a current collector of the present invention.

For a current collector for electrodes of the present invention, as shown in FIG. 7, a production method including a first step of forming the secondary projections 208 on the sheet material 201, and afterwards, a second step of forming the primary projections 202 may be carried out. An example of such a production method is described in the following.

First Step

A sheet substrate 201 with a ten-point average height $Rz_2$ of 0.9 to 9 μm, preferably 1.5 to 7 μm is prepared. The sheet substrate 201 may be metal foil, for example, copper foil, copper alloy foil, nickel foil, and stainless steel foil, with minute projections and recesses on the surface thereof. The projected portions of the minute projections and recesses on the surface of the metal foil are the secondary projections 208. Relatively simple examples of a method for forming the minute projections and recesses include blasting, electrodeposition, and plating, without limitation. The conditions at the time of forming the minute projections and recesses (for example, the size of the blast particles, and conditions for the electrodeposition) allows control of the ten-point average height $Rz_2$.

Electrodeposition or plating is a method in which metal foil is immersed in a predetermined electrolyte solution (plating solution), and a voltage is applied to the metal foil to precipitate metal. With the conditions for the composition and the temperature of the electrolyte solution (plating solution), additives contained in the electrolyte solution, and the current density, the state (that is, the ten-point average height $Rz_2$) of the metal precipitated on the metal foil can be changed.

A commercially available sheet substrate with a ten-point average height $Rz_2$ of 0.9 to 9 μm can also be used. For example, WS foil, STD foil, and MP foil (product names) manufactured by FURUKAWA CIRCUIT FOIL Co., Ltd. may be used as the substrate. The ten-point average height $Rz_2$ of these foils is, for example, 1.5 to 23 μm, and a substrate with $Rz_2$ of 0.9 to 9 μm is appropriately selected from these foils and used. Such a foil can be obtained, for example, by immersing a portion of a cylindrical cathode drum in an electrolyte solution in which copper sulfate or the like is dissolved, disposing the anode so as to surround the drum, and applying a voltage between the anode and the cathode. At this time, by rotating the drum while precipitating copper foil on the drum, the electrolytic copper foil can be formed continuously. A roughening treatment of electrodepositing further copper particles on the surface of the obtained electrolytic copper foil can further be carried out for controlling the surface roughness appropriately.

Second Step

Then, the substrate having the secondary projections 208 is pressed with a roller on which recessed portions having a larger diameter than that of the secondary projections 208 are disposed. As a result, primary projections 202 with the secondary projections 208 formed on the top thereof, and a base portion 201' having a flat face 205 are formed. At this time, the recessed portions of the roller have sufficient depth so as not to deform the secondary projections 208. The surface of the substrate pressed by the portions of the roller other than the recessed portions is the flat face 205 of the base portion 201'. A pattern by which the primary projections 202 are disposed is dependent on the pattern by which the recessed portions on the surface of the roller are disposed. If the substrate is pressed by a pair of rollers, the primary projections 202 can be formed only on one side of the substrate when the recessed portions are disposed only at one side of the roller, and the primary projections 202 can be formed on both sides of the substrate when the recessed portions are disposed on both sides of the roller.

The height of the primary projections 202 formed in the second step is dependent on, for example, the pressing pressure, the shape of the recessed portions on the roller surface, and mechanical properties of the metal foil. For example, the primary projections 202 with a height of 5 to 10 μm can be formed by pressing copper foil with a thickness of 20 μm using a roller with recessed portions of a 20 μm diameter disposed with a line pressure of 1 ton/cm.

The depth of the recessed portions provided on the roller have to be larger than the height of the primary projections 202, and the depth varies depending on the height of the secondary projections 208. When the depth of the recessed portions is sufficiently large, the top of the secondary projections 208 does not reach the bottom of the recessed portions. Accordingly, even after the second step, the shape of the secondary projections 208 can be maintained. As a result, a current collector including the base portion 201' having a flat face, the primary projections 202 projecting from the flat face, and the secondary projections 208 projecting from the top of the primary projections 202 can be obtained.

The present invention also relates to an electrode including the above-described current collector for electrodes and an active material carried on the current collector. An active material layer preferably includes a plurality of columnar particles. By allowing the active material to form the columnar particles, stress resulting from volume expansion of the active material at the time of lithium ion absorption can be effectively curbed. Therefore, battery trouble is not easily caused.

The columnar particles are preferably bonded to the top of the primary projections. Such an active material is preferably carried on the current collector by vapor deposition (for example, dry processes such as deposition, sputtering, and CVD). With vapor deposition, the active material can be easily deposited on the top of the primary projections, and can be grown in a columnar shape.

The thickness of the active material layer is preferably in the range of approximately 3 to 100 μm, although it depends on performance of the battery to be made. The thickness of the active material layer is further preferably 5 μm or more. The thickness of the active material layer is further preferably 50 μm or less, still further preferably 40 μm or less, and particularly preferably 30 μm or less. When the thickness of the active material layer is below 3 μm, the volume ratio of the active material relative to the electrode as a whole becomes small, making the battery energy density small. Particularly, by setting the thickness of the active material layer to 5 μm or more, a certain degree of energy density can be secured. Therefore, when a material containing, for example, silicon element is used as the active material, its high capacity characteristics can be brought out sufficiently. By setting the thickness of the active material layer to 100 μm or less, stress caused at the time of charge and discharge can be eased, and the separation of the active material layer from the current collector and current collector deformation can be inhibited. Furthermore, when the active material layer contains a plurality of columnar particles, an increase in resistance in electron conduction from the columnar particles to the current collector can also be curbed. This is advantageous in charge and discharge at a large current value.

The thickness of the active material layer can be measured, for example, as follows.

First, the thickness of the whole electrode after forming the active material layer is measured. When the active material layer is carried only on one side of the current collector, the thickness of the active material layer can be obtained by deducting the thickness of the current collector from the thickness of the whole electrode. When the active material layer is carried on both sides of the current collector, by deducting the thickness of the current collector from the thickness of the whole electrode, the total thickness for the both sides of the active material layer can be obtained. When the surface of the active material layer has projections and recesses, the thickness is obtained using the top as the basis.

Figure 8:
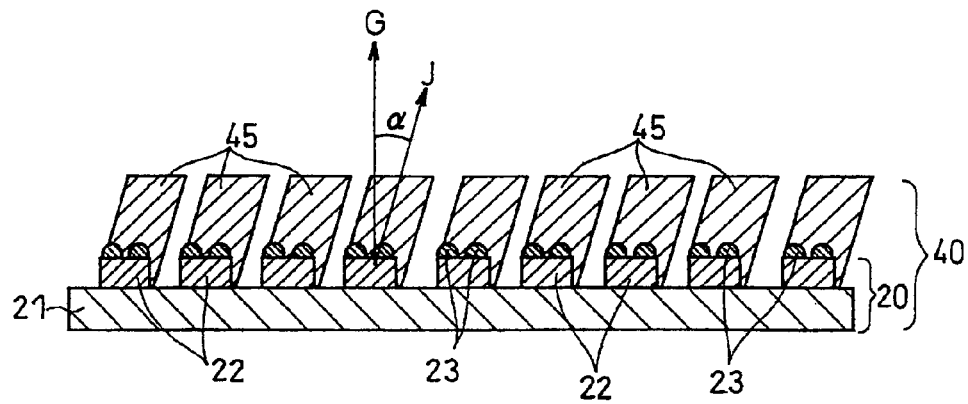
FIG. 8 is a schematic diagram illustrating a cross-sectional view of an example of an electrode of the present invention in the direction parallel to the normal direction.

FIG. 8 shows an example of an electrode of the present invention. FIG. 8 is a cross-sectional view of an electrode 40 in the direction parallel to the normal. The electrode 40 includes a current collector 20, and an active material layer carried on the current collector 20. The active material layer includes a plurality of columnar particles 45. The columnar particles 45 are bonded to the top of the primary projections 22 of the current collector 20, and secondary projections 23 bite into the root of the columnar particles 45. On the other side (lower side in FIG. 8) of the current collector 20, the primary projections and the secondary projections may be formed, and thus the active material may be formed.

The active material may be single crystal, polycrystal, microcrystal, or amorphous. A polycrystal active material includes a plurality of crystallite (crystal grain). A microcrystal active material includes crystallites with a size of 50 nm or less.

Similarly, when the active material is columnar particles, the form of the columnar particles is not particularly limited. The columnar particles may be, for example, single crystal particles, or polycrystal particles containing a plurality of crystallites. The crystallites may be microcrystal with a size of 100 nm or less. Or, the columnar particles may be amorphous. In this case, the particles are preferably uniformly amorphous in its entirety.

X-ray diffraction (XRD), a transmission electron microscope (TEM), and the like may be used to check if the active material is amorphous, or the active material is microcrystal. The particle size of the crystallite can be calculated by the Scherrer equation using a full-width at half maximum in the peak with the greatest intensity in the range of $2\theta=15$ to $40°$ in a diffraction pattern obtained by an XRD measurement of the active material. When a sharp peak cannot be seen in a range of $2\theta=15$ to $40°$ in a diffraction pattern, and only a broad halo pattern can be observed, the active material can be determined as substantially amorphous.

The active material preferably contains at least one selected from the group consisting of silicon element (Si) and tin element (Sn), for it achieves a high capacity. Among these, the active material particularly preferably is a material containing silicon element. Examples of a material containing silicon element include a silicon simple substance, a silicon alloy, a compound containing silicon and oxygen, and a compound containing silicon and nitrogen. The compound containing silicon and oxygen may further contain nitrogen, and the compound containing silicon and nitrogen may further contain oxygen. The active material may contain only one of these materials, or may contain two or more of these materials. The present invention is particularly effective in such a case, i.e., a case where a material that has high capacity and undergoes large volume change at the time of charge and discharge is used as the active material.

The compound containing silicon and oxygen is preferably silicon oxide, and particularly, silicon oxide having a composition represented by the general formula: $SiO_x$ (where $0 \leq x \leq 2$) is preferable. By adjusting molar ratio x of oxygen relative to silicon, capacity and physical properties such as Young's modulus of such silicon oxide can be easily controlled. Molar ratio x of oxygen relative to silicon is further preferably $0.01 \leq x \leq 1$. The active material may contain a composite of a plurality of silicon oxides with different ratios between silicon and oxygen.

There is no particular limitation with respect to the diameter of the columnar particles 45. The diameter of the columnar particles 45 is preferably 50 μm or less, and further preferably 1 to 20 μm, in view of inhibiting cracks of the columnar particles due to stress. The diameter of the columnar particles can be obtained, for example, as an average value of diameters at ½ height of two to ten arbitrary columnar particles. The diameter refers to the maximum width parallel to the surface of the current collector.

As shown in FIG. 8, growth direction J of the columnar particles 45 may be tilted with respect to normal direction G with respect to the current collector. By tilting the growth direction of the columnar particles with respect to the direction normal to the current collector, the proportion of the exposed portion of the current collector facing the positive electrode active material can be decreased. In this case, effects of, for example, improving charge and discharge efficiency can be achieved.

Although it depends on the form of the projection and the height of the projection on the current collector, tilt angle α of the growth direction of the columnar particles relative to the normal to the current collector is preferably 10 to 700. Tilt angle α is preferably 10° or more because the active material that grows from the flat portion of the current collector increases when the tilt angle is low. Furthermore, tilt angle α is preferably 700 or less because when the tilt angle is high, the speed of film-forming decreases, reducing production efficiency.

The direction normal to the current collector is the direction perpendicular to the surface of the current collector. Although the surface of the current collector has projections and recesses when observed microscopically, the surface is flat when observed macroscopically, and therefore the surface of the current collector and the direction normal to the surface can be uniquely determined.

Figure 9:
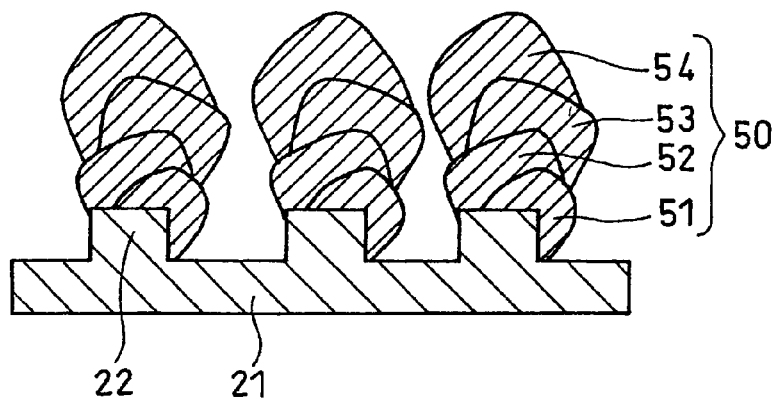
FIG. 9 is a schematic diagram illustrating a cross-sectional view of another example of an electrode of the present invention in the direction parallel to the normal.

Or, in the columnar particles, as shown in FIG. 9, their average growth direction may substantially coincide with the direction normal to the current collector. FIG. 9 shows an electrode in another embodiment of the present invention. In FIG. 9, the same reference numbers are used for the features that are the same as those in FIG. 8. In FIG. 9, the secondary projections are omitted.

Columnar particles 50 in FIG. 9 are formed of a plurality of grain layers. That is, the columnar particles 50 include a first portion 51, a second portion 52, a third portion 53, and a fourth portion 54 that are divided at curved portions.

As long as the average growth direction of the columnar particles substantially coincides with the direction normal to the current collector, the growth direction of, for example, a portion 51 included in a predetermined columnar particle may be the same as the growth direction of a portion 51 included in another columnar particle, or their growth direction may be different. The same applies to other portions. The number of the portions included in a columnar particle may be one, or two or more.

As described above, since the columnar particle includes a stack of the plurality of grain layer in that is tilted with respect to the direction normal to the current collector, the stress resulting from volume expansion at the time of lithium ion absorption by the active material can be eased further effectively.

When the negative electrode active material layer is formed on both sides of the current collector, the columnar particles may include the curved portion on both sides of the current collector, or the columnar particles carried on one side of the current collector may include the curved portion.

In the active material layer, as shown in FIGS. 8 and 9, gaps are also preferably provided between the columnar particles. That is, the columnar particles are preferably not in contact with each other. In battery charge and discharge reaction, collision between the columnar particles occur due to the active material expansion and contraction, increasing the stress. Thus, the contact between the columnar particles is preferably inhibited by providing gaps between the columnar particles. This eases the expansion stress of the active material. Although it depends on the size of the columnar particles, the pitch between adjacent columnar particles is preferably 1 μm to 30 μm. The contact of the columnar particles due to the active material expansion increases the stress that works on the interface with the current collector. To ease such stress, gaps of 1 μm or more are preferably formed. Furthermore, when the gaps are too large, the capacity density as the electrode plate declines, and therefore the pitch between the columnar particles is preferably 30 μm or less. The pitch between the columnar particles refers to the average distance at ½ height of the columnar particles between the columnar particles. The ½ height of the columnar particles is an average value of a vertical distance from the top of the primary projections to the top of the columnar particles.

In view of securing the contact area between the non-aqueous electrolyte and the columnar particles sufficiently, and easing the stress resulting from the expansion of the columnar particles sufficiently, the porosity of the negative electrode active material layer is preferably 10% to 70%, and further preferably 30% to 60%. As long as the porosity of the negative electrode active material layer is 10% or more, it is probably sufficient for easing the stress resulting from the columnar particle expansion and contraction. Therefore, the non-aqueous electrolyte contacting the columnar particles can be secured in a sufficient amount. When the porosity of the negative electrode active material layer exceeds 70%, the energy density of the negative electrode becomes small. Even when the porosity of the negative electrode active material layer is greater than 70%, depending on the use of the battery, it can be used suitably as the negative electrode.

Figure 10:
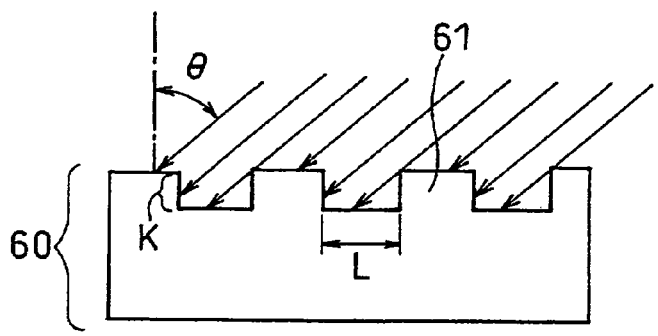
FIG. 10 is a schematic diagram for illustrating a method for forming columnar particles on primary projections.
Figure 11:
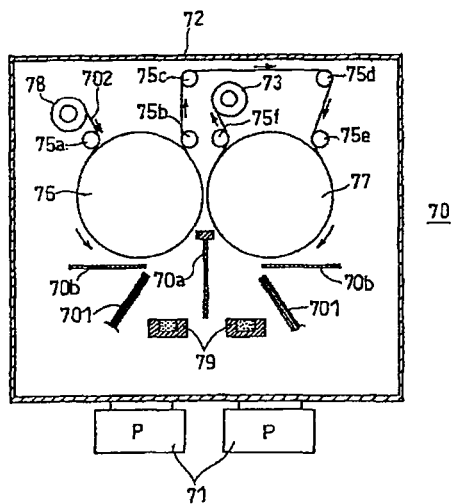
FIG. 11 is a schematic diagram illustrating an example of a deposition apparatus for allowing the current collector to carry an active material.

Next, with reference to FIG. 10 and FIG. 11, a description is given as to an example of a step of growing columnar particles tilted with respect to the direction normal to the current collector on the top of the primary projections, as shown in FIG. 8. FIG. 10 is a schematic diagram illustrating an incident direction of deposition particles on primary projections on the current collector when making an electrode with a deposition method. FIG. 11 is a schematic diagram illustrating an example of a deposition apparatus for allowing the current collector to carry an active material.

A current collector 60 in FIG. 10 includes primary projections 61 formed in a regular pattern. The height of the primary projections 61 is K, and the distance between adjacent primary projections 61 is L.

In FIG. 10, the active material is deposited in a direction tilted to an angle of θ degree from the direction normal to the current collector. At this time, on the flat portion of the current collector, due to the primary projections 61 with height K, there will be a portion where no deposition particles grow to the length of K×tan θ owing to the shadow effect. Therefore, by controlling the pitch and height of the primary projections 61 and the incident angle θ of the deposition particles so as to satisfy L<K×tan θ, the columnar particles can be grown on the primary projections 61, and gaps can be formed between the columnar particles.

An electrode shown in FIG. 8 can be made by using a deposition apparatus 70, for example, as shown in FIG. 11.

The deposition apparatus 70 includes a chamber 72. Exhaust pumps 71 evacuate inside the chamber 72. In the chamber 72, a feed roll 78, a pickup roll 73, conveyer rollers 75a to 75f, a first can 76, and a second can 77 are disposed.

A long current collector 702 is rolled out from the feed roll 78, passes through the conveyer roller 75a, and runs along the circumferential surface of the first can 76 that is cylindrical. Afterwards, the current collector 702 passes through the conveyer roller 75b to 75e, and runs along the circumferential surface of the second can 77 that is cylindrical in a reversed state. Lastly, it passes through the conveyer roller 75f, and is picked up by the pickup roll 73.

Space below the first can 76 and the second can 77 is divided by a center separator plate 70a into two areas, and in each area, a crucible 79 in which an active material source is stored is set. For the active material source, for example, silicon and tin are used, without limitation. The active material source is heated by a heating device (not shown) such as an electron beam, and evaporated.

The evaporated active material source passes through an opening of a shield plate 70b, and is incident on the circumferential surface of the first can 76 and the circumferential surface of the second can 77. At that time, since the active material source is incident from a tilted direction with respect to the direction normal to the current collector 702, the active material does not deposit on the portion of the current collector blocked by the primary projections. At the circumferential surface of the first can 76, the active material deposits on one side of the current collector, and at the circumferential surface of the second can 77, the active material deposits on the other side of the current collector.

The columnar particles of the active material with curved portion as shown in FIG. 9 can be formed as well by rolling out the current collector with the active material deposited from the pickup roll 73, picking up the current collector by the feed roll 78, and evaporating the active material source again. For example, by repeating such an operation to a total of n times, it is possible to form columnar particles made of a stack of a plurality of grain layers having a plurality of curved portions, and grown apparently parallel to the direction normal to the current collector. By forming columnar particles having a plurality of curved portions, the stress involved with the active material expansion and contraction can be eased efficiently.

When depositing a compound containing silicon and oxygen, a compound containing silicon and nitrogen, a compound containing tin and oxygen, or a compound containing tin and nitrogen as the active material, oxygen gas or nitrogen gas is introduced from gas introduction pipes 701. By allowing silicon or tin to evaporate in an atmosphere containing these gases, oxides or nitrides of silicon or tin can be obtained.

Figure 12:
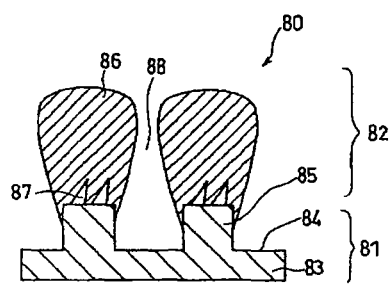
FIG. 12 is a schematic diagram illustrating a cross-sectional view of still another example of an electrode of the present invention in the direction parallel to the normal.

When the active material layer includes the columnar particles carried on the projections, the columnar particles preferably includes voids therein. FIG. 12 shows a vertical cross sectional view of an example of the columnar particles with voids inside.

An electrode 80 in FIG. 12 includes a current collector 81 and an active material layer 82 carried on the current collector 81. The current collector 81 includes a base portion 83 including a flat face 84, primary projections 85 projecting from the flat face 84, and secondary projections (not shown) projecting from the surface of the primary projections 85.

The active material layer 82 includes a plurality of columnar particles 86, and the columnar particles 86 are carried on the primary projections 85. The columnar particles 86 include voids 87 therein.

When using a material that particularly undergoes a large volume change at the time of charge and discharge as the negative electrode active material, an extremely large stress is applied to the current collector. By including voids in the columnar particles forming the active material layer, a large stress caused by expansion and contraction of the negative electrode active material can be eased sufficiently. Therefore, even if charge and discharge are repeated, negative electrode deformation and separation of the negative electrode active material from the current collector can be prevented. Therefore, even if a negative electrode active material that undergoes a large volume change at the time of charge and discharge is used, cycle performance can be improved.

The voids 87 provided in the columnar particles are preferably present at the interface between the columnar particles and the projections.

The expansion stress caused by charge and discharge is extremely high at the interface between the current collector and the active material. Therefore, by providing the voids at the interface between the current collector and the active material, the expansion stress can be eased further, and the electrode plate deformation and the separation of the active material from the current collector can be inhibited even more.

In the active material layer 82, as shown in FIG. 12, gaps are preferably present between the columnar particles. That is, the columnar particles are preferably not in contact with each other. In this embodiment as well, the pitch of the adjacent columnar particles is preferably 1 μm to 30 μm.

The columnar particles 86 may be formed of, as shown in FIG. 9, a plurality of grain layers. In this case, the voids in the columnar particles are formed at the interface between the current collector 81 and the first portion of the columnar particles, and may be formed, for example, parallel or substantially parallel to the growth direction of the columnar particles.

The porosity of the active material layer 82 formed of columnar particles with voids therein is preferably 10% or more and below 70%, and further preferably 30 to 60%. As long as the porosity of the active material layer 82 is 10% or more, the stress involved with the negative electrode active material expansion and contraction can be eased sufficiently. When the porosity of the active material layer 82 becomes 70% or more, the ratio of the columnar particles relative to the active material layer 82 becomes low, and therefore the thickness of the active material layer 82 may need to be increased in order to obtain a capacity of a degree same as a conventional degree. This may cause a decline in battery capacity density. Therefore, the porosity of the active material layer 82 is preferably controlled to be within the above-described range.

The porosity of the active material layer 82 can be adjusted, for example, by controlling the form and the height of the projections formed on the base portion, and the incident angle of the active material at the time of the oblique evaporation.

The porosity of the active material layer 82 can be calculated from, for example, the results of electron microscope observation on cross-sections taken from a plurality of directions. The porosity can be calculated, for example, by reading, into image-processing software, the cross-sectional images of the active material layer obtained by a scanning electron microscope, and counting the number of the pixels of the gap portion and the active material portion. The porosity obtained by this method is the porosity of the active material layer, including the voids 87 in the columnar particles, and the gaps 88 between the columnar particles. With this method, the porosity in the columnar particles and the porosity between the columnar particles can also be measured separately.

Or, the porosity of the active material layer 82 can be obtained from the ratio of the apparent density of the active material layer relative to the true density of the active material. The apparent density of the active material layer can be obtained from the weight and the thickness of an active material layer carried on a current collector of a predetermined area. The porosity obtained by this method is the porosity of the active material layer, including the voids 87 in the columnar particles, and the gaps 88 between the columnar particles.

Or, for obtaining the porosity of the active material layer more accurately, a gas absorption method, and a mercury intrusion method using a porosimeter can be used as well. This method also can be used for obtaining the porosity of the active material layer, including the voids 87 in the columnar particles, and the gaps 88 between the columnar particles.

The porosity by the voids 87 of the columnar particles 86 is preferably 0.5 to 20%, and further preferably 1 to 10%.

In the porosity of the active material layer, the porosity contributed by the voids 87 in the columnar particles is very low compared with the porosity contributed by the gaps 88 between the columnar particles. Therefore, in the porosity of the negative electrode active material layer, the porosity contributed solely by the gaps 88 between the columnar particles is preferably 9% to 69%, and further preferably 20 to 60%.

The porosity in the columnar particles can be defined, for example, as an in-plane porosity in a plane perpendicular to the surface of the current collector of the columnar particles. The in-plane porosity can be obtained, from the results of electron microscope observation on vertical cross-sections of the columnar particles, as an area ratio of the void portion relative to the whole area.

The maximum width of the voids in the active material particles obtained by cross-sectional observation is preferably 0.1 μm or more. When the voids are small, the effect of easing the stress will become less. Therefore, the maximum width of the voids is preferably 0.1 μm or more. The maximum width of the voids is preferably 10 μm or less, although it depends also on the diameter of the active material particles. The wider the voids in the active material particles, the narrower the diameter of the active material, and therefore the strength of the active material columns is weakened. Thus, the voids in the active material particles are preferably 10 μm or less.

Similarly to the case of the porosity in the columnar particles, in the porosity of the negative electrode active material layer, the porosity contributed solely by the gaps 88 between the columnar particles can be defined as the porosity made up solely of the gaps 88 on a plane perpendicular to the surface of the current collector. In this case as well, the porosity made up solely of the gaps 88 can be obtained, from the results of electron microscope observation on vertical cross-sections of the active material layer, as an area ratio of the gaps 88 relative to the whole area.

The thickness of the active material layer 82 is preferably 5 μm or more and 100 μm or less, and further preferably 5 μm or more and 50 μm or less. As long as the thickness of the active material layer is 5 μm or more, a certain level of energy density can be secured. Therefore, for example, when a silicon simple substance is used as the negative electrode active material, its high capacity characteristic can be fully brought out. Because the stress resulting from expansion and contraction of the active material involved with charge and discharge increases depending on the capacity, as long as the thickness of the active material is 100 μm or less, the stress can be eased to inhibit deformation of the current collector and separation of the active material. An increase in resistance in electron conduction from the columnar particles can also be curbed. Therefore, it is advantageous in charge and discharge at a large current value.

When the active material layer includes the columnar particles carried on the projections, and the columnar particles include the voids therein, on the current collector 81, the primary projections 85 are preferably disposed on the base portion 83 in a regular pattern, similarly to the above-described case. For example, the plurality of primary projections may be disposed, at intersection points of a plurality of first virtual straight lines disposed parallel to one another with first pitch $S_1$ in the flat face of the base portion, and a plurality of second virtual straight lines disposed perpendicular to the first virtual straight lines with second pitch $S_2$ that is smaller than first pitch $S_1$ in the flat face; and at the center of a rectangle formed by two adjacent first virtual straight lines and two adjacent second virtual straight lines.

In the current collector carrying the columnar particles including the voids therein, pitch S between a primary projection disposed at a predetermined intersection point of the first virtual straight line and the second virtual straight line, and another primary projection disposed at the center of the above-described rectangular containing the intersection point and at the nearest to the primary projection disposed at the intersection point is preferably 10 to 100 μm, and further preferably 40 to 80 μm. The pitch refers to the center-to-center distance of the primary projections. The center of the primary projections is the center point of the maximum diameter of the primary projections.

Although the height and the diameter of the primary projections 85 included in the current collector 81 may be in the above-described range, in view of preventing negative electrode deformation due to expansion stress of the columnar particles carried on the primary projections 85, the diameter of the primary projections 85 is preferably 50 μm or less, and further preferably 1 to 20 μm. The height of the primary projections 85 is preferably 30 μm or less, and further preferably 3 μm to 20 μm in view of strength of the primary projections 85.

Next, a description is given for an example of a method for producing an active material layer including columnar particles including voids therein.

A negative electrode active material layer including voids in the active material particles and gaps between the active material particles such as the one described above can be made by using, for example, dispersal plating and a deposition method. Among these methods, a dry process such as a deposition method is preferable in that the formation speed of the active material layer is fast, and the voids and gaps are easily provided in the columnar particles and between the columnar particles.

A method for forming the columnar particles including voids therein is described with reference to FIG. 13.

When providing the voids in the columnar particles by the deposition method, for example, secondary projections 91 are provided on the top of primary projections 90 of the current collector. The secondary projections 91 can be provided on the primary projections 90 by roughening the top of the primary projections 90.

Figure 13:
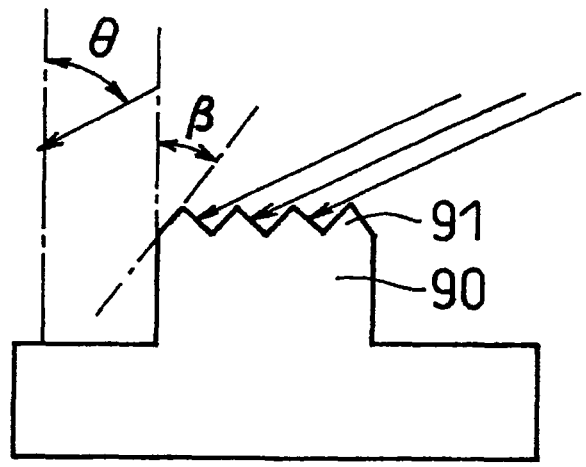
FIG. 13 is a schematic diagram for illustrating a method for forming the columnar particles shown in FIG. 12.

In FIG. 13, a plurality of cone-shaped secondary projections 91 are formed on the primary projections 90. The traveling direction of a line from the top of the secondary projection 91 to the hem of the secondary projection 91 is tilted with respect to the direction normal to the current collector by angle β. At this time, when incident angle θ of deposition particles relative to the direction normal to the current collector and angle β satisfy the relation θ>β, there will be portions in which the active material particles do not grow on the top of the primary projections 90 due to the shadow effect of the secondary projections 91. In this way, by adjusting the incident angle of the deposition particles and the form of the secondary projections, regions where the active material particles are not grown are formed on the primary projections 90. Therefore, voids can be provided inside the columnar particles carried on the primary projections.

Although the form of the secondary projections in the case described above was cone-shaped, the form of the secondary projections is not particularly limited thereto.

The porosity in the columnar particles can be controlled, for example, by adjusting the pitch between the secondary projections, and the height of the secondary projections. For example, when providing voids in the columnar particles, the surface roughness $Rz_2$ of the top of the primary projections including the secondary projections is preferably 1.0 to 7.0 μm, and further preferably 2.0 to 5.0 μm.

In the deposition method, as described above, by controlling the form, the pitch, and the height of the primary projections provided on the current collector, and also the incident angle of the deposition particles, gaps can be provided between adjacent columnar particles.

An electrode as described above can be made by using a deposition apparatus shown in FIG. 14, other than the deposition apparatus shown in FIG. 11. FIG. 14(a) shows a front view of a deposition apparatus, and FIG. 14(b) shows a cross-sectional view taken along line b-b in FIG. 14(a).

A deposition apparatus 100 includes a chamber 101 for realizing a vacuum atmosphere, an evaporation source 105, a heating means (not shown) such as an electron beam device for heating the evaporation source 105, a gas introducing part for introducing gas into a chamber 101, and a fixing board 102 for fixing a current collector 106.

The gas introducing part includes a nozzle 103 for supplying gas, and a pipe 104 for introducing gas from outside to the nozzle 103. The fixing board 102 for fixing the current collector 106 is set above the nozzle 103. Vertically below the fixing board 102, the evaporation source 105 is set.

When using silicon oxide as the active material, for example, a silicon simple substance is used for the evaporation source 105. High purity oxygen gas is supplied from the nozzle 103 to between the current collector 106 and the evaporation source 105, and an oxygen atmosphere is formed between the current collector 106 and the evaporation source 105. By applying an electron beam to the silicon simple substance serving as the evaporation source 105, silicon is heated and vaporized. The vaporized silicon passes through the oxygen atmosphere, becomes silicon oxide, and deposits on the surface of the current collector 106. An electrode using silicon as the active material can also be made by depositing silicon without introducing oxygen gas.

In the deposition apparatus of FIG. 14, the fixing board 102, which is a plate-like member, is rotatable, and is capable of changing the positional relationship between the current collector 106 and the evaporation source 105. Therefore, it can be tilted so that angle γ formed between the fixing board 102 and the horizontal plane is within the range 0°<γ<90°. In this way, the active material deposition can be carried out under a state in which the incidence direction is tilted with respect to the direction normal to the current collector. Thus, columnar particles carried on the primary projections and tilted in a certain direction can be obtained. Furthermore, as described above, because the secondary projections are formed on the top of the primary projections, voids can be provided in the columnar particles carried on the primary projections.

The columnar particles formed of a plurality of grain layers as well can be made by using the deposition apparatus in FIG. 14. As described above, since the fixing board 102 is rotatable, for example, by angle-changing between position A and position B, for example, the columnar particles including a plurality of grain layers shown in FIG. 9 can be formed. As shown in FIG. 14(b), position A shown by the solid line may be a position at which the face of the fixing board 102 where the negative electrode current collector 106 is fixed faces the deposition source 105 located vertically below, and the angle formed between the fixing board 102 and a straight line in the horizontal direction is γ°. Position B shown by the broken line may be a position at which the face of the fixing board 102 where the negative electrode current collector 106 is fixed faces the deposition source 105 located vertically below, and the angle formed between the fixing board 102 and a straight line in the horizontal direction is (180−γ)°. For example, by setting the fixing board 102 at position A, the first portion of the columnar particles in FIG. 9 can be formed on the primary projections. By setting the fixing board 102 at position B, the second portion of the columnar particles in FIG. 9 can be formed. By changing the position of the fixing board 102 to change the angle alternately, the columnar particles including a plurality of grain layers shown in FIG. 9 can be formed. Angle γ° can be selected appropriately according to, for example, the size of the negative electrode active material layer to be formed.

The voids in the columnar particles can be formed by using dispersal plating. In dispersal plating, at the time of forming the active material layer by plating, a plating solution containing a foaming agent is used to form the active material layer. Afterwards, by heating the active material layer to remove the foaming agent, voids can be provided in the columnar particles.

The porosity of the columnar particles of the active material can be controlled by adjusting the amount of the foaming agent contained in the plating solution. For example, the foaming agent preferably occupies 10 to 50 wt % of the plating solution.

When providing the voids in the columnar particles by dispersal plating, the secondary projections may or may not be provided on the surface of the primary projections.

As described above, the primary projections provided on the current collector can be formed by, for example, plating and roll-pressing, and the secondary projections can be formed by, for example, plating, etching, and a blast treatment.

In view of achieving uniform distribution of the voids in the active material layer, and increasing the porosity of the active material layer, the primary projections are preferably disposed in a regular pattern on the base portion. The pitch between the nearest primary projections adjacent to each other is preferably constant. The regular pattern may be changed at intervals. The primary projections are preferably disposed, for example, like a matrix.

For example, by disposing the primary projections regularly, the columnar active material particles carried on the primary projections are disposed, for example, with an equal pitch. Thus, the stress applied to the current collector from the active material particles at the time when the active material particles expand can be decreased, and damage to the active material layer by collision between the active material particles and separation of the active material particles from the current collector can be inhibited.

Figure 15:
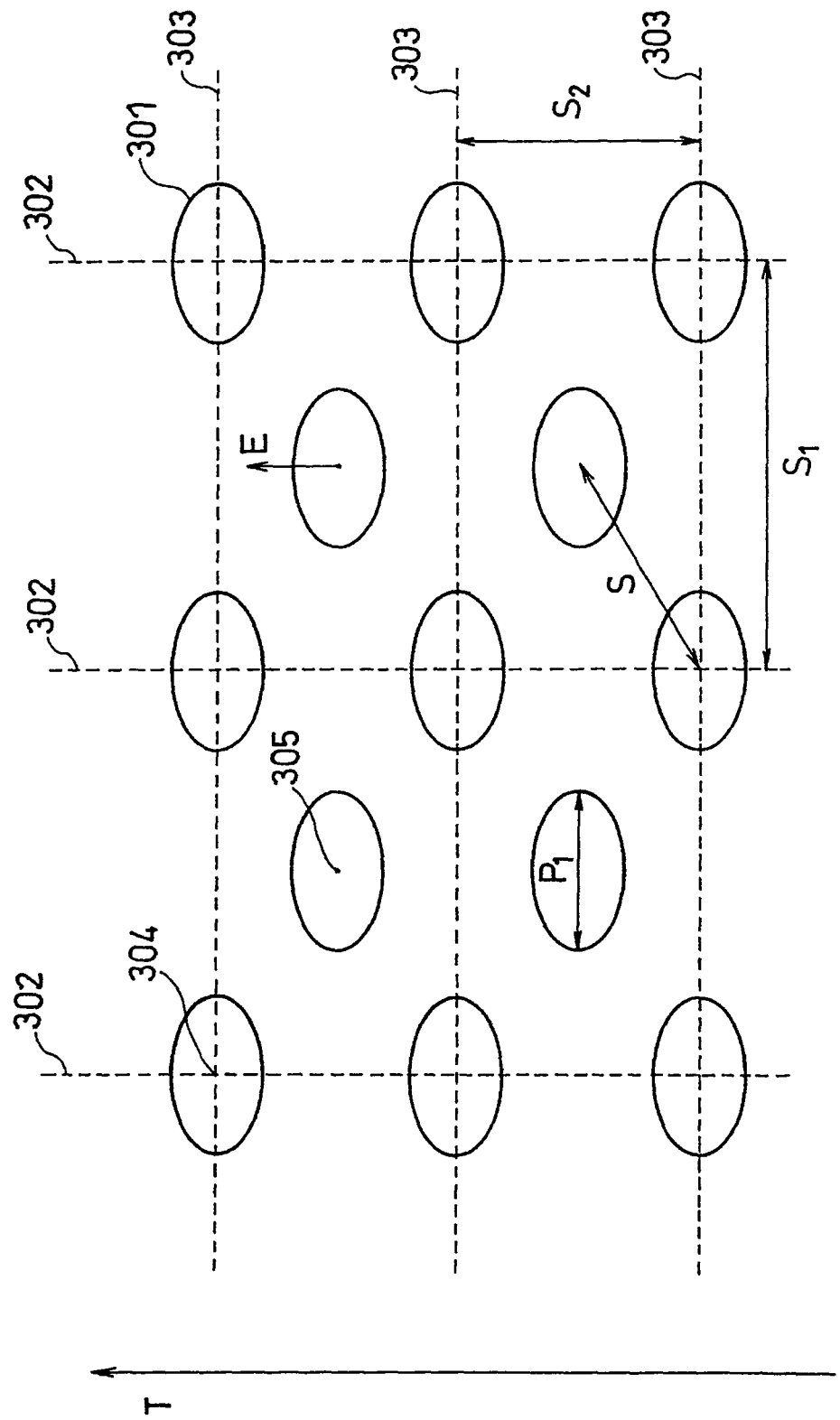
FIG. 15 is a schematic diagram illustrating an example of a pattern of arrangement of the primary projections.

For example, the primary projections can be disposed as shown in FIG. 15.

In FIG. 15, a plurality of primary projections 301 are preferably disposed, at intersection points 304 of a plurality of first virtual straight lines 302 disposed parallel to one another with first pitch $S_1$ in the flat face, and a plurality of second virtual straight lines 303 disposed perpendicular to the first virtual straight lines 302 with second pitch $S_2$ that is smaller than first pitch $S_1$ in the flat face; and at a center 305 of a rectangle formed by two adjacent first virtual straight lines 302 and two adjacent second virtual straight lines 303. In FIG. 15, the plurality of primary projections are disposed so that their centers substantially coincide with the intersection point 304 and with the center 305 of the rectangle. Although the shape of the primary projections is oval in FIG. 15, the shape of the primary projections is not particularly limited thereto.

By disposing the primary projections regularly like a grid in this manner, the packing rate of the columnar active material particles can be increased. Thus, energy density can be increased even more.

Furthermore, when the base portion is long (i.e., when the current collector is long), one of the first virtual straight lines 302 and the second virtual straight lines 303 is preferably parallel to longitudinal direction T of the long base portion, and particularly preferably, the first virtual straight lines 302 are parallel to longitudinal direction T.

Maximum diameter $P_1$ of the primary projections in the width direction of the long base portion is preferably ½ or more of first pitch $S_1$. That is, ratio $P_1/S_1$ preferably is ½ or more and below 1. In this case as well, ratio $P_1/S_1$ is a value in a produced current collector, i.e., a current collector immediately before an active material layer is formed.

Direction E, i.e., the direction in which the active material is deposited is projected on the surface of the current collector, is preferably perpendicular or substantially perpendicular to maximum diameter $P_1$ of the primary projections. Direction E is further preferably parallel to longitudinal direction T of the base portion.

With such a configuration, an excessive deposition of the active material on the flat portion of the base portion can be inhibited.

Pitch S between a primary projection disposed at a predetermined intersection point of the first virtual straight line and the second virtual straight line, and another primary projection that is the nearest to the primary projection disposed at the intersection point and that is disposed at the center of the above-described rectangle including the intersection point is preferably 3 to 100 μm, as described above. Similarly, first pitch $S_1$ and second pitch $S_2$ in a range of 3 to 100 μm are sufficient. In an arrangement shown in FIG. 15, pitch S between the primary projections, first pitch $S_1$, and second pitch $S_2$ satisfy the formula:

$$S=(\sqrt{(S_1^2+S_2^2)})/2.$$

The primary projections including the secondary projections are not necessarily disposed throughout the entire surface of the current collector. The arrangement of the primary projections depends on battery design and circumstances in the production steps. Therefore, the primary projections may be disposed only at a portion of the current collector. The primary projections may be disposed on only one side of the base portion, and the active material layer may be carried only on that side, or the primary projections may be disposed on both sides of the base portion, and the active material layer may be carried on both sides of the base portion.

The present invention further relates to a battery including the above-described electrode, a counter electrode of the electrode, and an electrolyte. Although there is no particular limitation with respect to the types of the battery, the present invention is preferably applied to a lithium secondary battery. The electrode of the present invention is suitable for a negative electrode of a lithium secondary battery. An electrode that can be used as a positive electrode of a lithium secondary battery can be used as the counter electrode. A separator is disposed between the positive electrode and the negative electrode. A microporous film of polyolefin is preferably used as the separator. The lithium secondary battery includes a non-aqueous electrolyte with lithium ion conductivity.

As the positive electrode active material, a lithium-containing transition metal oxide such as lithium cobaltate ($LiCoO_2$), lithium nickelate ($LiNiO_2$), and lithium manganate ($LiMn_2O_4$) may be used, without limitation. The positive electrode active material layer may be formed only of a positive electrode active material, or may contain, for example, a binder and a conductive agent in addition to the positive electrode active material. When the positive electrode active material layer is formed only of a positive electrode active material, similarly to the negative electrode active material layer, the positive electrode active material layer may be formed of a plurality of columnar particles.

For the materials forming the positive electrode current collector, for example, Al, an Al alloy, and Ti may be used.

As a non-aqueous electrolyte with lithium ion conductivity, various lithium ion conductive solid electrolytes and non-aqueous liquid electrolytes may be used. The non-aqueous liquid electrolyte includes, for example, a non-aqueous solvent and a lithium salt dissolved therein. As the lithium salt, lithium hexafluorophosphate and lithium tetrafluoroborate are preferably used. As the non-aqueous solvent, carbonates such as ethylene carbonate, propylene carbonate, dimethyl carbonate, ethyl methyl carbonate, and diethyl carbonate are preferably used. As the lithium salt and the non-aqueous solvent, these materials may be used singly, or may be used in combination of two or more.

There is no particular limitation with respect to the material forming the separator, the material forming the battery case, and the material forming the sealing plate. For example, for the materials for the separator, battery case, and sealing plate, materials used for various form of lithium ion secondary batteries may be used.

The present invention can be applied to lithium secondary batteries of various shapes. There is no particular limitation with respect to the shape of the battery and the form of the sealing. Examples of the battery shape include a coin-type, a button-type, a sheet-type, a cylindrical-type, a flat-type, and a prism-type. There is no particular limitation with respect to the battery size as well. For example, the battery may be a small size battery used for, for example, small portable devices, or may be a large size battery used for, for example, electric cars. The present invention is particularly effective for folding-type batteries and wound-type batteries. The wound-type battery may be formed, for example, as shown in the following.

Figure 16:
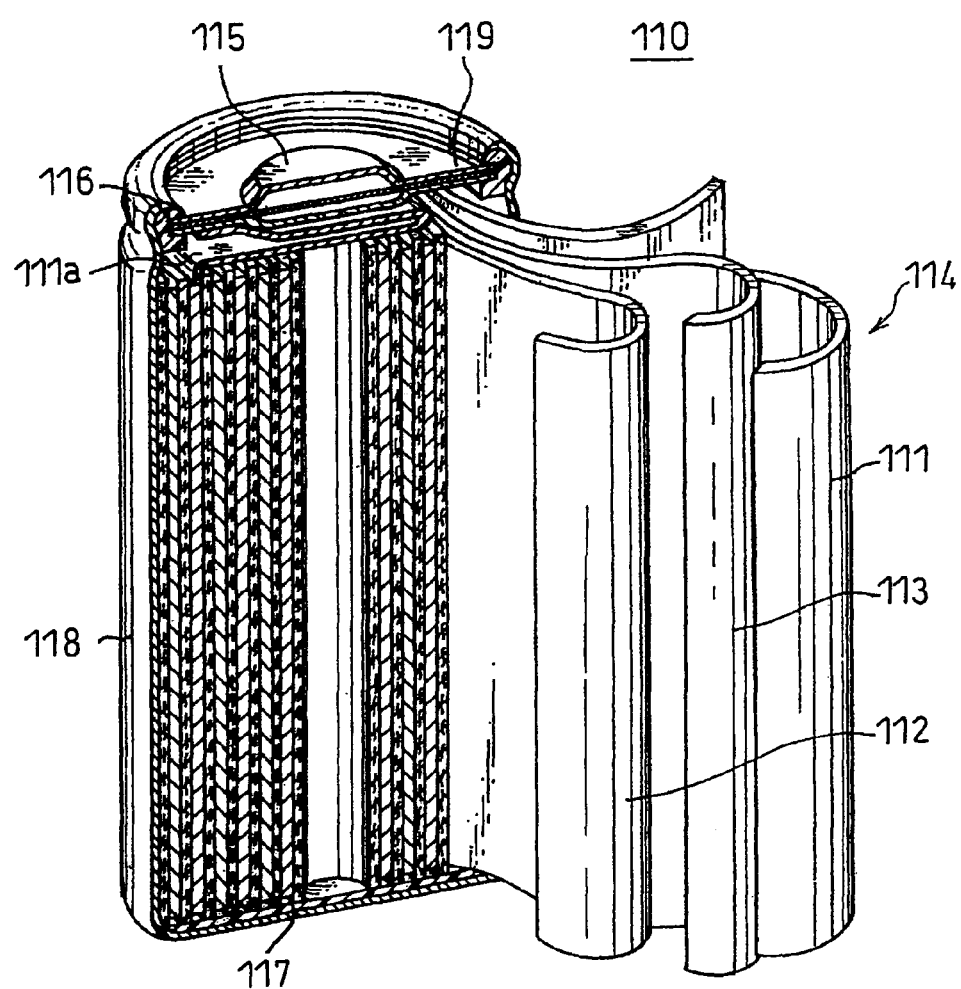
FIG. 16 is a perspective view illustrating a cross-sectional view of a wound-type lithium secondary battery in one embodiment of the present invention, partially developed.

FIG. 16 is a perspective view illustrating a cross-sectional view of a wound-type lithium secondary battery in one embodiment of the present invention, partially developed.

A battery 110 includes a wound-type electrode assembly 114, and a battery case 118 housing the assembly therein. The electrode assembly 114 is obtained by winding a strip positive electrode 111 and a strip negative electrode 112 with a wide separator 113 disposed therebetween. The electrode assembly 114 is impregnated with an electrolyte (not shown) having lithium ion conductivity. The opening of the battery case 118 is closed with a sealing plate 119 having a positive electrode terminal 115.

One end of, for example, an aluminum positive electrode lead 111a is connected to the positive electrode 111, and the other end thereof is connected to the reverse side of the sealing plate 119. At peripheral ends of the sealing plate 119, for example, a polypropylene insulating packing 116 is disposed. To the negative electrode 112, for example, one end of a copper negative electrode lead (not shown) is connected, and the other end thereof is connected to the battery case 118. On top and below the electrode assembly 114, an upper insulation ring (not shown), and a lower insulation ring 117 are disposed, respectively.

The positive electrode may include a positive electrode current collector, and a positive electrode active material layer carried thereon. Similarly, the negative electrode may include a negative electrode current collector and a negative electrode active material layer carried thereon. The positive electrode active material layer desorbs lithium ions during charge, and during discharge, absorbs lithium ions desorbed by the negative electrode active material. The negative electrode active material layer absorbs lithium ions desorbed by the positive electrode active material layer during charge, and desorbs lithium ions during discharge.

Figure 17:
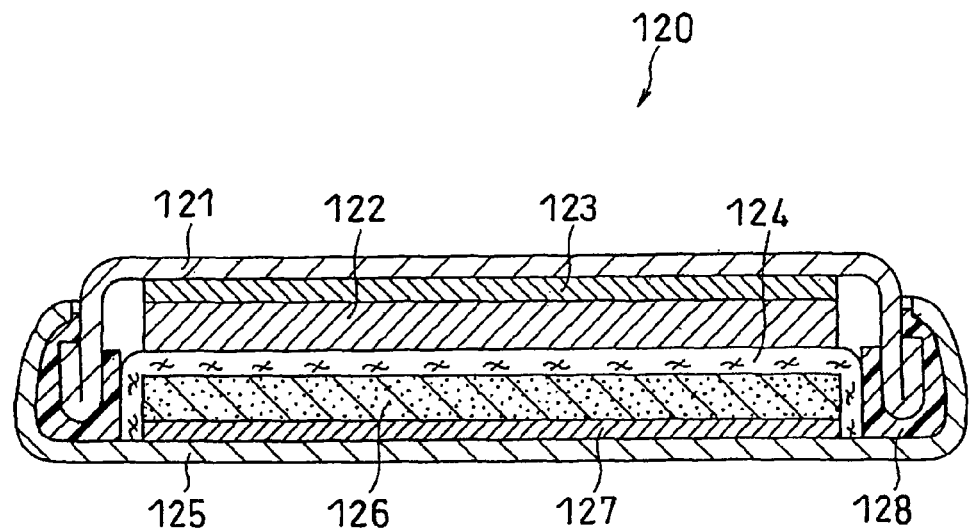
FIG. 17 is vertical cross sectional view schematically illustrating a coin-type lithium secondary battery in another embodiment of the present invention.

FIG. 17 shows a battery in another embodiment of the present invention. A coin-type battery 120 in FIG. 17 includes a positive electrode, a negative electrode, a separator 124, a non-aqueous electrolyte, and a battery case 125 housing these. The battery case 125 is sealed by clamping its opening end to the peripheral ends of the sealing plate 121 with an insulating packing 128 interposed therebetween.

The negative electrode includes a negative electrode current collector 123 and a negative electrode active material layer 122 carried thereon. The positive electrode includes a positive electrode current collector 127 and a positive electrode active material layer 126 carried thereon. The negative electrode current collector 123 is in contact with the sealing plate 121, and the positive electrode current collector 127 is in contact with the battery case 125.

The negative electrode active material layer 122 and the positive electrode active material layer 126 are facing each other with the separator 124 containing a non-aqueous electrolyte interposed therebetween.

Figure 18:
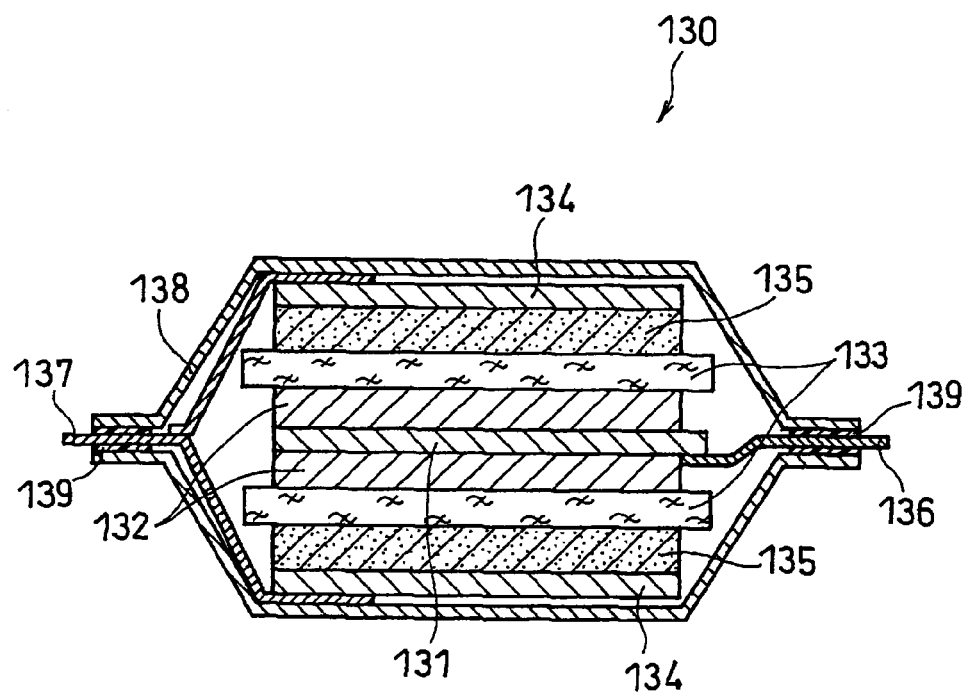
FIG. 18 is a vertical cross sectional view schematically illustrating a stack-type lithium secondary battery in still another embodiment of the present invention.

FIG. 18 shows a battery in still another embodiment of the present invention. A stack-type battery 130 in FIG. 18 includes a power generating element, a non-aqueous electrolyte (not shown), and a battery case 138 housing these. The power generating element includes a positive electrode, a negative electrode, and a separator 133 interposed therebetween. The positive electrode includes a positive electrode current collector 131 and a positive electrode active material layer 132 carried thereon. The negative electrode includes a negative electrode current collector 134 and a negative electrode active material layer 135 carried thereon.

The power generating element includes a stack in which the positive electrode and the negative electrode are stacked. In the positive electrode of the stack-type battery in FIG. 18, the positive electrode active material layer is carried on both sides of the positive electrode current collector. On both sides of the positive electrode, the negative electrodes are disposed with separators interposed therebetween. In the negative electrode, the negative electrode active material layer is formed only on one side of the negative electrode current collector, and the negative electrode active material layer faces the positive electrode active material layer with the separator interposed therebetween.

The battery case 138 includes openings at opposite sides. One end of a negative electrode lead 137 extends from one opening of the battery case 138 to the outside. The other end of the negative electrode lead 137 is connected to the side of the negative electrode current collector 134 where the active material layer is not formed. One end of a positive electrode lead 136 extends from the other opening of the battery case to the outside. The other end of the positive electrode lead 136 is connected to an exposed portion of the positive electrode current collector.

The openings of the battery case 138 are sealed by using a sealing agent 139.

In the stack-type battery, three layers or more of the positive electrode and the negative electrode may be formed. In this case, a positive electrode including a positive electrode active material layer on one side or both sides, and a negative electrode including a negative electrode active material layer on one side or both sides are used preferably so that all the positive electrode active material layers face the negative electrode active material layer and all the negative electrode active material layers face the positive electrode active material layer. The position of the negative electrode and the positive electrode may be switched.

(Embodiment 2)

Figure 19:
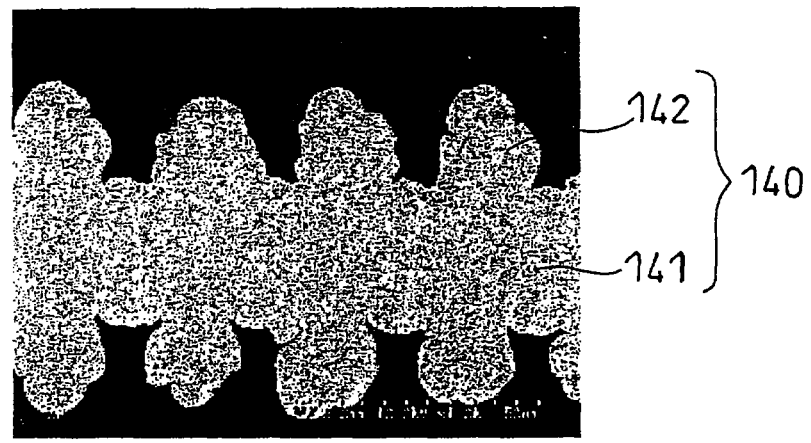
FIG. 19 is a schematic diagram illustrating a cross-sectional view of still another example of a current collector of the present invention in the direction parallel to the normal.

A current collector for batteries in another embodiment of the present invention is described with reference to the figures. FIG. 19 shows a current collector in another embodiment of the present invention. A current collector 140 in FIG. 19 includes a base portion 141 including a flat face, and primary projections 142 projecting from the flat face, and the roughening rate of the top of the primary projections 142 is 3 or more and 20 or less. In the current collector, the primary projections are preferably arranged regularly.

The roughening rate is described next. In the present invention, the roughening rate refers to the ratio of the surface area of a predetermined region of the top of the primary projections relative to the apparent area of the predetermined region. That is, the roughening rate is defined as, a surface area of a predetermined region of the top of the primary projections/ apparent area of the region.

The surface area of a predetermined region of the top of the primary projections refers to a surface area obtained by measuring the above-mentioned region in the direction normal to the surface of the current collector by using a laser microscope.

Examples of the laser microscope include a super-depth profilometry microscope VK-8500 manufactured by Keyence corporation, without limitation. Because laser is used in this measuring method, the analysis is conducted nondestructively, and the measuring method is easy.

When measuring the surface area, because laser is applied to the current collector in the direction normal to the surface of the current collector, the projections and recesses at portions shadowed by, for example, the primary projections with respect to the laser, are not included in the surface area.

The apparent area refers to an area (projection area) of the region seen in the direction normal to the surface of the current collector.

The predetermined region refers to, when a characteristic length, such as a length of a side and a diameter, is set as W in the shape of the primary projections seen in the direction normal to the current collector surface, a region that is similar to the shape of the primary projections and having a length of W/2 of the characteristic length.

Figure 20:
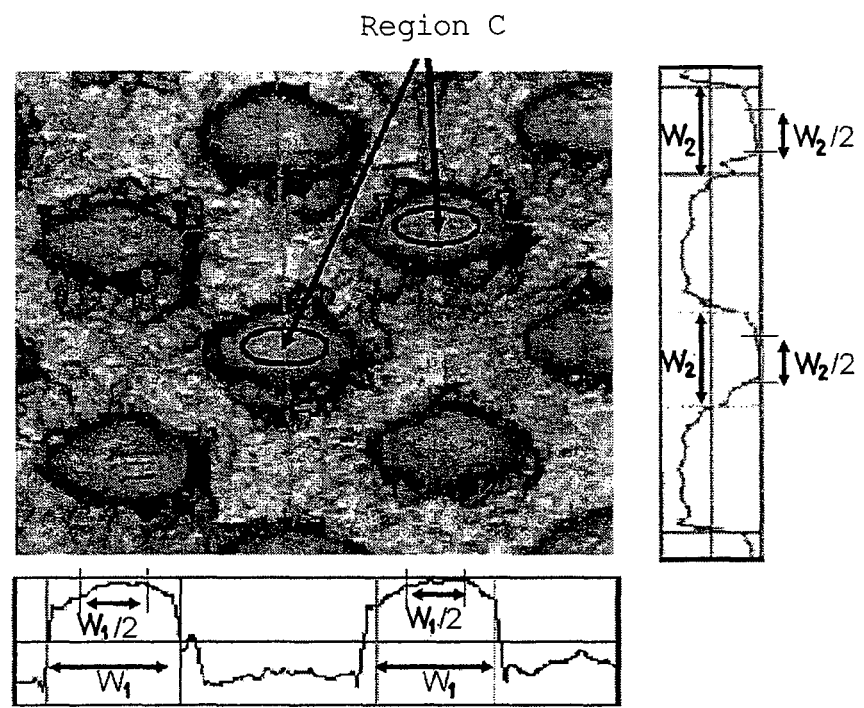
FIG. 20 is an electron micrograph for illustrating a range for a measurement of the roughening rate of the top of the primary projections.

To be specific, FIG. 20 shows a result of laser microscope observation of an example of a current collector on which substantially diamond-shaped primary projections are formed. As shown in the laser micrograph in FIG. 20, when the shape of the primary projections seen in the direction normal to the surface of the current collector is substantially diamond-shaped, the length of the major axis is $W_1$, and the length of the minor axis is $W_2$, the predetermined region (region C) refers to a region that is similar to the shape of the primary projections, and that has a major axis length of $W_1/2$ and a minor axis length of $W_2/2$.

By setting the roughening rate of the top of the primary projections provided on the current collector to 3 or more, an area where the primary projections and the active material layer closely contact becomes large enough. Therefore, even when an active material that has high capacity and undergoes large volume change during charge and discharge is used, sufficient durability for the stress at the time of active material expansion can be achieved, and separation of the active material from the current collector can be prevented sufficiently. Therefore, by using the current collector, cycle performance of the battery can be improved.

When the roughening rate is greater than 20, the minute projections formed by roughening the top of the primary projections will become very bulky. Therefore, when an active material layer is provided on the current collector, the ratio of the thickness of the current collector relative to the active material layer becomes high compared with a current collector with a roughening rate of 20 or less. That is, the thickness of the current collector relative to the electrode thickness becomes large. This may render the battery energy density small. Furthermore, because the grooves formed on the surface of the primary projections become fine, when an active material precursor or an active material is deposited on the current collector surface, the active material hardly enters into the groove. Thus, a high roughening rate may not be used effectively.

The roughening rate of the primary projections can be controlled by providing predetermined projections and recesses on the primary projections. For example, by providing secondary projections smaller than the primary projections on the primary projections, and adjusting the diameter and height of the secondary projections, and distance between adjacent secondary projections, the roughening rate can be controlled. The secondary projections may be provided on the primary projections by, for example, plating and a blast treatment, similarly to Embodiment 1.

The primary projections may be made, as described in embodiment 1, by for example, plating, and roll-pressing.

The roughening rate of the flat portion of the current collector is preferably 3 or more and 20 or less as well. By setting the roughening rate of the flat portion to the range, the primary projections with the roughening rate of the top of 3 to 20 can be easily formed on both sides of the current collector. Furthermore, even when the active material is deposited on the flat portion of the current collector, adhesion between the flat portion and the active material can be improved.

The roughening rate of the primary projections of the current collector with the active material layer deposited thereon can also be obtained by eluting only the current collector by using, for example, an aqueous solution of ferric chloride with a concentration of about 30 wt %, and measuring the face of the active material layer that was in contact with the current collector by using the above-described method.

In an electrode using a current collector of this embodiment as well, preferably, the active material layer includes a plurality of columnar particles, and the columnar particles are carried on the primary projections. Such an active material layer can be formed by using the deposition apparatus in FIG. 11 or the deposition apparatus in FIG. 14 as described above.

The growth direction of the columnar particles may be tilted with respect to the direction normal to the current collector, or may be substantially parallel to the direction normal to the current collector. The columnar particles may be formed of a single part, or may be formed of a plurality of grain layers. As described above, for example, by forming the columnar particles by a plurality of grain layers, the average growth direction of the columnar particles can be made substantially parallel to the direction normal to the current collector.

In this embodiment as well, for the materials forming the current collector and the primary projections, and further for the active material deposited on the current collector, materials described in Embodiment 1 may be used.

Because the material containing silicon element is a material that undergoes large expansion and contraction associated with lithium ion intercalation and deintercalation, it is important to inhibit the separation of the material from the current collector in order to improve cycle performance. Effects obtained by setting the roughening rate of the top of the primary projections to 3 to 20 become notable when using a material that undergoes a large volume change at the time of charge and discharge.

In this embodiment as well, the primary projections are preferably disposed regularly, as shown in FIG. 15. That is, the primary projections are preferably disposed, at intersection points of a plurality of first virtual straight lines disposed parallel to one another with a first pitch in the flat face of the base portion, and a plurality of second virtual straight lines disposed perpendicular to the first virtual straight lines with a second pitch that is smaller than the first pitch in the flat face; and at the center of a rectangle formed by two adjacent first virtual straight lines and two adjacent second virtual straight lines.

Furthermore, when the base portion is long, one of the first virtual straight lines or the second virtual straight lines is preferably parallel to the longitudinal direction of the base portion, and particularly, the first virtual straight lines are preferably parallel to the longitudinal direction. Ratio $P_1/S_1$ is preferably ½ or more and below 1.

Direction E that is a projection of the direction of the active material deposition on the surface of the current collector is preferably perpendicular or substantially perpendicular to maximum diameter $P_1$ of the primary projections. Direction E is further preferably parallel to longitudinal direction T of the base portion.

Pitch S of the primary projections, first pitch $S_1$, and second pitch $S_2$ may be within the range of 3 to 100 μm as in Embodiment 1.

In this embodiment as well, the thickness of the active material layer may be the same as in Embodiment 1, and preferably 5 μm or more and 50 μm or less and particularly preferably 5 μm or more and 30 μm or less.

The dimensions of the primary projections and the porosity of the active material layer may be the same as in Embodiment 1. In this embodiment as well, similarly to the above-described Embodiment 1, the primary projections are preferably disposed regularly.

EXAMPLE

In the following, the present invention is described in detail based on examples, but the present invention is not limited to the following examples.

Example 1-1

(i) Current Collector Preparation
First Step

A dry film resist with a thickness of 25 μm (manufactured by Hitachi Chemical Co., Ltd.) was attached on a rolled copper foil with a thickness of 18 μm, serving as a starting material.

Figure 21:
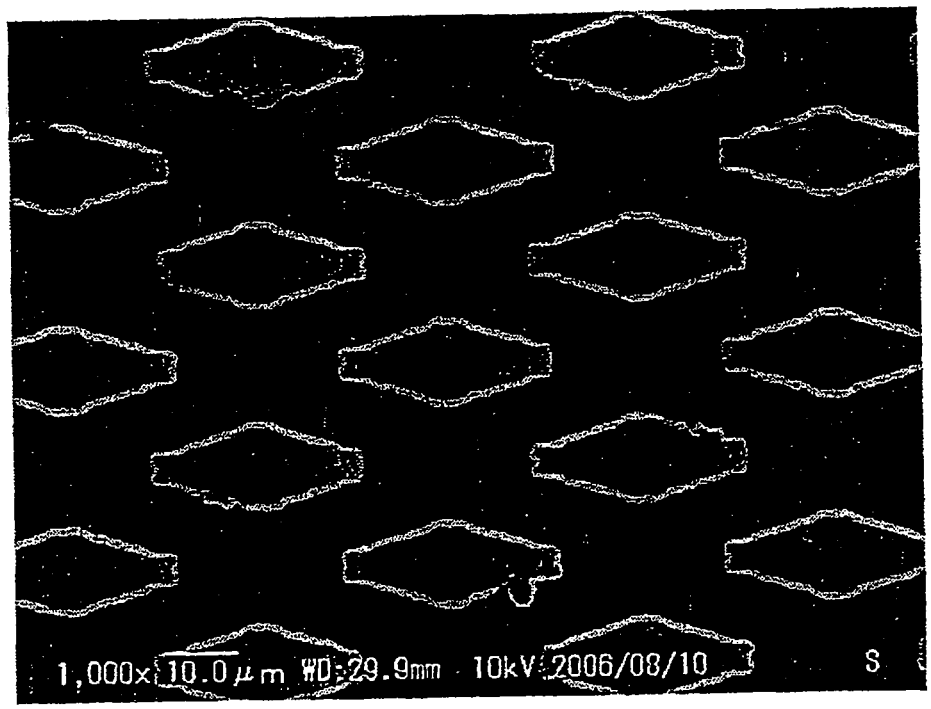
FIG. 21 is an electron micrograph showing a top view of a substrate having the primary projections formed in Example 1-1.
Figure 22:
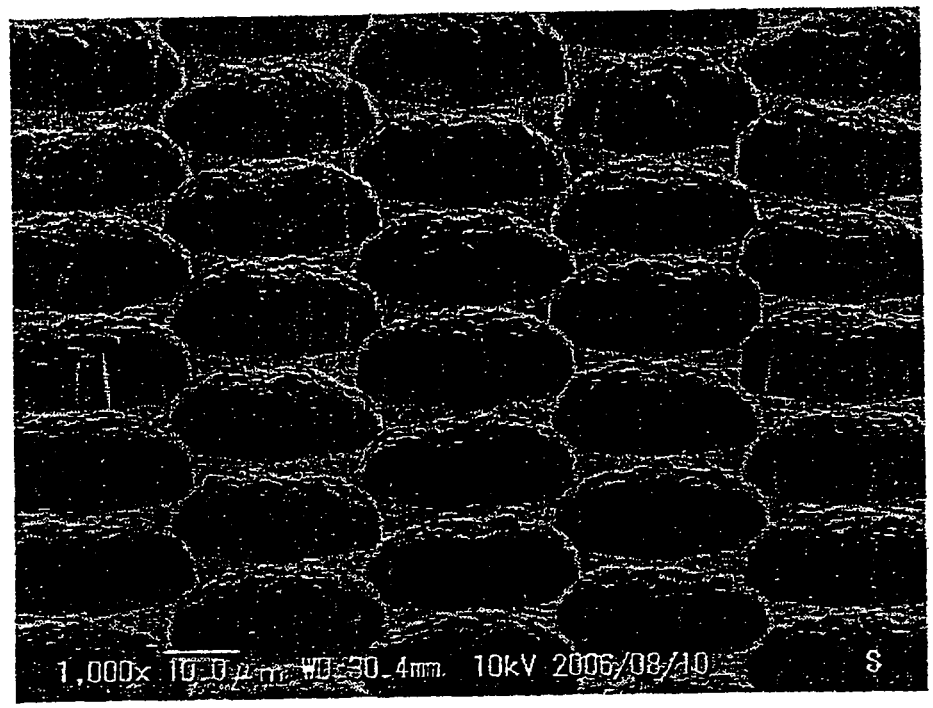
FIG. 22 is an electron micrograph showing a top oblique view of the substrate having the primary projections formed in Example 1-1.

A glass mask with a substantially diamond-shaped dot pattern was disposed on the dry film resist. Using a parallel exposure device, i-ray (ultraviolet ray having a wavelength of 365 nm) was applied over the mask to expose the resist. Afterwards, development was carried out by using an aqueous alkaline solution to form openings of a predetermined pattern on the resist. Then, copper was precipitated by plating on the substantially diamond-shaped openings thus formed. Afterwards, the resist was removed to obtain a sheet substrate having the substantially diamond-shaped primary projections. FIG. 21 is an electron micrograph of the surface of the obtained substrate. FIG. 22 is an electron micrograph showing a top oblique view of the same substrate.

The height of the substantially diamond-shaped primary projections was 10 μm, and the lengths of two diagonal lines of the substantial diamond were 28 μm and 12 μm. The surface roughness (ten-point average height) $Rz_1$ of the top of the primary projections was 0.9 μm. The surface roughness (ten-point average height) $Rz_0$ of the flat face between the primary projections, that is, the surface roughness of the rolled copper foil as the starting material was 0.2 μm (plane roughness 0.6 μm).

In the present invention, the measurement of the surface roughness of the current collector such as Ra, $Rz_0$, $Rz_1$, and $Rz_2$ was carried out based on a line roughness obtained by using a confocal laser microscope (VK-8500 manufactured by Keyence Corporation). With the confocal laser microscope, regarding the surface roughness, two types of roughness, i.e., a line roughness and a plane roughness, can be measured. When a plane roughness is measured for a sample (for example, metal) with a large degree of projections and recesses on its surface, and a high light reflection, halation is caused and the difference between a bright section and a dark section becomes large, and height information may not be obtained accurately. On the other hand, because halation does not tend to affect the measurement of the line roughness, even when a sample with a high light reflection is measured, accurate height information is easily obtained. Furthermore, JIS B 0601-1994 shows that the ten-point average roughness Rz and the arithmetic average roughness Ra in the surface roughness can be obtained based on a roughness curve of a sampling length. Therefore, the inventors of the present invention carried out the measurement of the surface roughness based on the line roughness, and also carried out, as necessary, the measurement of the plane roughness.

Figure 23:
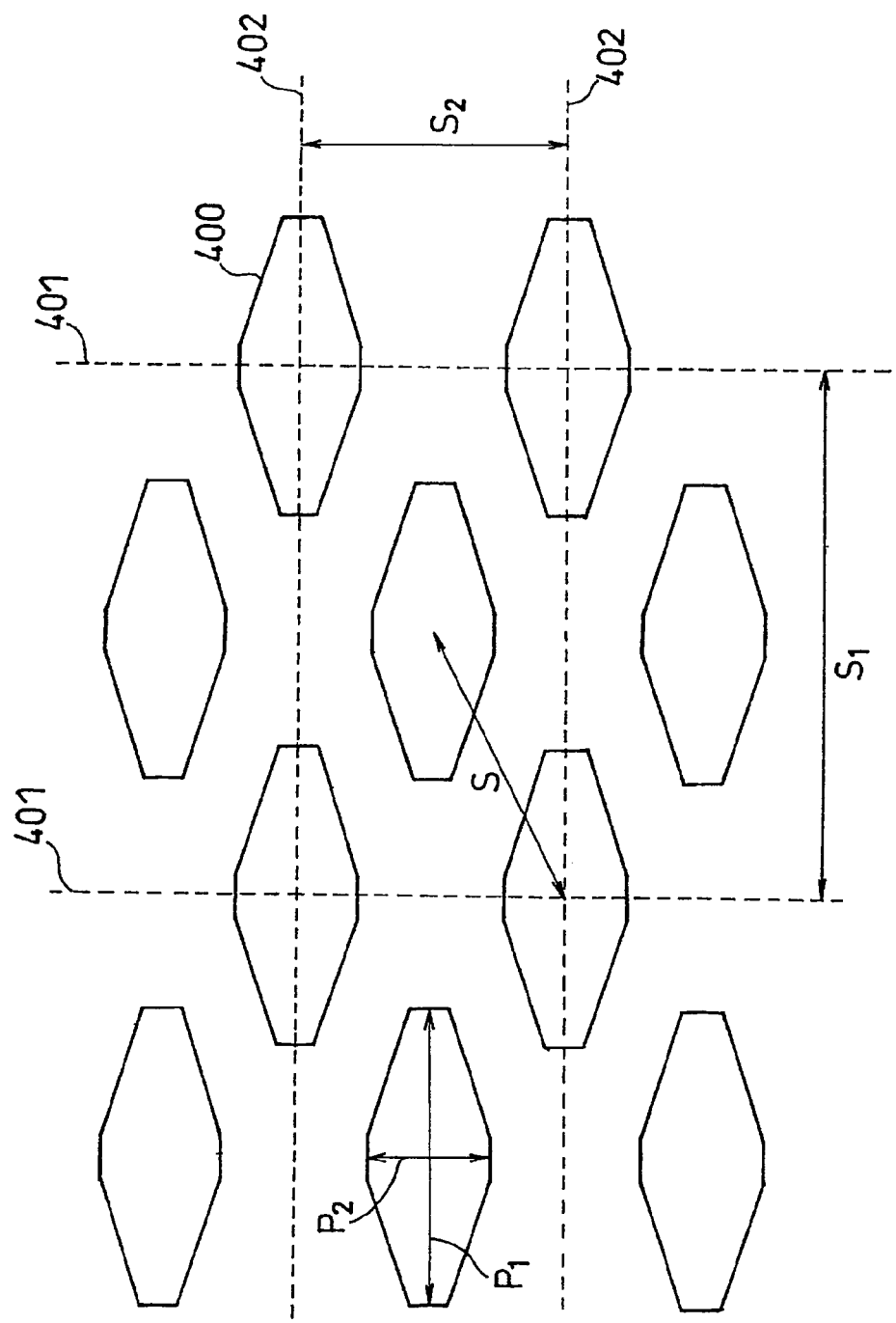
FIG. 23 is a schematic diagram for illustrating dimensions of the primary projections.

The dimensions of the primary projections immediately after the formation were as follows. Length $P_1$ and $P_2$ of the diagonal lines of primary projections 400, pitch S between the primary projections 400, pitch $S_1$ of first virtual straight lines 401, and pitch $S_2$ of second virtual straight lines 402 are as shown in FIG. 23.

Length $P_1$ and $P_2$ of Diagonal Lines of Primary Projections: $P_1$: 28 μm, $P_2$: 12 μm
 Height H of Primary Projections: 10 μm
 Pitch S between Primary Projections: 27 μm
 Pitch $S_1$ between First Virtual Straight Lines: 50 μm
 Pitch $S_2$ between Second Virtual Straight Lines: 24 μm
 Ten-point Average Roughness $Rz_1$ of Top of Primary Projections: 0.9 μm
 Ten-point Average Roughness $Rz_0$ of Flat Face between Primary Projections: 0.2 μm (plane roughness 0.6 μm)
Second Step A two-phase plating treatment was carried out on a sheet substrate having the primary projections.

In the first phase, a particulate precipitate was precipitated on the top of the substantially diamond-shaped primary projections. In the second phase, secondary projections were obtained by forming a coating on the surface of the particulate precipitate. The composition of the plating solution and the plating conditions in each phase were as shown in Table 1. The limiting current density in the first phase was 2.5 A/dm$^2$, and the limiting current density in the second phase was 27.5 A/dm$^2$.

TABLE 1

| | | Unit | First Phase | Second Phase |
|---|---|---|---|---|
| Plating Solution Composition | CuSO$_4$ · 5H$_2$O Concentration (Copper Ion Concentration) | g/L | 50 (12.7) | 250 (63.6) |
| | H$_2$SO$_4$ | g/L | 100 | 100 |
| Plating Conditions | Solution Temperature | °C. | 27 | 50 |
| | Current Density | A/dm$^2$ | 10 | 5 |
| | Electrodeposition Time | Sec | 30 | 80 |

Third Step

The obtained current collector was immersed in an ethanol solution containing 3 wt % of 1H-benzotriazole for 15 seconds, washed with water and dried, carrying out a rust preventative treatment.

Figure 24:
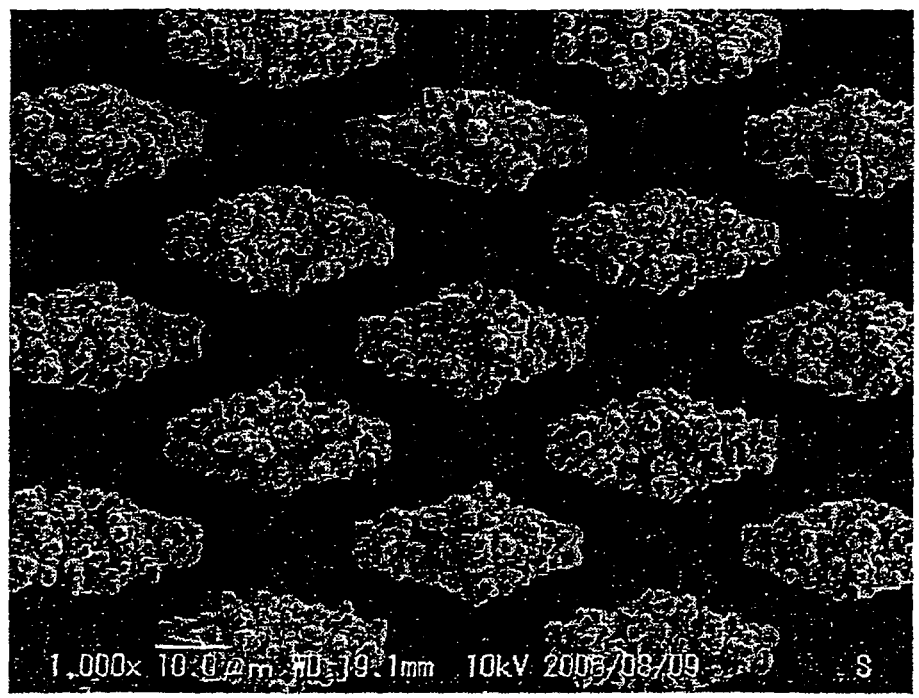
FIG. 24 is an electron micrograph showing a top view of a current collector in Example 1-1.
Figure 25:
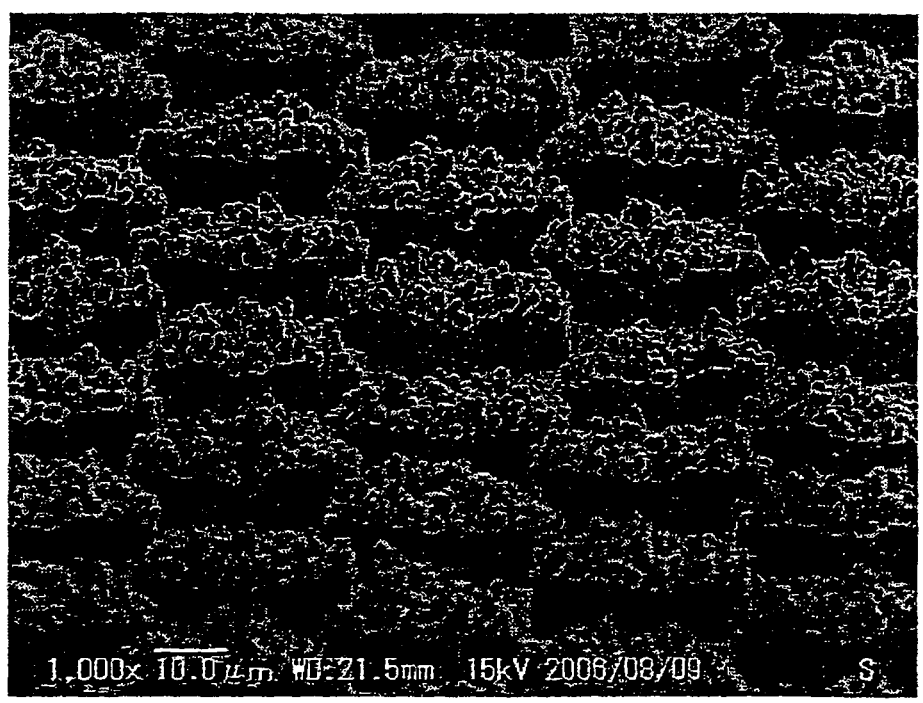
FIG. 25 is an electron micrograph showing a top oblique view of the current collector in Example 1-1.

FIG. 24 is an electron micrograph of the surface of the current collector. FIG. 25 is an electron micrograph of an oblique top view of the current collector.

The surface roughness (ten-point average height) $Rz_2$ of the top of the primary projections including the secondary projections was 8.2 μm (plane roughness 26.0 μm), and $Rz_2/Rz_0$ was 41 (plane roughness ratio 43.3).

After the formation of the secondary projections (that is, after plating), the dimensions of the primary projections, and the dimensions of the secondary projections were as follows.

Length $P_1$ and $P_2$ of Diagonal Lines of Primary Projections: $P_1$: 33 μm, $P_2$: 15 μm
 Height H of Primary Projections: 14.5 μm
 Pitch S between Primary Projections: 27 μm
 Pitch $S_1$ between First Virtual Straight Lines: 50 μm
 Pitch $S_2$ between Second Virtual Straight Lines: 24 μm
 Average Diameter d of Secondary Projections: 2.5 μm
 Average Height h of Secondary Projections: 4.4 μm
 Average Projection Pitch s of Secondary Projections: 3.4 μm
 Ten-point Average Height $RZ_2$: 8.2 μm (plane roughness 26.0 μm)
 Arithmetic Average Roughness Ra: 1.7 μm
 Ratio $P_1/S_1$: 0.66

As shown in FIG. 23, the primary projections are disposed, at intersection points of a plurality of first virtual straight lines disposed parallel to one another with a first pitch in the flat face of the base portion, and a plurality of second virtual straight lines disposed perpendicular to the first virtual straight lines with a second pitch that is smaller than the first pitch in the flat face; and at the center of a rectangle formed by two adjacent first virtual straight lines and two adjacent second virtual straight lines. In this example, the plurality of primary projections were disposed so that their centers substantially coincide with the intersection points and the center of the rectangle. Also, the primary projections were also disposed so that maximum diameter $P_1$ of the primary projections was perpendicular to the longitudinal direction of the current collector.

The primary projections were disposed in such a manner in the following examples as well.

Average diameter d, average height h, and average projection pitch s of the secondary projections are the average values for ten or ten sets of the secondary projections. This also applies to the following examples and comparative examples.

As is clear from FIG. 24, the secondary projections are particulate. Also, most of their maximum diameters were larger than their root diameters.

(ii) Negative Electrode Preparation

A negative electrode was obtained by allowing an active material formed of SiO$_{0.5}$ to be carried on both sides of the obtained current collector by a deposition method using an electron beam (EB). A deposition apparatus shown in FIG. 11 and a silicon simple substance target were used, and oxygen was introduced in the chamber of the deposition apparatus. The direction of the active material deposition projected on the surface of the current collector was substantially perpendicular to maximum diameter $P_1$ of the primary projections.

Figure 26:
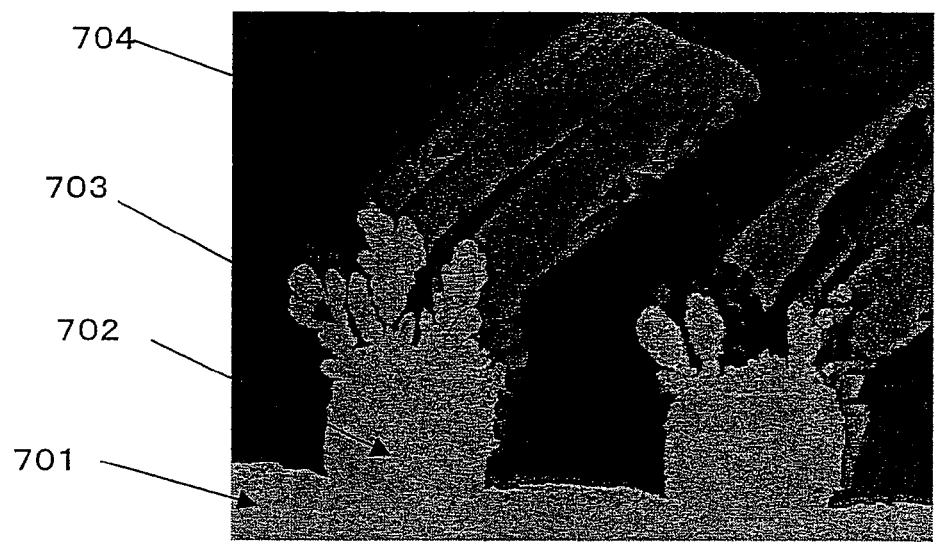
FIG. 26 is an electron micrograph showing a cross-sectional view of a negative electrode plate in Example 1-1.

The conditions for the deposition were as follows.
 Acceleration Voltage of EB Applied to Target: −10 kV
 Emission Current: 600 mA
 Oxygen Flow Rate: 50 sccm (standard cc/min)
 Substrate (Current Collector) Feeding Speed: 2 cm/min FIG. 26 shows a scanning electron micrograph of a cross-section of the obtained negative electrode. It was found that the active material forms columnar particles 704 tilted with respect to the direction normal to the current collector (direction normal to a base portion 701). All of the columnar particles 704 were bonded to the top of the primary projections 702 including secondary projections 703. The thickness of the active material layer was 24 μm.

(iii) Positive Electrode Preparation

A positive electrode material mixture paste was prepared by sufficiently mixing 100 parts by weight of lithium cobaltate ($LiCoO_2$) powder with an average particle size of about 10 μm as the positive electrode active material, 3 parts by weight of acetylene black as the conductive agent, and 8 parts by weight of polyvinylidene fluoride powder as the binder, and an appropriate amount of N-methyl-2-pyrrolidone (NMP).

The obtained paste was applied on one side of a positive electrode current collector of aluminum foil with a thickness of 20 μm, dried, and rolled, thereby forming a positive electrode active material layer. The thickness of the positive electrode active material layer was set to about 75 μm. Afterwards, the positive electrode current collector carrying the active material layer was cut to give a strip size that was appropriate for the electrode assembly preparation, thus producing a positive electrode. A positive electrode lead was welded to the reverse side of the positive electrode current collector where the active material layer was not carried, in the proximity of one end of the positive electrode in its longitudinal direction.

(iv) Electrode Assembly Preparation

A cylindrical-type electrode assembly was formed by allowing the positive electrode active material layer and the negative electrode active material layer to face each other with a separator interposed therebetween, and winding the positive electrode and the negative electrode. For the separator, a polyethylene microporous film with a thickness of 20 μm was used.

(v) Battery Preparation

The obtained electrode assembly was inserted into a battery case, and afterwards, a non-aqueous electrolyte was injected in the case. The non-aqueous electrolyte was prepared by dissolving $LiPF_6$, with a concentration of 1 mol/L, in a 1:1 volume ratio solvent mixture of ethylene carbonate and diethyl carbonate. A vacuum state was achieved inside the case, the electrode assembly was impregnated with the non-aqueous electrolyte, and afterwards, the case was sealed. A cylindrical-type battery shown in FIG. 16 was thus made.

[Evaluation]

(i) Electrode Evaluation

The bonding strength (tacking strength) between the active material and the current collector in the negative electrode thus made was measured by a tacking tester (TAC-II manufactured by Rhesca Company Limited). The negative electrode was cut to give a size of 2 cm×3 cm, and fixed with a double-sided tape at a negative electrode position facing the probe of the tacking tester. The negative electrode was connected to the end of the probe (end diameter of 2 mm) with a double-sided tape (No. 515 manufactured by Nitto Denko Corporation). The measurement was carried out with a push-in speed of 30 mm/min, a push-in time of 10 seconds, a load of 400 gf, and a pull-up speed of 600 mm/min. As a result of the testing, the tacking strength was 27.9 kgf/cm².

(ii) Battery Evaluation

Cycle performance of the battery thus made was evaluated as follows.

The battery made was charged and discharged for 8 cycles at a charge and discharge rate of 0.1 C (a current value by which 10 hours are required to charge or discharge a quantity of electricity equivalent to the nominal capacity). Afterwards, charge and discharge was carried out for 100 cycles at a charge and discharge rate of 1 C (a current value by which an hour is required to charge or discharge a quantity of electricity equivalent to the nominal capacity). The charge end voltage was set to 4.05 V, and discharge end voltage was set to 2.0 V. The capacity retention rate at 100th cycle when the discharge capacity at the 1st cycle was regarded as 100% was 92%.

Example 1-2

Figure 27:
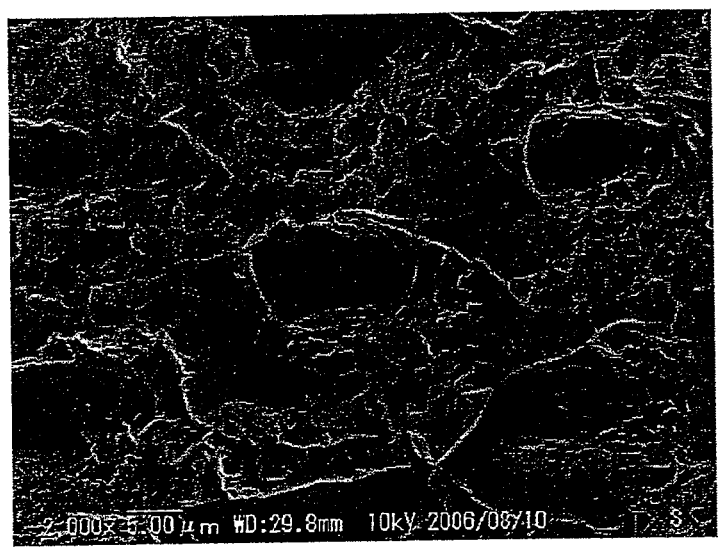
FIG. 27 is an electron micrograph showing a top view of a substrate having the primary projections formed in Example 1-2.
Figure 28:
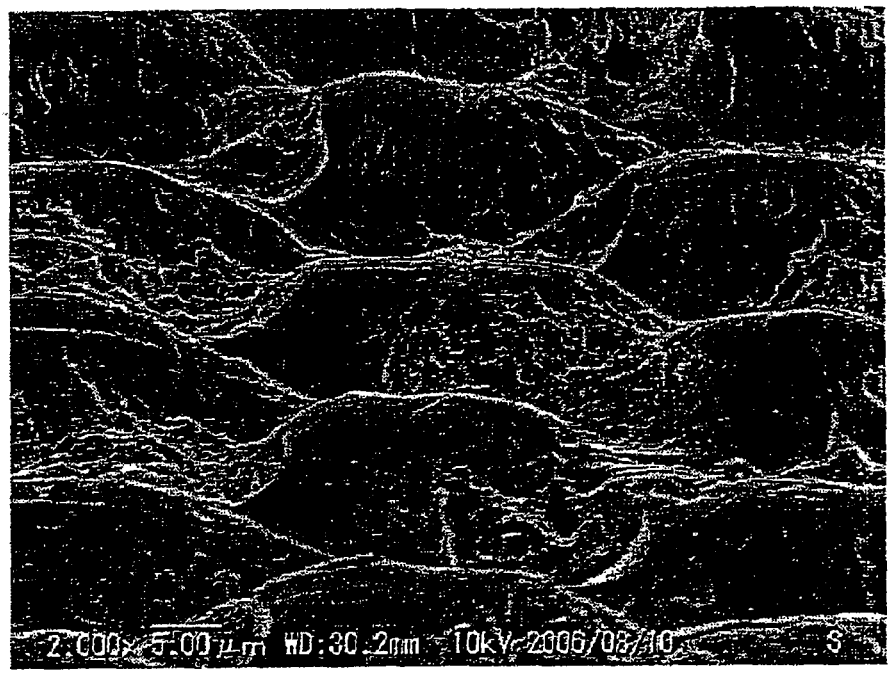
FIG. 28 is an electron micrograph showing a top oblique view of a substrate having the primary projections formed in Example 1-2.

In the preparation of the negative electrode current collector, instead of carrying out the first step by plating, a copper foil with a thickness of 20 μm was passed between a pair of rollers on each of which substantially diamond-shaped recessed portions were disposed in a regular pattern. A stainless steel roller was used, and its line pressure was set to 1.5 t/cm. FIG. 27 is an electron micrograph of the surface of the obtained substrate. FIG. 28 is an electron micrograph showing a top oblique view of the same substrate.

After the first step, the height of the substantially diamond-shaped primary projections was 6 μm, and the lengths of two diagonal lines of the substantial diamonds were 28 μm and 12 μm, and pitch S was 20 μm. The surface roughness (ten-point average height) $Rz_0$ of the flat face between the primary projections was 0.2 μm (plane roughness 1.5 μm).

The dimensions of the primary projections immediately after the formation were as follows.

Length $P_1$ and $P_2$ of Diagonal Lines of Primary Projections: $P_1$: 28 μm, $P_2$: 12 μm Height H of Primary Projections: 6 μm Pitch S between Primary Projections: 20 μm Pitch $S_1$ between First Virtual Straight Lines: 38 μm Pitch $S_2$ between Second Virtual Straight Lines: 19 μm Ten-point Average Roughness $Rz_0$ of Flat Face between Primary Projections: 0.2 μm (plane roughness 1.5 μm)

A current collector was made in the same manner as in Example 1-1 except for the above.

Figure 29:
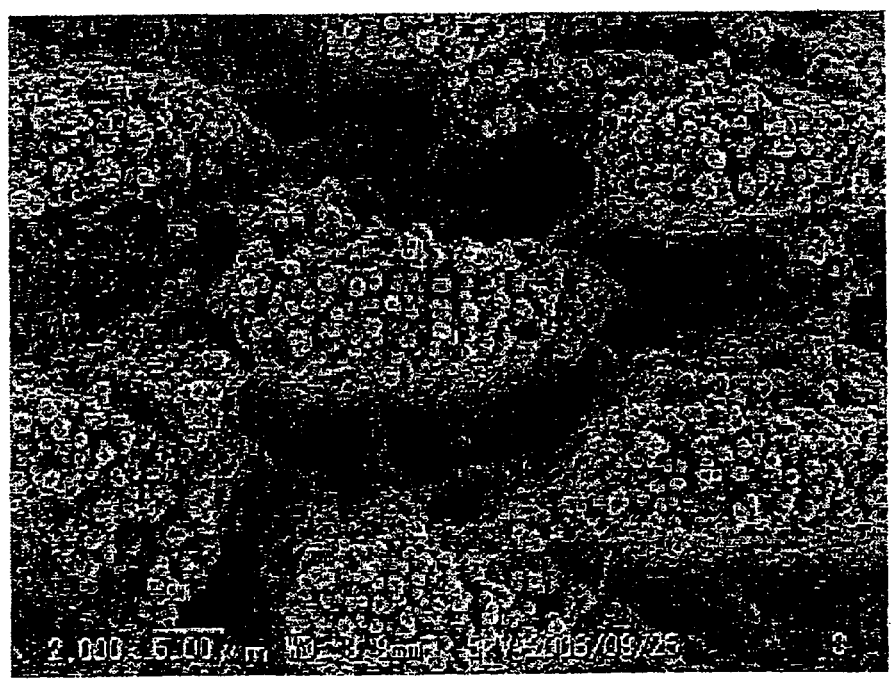
FIG. 29 is an electron micrograph showing a top view of a current collector in Example 1-2.
Figure 30:
FIG. 30 is an electron micrograph showing a top oblique view of a current collector in Example 1-2.

After the second step, the surface roughness (ten-point average height) $Rz_2$ of the top of the primary projections including the secondary projections was 3 μm (plane roughness 8.2 μm). Therefore, $RZ_2/Rz_0$ was 15 (plane roughness ratio 5.4). FIG. 29 is an electron micrograph of the surface of the obtained current collector. FIG. 30 is an electron micrograph showing a top oblique view of the current collector. As is clear from FIG. 30, the secondary projections are particulate. Also, most of their maximum diameters were larger than their root diameters.

After the formation of the secondary projections (that is, after plating), the dimensions of the primary projections, and the dimensions of the secondary projections were as follows.

Length $P_1$ and $P_2$ of Diagonal Lines of Primary Projections: $P_1$: 32 μm, $P_2$: 15 μm Height H of Primary Projections: 7.2 μm Pitch S between Primary Projections: 20 μm Pitch $S_1$ between First Virtual Straight Lines: 38 μm Pitch $S_2$ between Second Virtual Straight Lines: 19 μm Average Diameter d of Secondary Projections: 0.56 μm Average Height h of Secondary Projections: 1.1 μm Average Projection Pitch s of Secondary Projections: 0.85 μm Ten-point Average Height $Rz_2$: 3 μm (plane roughness 8.2 μm)

Arithmetic Average Roughness Ra: 0.79 μm

Ratio $P_1/S_1$: 0.84

A negative electrode was made and further a battery was made in the same manner as in Example 1-1, except that the current collector made in this example was used. As a result of evaluating the obtained negative electrode and battery in the same manner as in Example 1-1, it was found that the tacking strength of the negative electrode was 26.3 kgf/cm², and the capacity retention rate at the 100th cycle was 90%.

Comparative Example 1-1

A negative electrode was made and further a battery was made in the same manner as in Example 1-1, except that in the preparation of the negative electrode current collector, the second step was not carried out after the first step (the secondary projections were not formed). As a result of evaluating the obtained negative electrode and battery in the same manner as in Example 1, it was found that the tacking strength of the negative electrode was 23.3 kgf/cm², and the capacity retention rate at the 100th cycle was 75%.

The dimensions of the primary projections thus formed were as follows.
Length $P_1$ and $P_2$ of Diagonal Lines of Primary Projections: $P_1$: 28 μm, $P_2$: 12 μm
Height H of Primary Projections: 10 μm
Pitch S between Primary Projections: 27 μm
Pitch $S_1$ between First Virtual Straight Lines: 50 μm
Pitch $S_2$ between Second Virtual Straight Lines: 24 μm
Ten-point Average Roughness $Rz_1$ of Top of Primary Projections: 0.9 μm
Ten-point Average Roughness $Rz_0$ of Flat Face between Primary Projections: 0.2 μm (plane roughness 0.6 μm)
Ratio $P_1/S_1$: 0.56

Comparative Example 1-2

A negative electrode was made and further a battery was made in the same manner as in Example 1-2, except that in the preparation of the negative electrode current collector, the second step was not carried out after the first step (the secondary projections were not formed). As a result of evaluating the obtained negative electrode and battery in the same manner as in Example 1-1, it was found that the tacking strength of the negative electrode was 20.2 kgf/cm², and the capacity retention rate at the 100th cycle was 70%.

The dimensions of the primary projections thus formed were as follows.
Length $P_1$ and $P_2$ of Diagonal Lines of Primary Projections: $P_1$: 28 μm, $P_2$: 12 μm
Height H of Primary Projections: 6 μm
Pitch S between Primary Projections: 20 μm
Pitch $S_1$ between First Virtual Straight Lines: 38 μm
Pitch $S_2$ between Second Virtual Straight Lines: 19 μm
Ten-point Average Roughness $Rz_0$ of Flat Face between Primary Projections: 0.2 μm (plane roughness 1.5 μm)
Ratio $P_1/S_1$: 0.74

Example 1-3

In the preparation of the negative electrode current collector, the first step was carried out in the same manner as in Example 1-2. The dimensions of the primary projections thus formed were as follows.
Length $P_1$ and $P_2$ of Diagonal Lines of Primary Projections: $P_1$: 28 μm, $P_2$: 12 μm
Height H of Primary Projections: 6 μm
Pitch S between Primary Projections: 20 μm
Pitch $S_1$ between First Virtual Straight Lines: 38 μm
Pitch $S_2$ between Second Virtual Straight Lines: 19 μm
Ten-point Average Roughness $Rz_0$ of Flat Face between Primary Projections: 0.2 μm (plane roughness 1.5 μm)
Afterwards, as the second step, wet blast treatment was carried out for the sheet substrate having the primary projections thus made. The blasting agent was caused to be collided from an upper side and a lower side, with both sides of the substrate while the substrate was passed through the nozzles set above and below the substrate. Alumina powder with an average particle size of 7 μm was used as the blasting agent. As a result, projections and recesses were formed on the top of the primary projections, thereby obtaining secondary projections. Table 2 shows the conditions of the wet blast treatment.

TABLE 2

| Conditions | Air Pressure (MPa) | Moving Speed of Base Material (m/min) | Tacking Strength (kgf/cm²) | Capacity Retention Rate (%) |
|---|---|---|---|---|
| A | 0.25 | 0.1 | 25.0 | 85 |
| B | 0.20 | 1.2 | 24.3 | 82 |
| C | 0.10 | 3.0 | 24.0 | 80 |

FIG. 31 is an electron micrograph of the surface of the current collector made under condition C.

The surface roughness (ten-point average height) $Rz_2$ of the top of the primary projections including the secondary projections was 1 to 1.2 μm (plane roughness 2.0 to 2.4 μm).

The dimensions of the primary projections after forming the secondary projections were as follows.
Length $P_1$ and $P_2$ of Diagonal Lines of Primary Projections: $P_1$: 27 μm, $P_2$: 11 μM
Height H of Primary Projections: 5.5 μm
Pitch S between Primary Projections: 20 μm
Pitch $S_1$ between First Virtual Straight Lines: 38 μm
Pitch $S_2$ between Second Virtual Straight Lines: 19 μm
Ten-point Average Height $Rz_2$: 1 to 1.2 μm (plane roughness 2.0 to 2.4 μm)
Ratio $P_1/S_1$: 0.71

A negative electrode was made and further a battery was made in the same manner as in Example 1-1, except that the current collector made in this example was used. The obtained negative electrode and battery were evaluated in the same manner as in Example 1-1. The results are shown in Table 2.

Example 1-4

In the preparation of the negative electrode current collector, the first step was carried out in the same manner as in Example 1-1. The dimensions of the primary projections thus formed were as follows.
Length $P_1$ and $P_2$ of Diagonal Lines of Primary Projections: $P_1$: 28 μm, $P_2$: 12 μm
Height H of Primary Projections: 10 μm
Pitch S between Primary Projections: 27 μm
Pitch $S_1$ between First Virtual Straight Lines: 50 μm
Pitch $S_2$ between Second Virtual Straight Lines: 24 μm
Ten-point Average Roughness $Rz_1$ of Top of Primary Projections: 0.9 μm
Ten-Point Average Roughness $Rz_0$ of Flat Face between Primary Projections: 0.2 μm (plane roughness 0.6 μm)
Afterwards, as the second step, a wet blast treatment in the same manner as in Example 1-3 was carried out for the sheet substrate having the primary projections thus made, using alumina powder with an average particle size of 7 μm. As a result, projections and recesses were formed on the top of the primary projections, thereby obtaining secondary projections. Table 3 shows the conditions of the wet blast treatment.

TABLE 3

| Conditions | Air Pressure (MPa) | Moving Speed of Base Material (m/min) | Tacking Strength (kgf/cm$^2$) | Capacity Retention Rate (%) |
|---|---|---|---|---|
| A | 0.25 | 0.1 | 24.3 | 80 |
| B | 0.25 | 1.2 | 24.0 | 78 |
| C | 0.15 | 3.0 | 24.0 | 77 |

FIG. 32 is an electron micrograph of the surface of the current collector made under condition A.

The surface roughness (ten-point average height) $Rz_2$ of the top of the primary projections including the secondary projections was 0.9 to 1.1 µm (plane roughness 1.8 to 2.0 µm).

The dimensions of the primary projections after forming the secondary projections were as follows.

Length $P_1$ and $P_2$ of Diagonal Lines of Primary Projections: $P_1$: 27 µm, $P_2$: 11 µM
  Height H of Primary Projections: 9.5 µm
  Pitch S between Primary Projections: 27 µm
  Pitch $S_1$ between First Virtual Straight Lines: 50 µm
  Pitch $S_2$ between Second Virtual Straight Lines: 24 µm
  Ten-point Average Roughness $Rz_2$: 0.9 to 1.1 µm (plane roughness 1.8 to 2.0 µm)
  Ratio $P_1/S_1$: 0.54

A negative electrode was made and further a battery was made in the same manner as in Example 1-1, except that a current collector made in this example was used. The obtained negative electrode and battery were evaluated in the same manner as in Example 1-1. The results are shown in Table 3.

Example 1-5

In the preparation of the negative electrode current collector, the first step was carried out in the same manner as in Example 1-2. The dimensions of the primary projections immediately after the formation were as follows.

Length $P_1$ and $P_2$ of Diagonal Lines of Primary Projections: $P_1$: 28 µm, $P_2$: 12 µm
  Height H of Primary Projections: 6 µm
  Pitch S between Primary Projections: 20 µm
  Pitch $S_1$ between First Virtual Straight Lines: 38 µm
  Pitch $S_2$ between Second Virtual Straight Lines: 19 µm
  Ten-point Average Roughness $Rz_0$ of Flat Face between Primary Projections: 0.2 µm (plane roughness 1.5 µm)

Afterwards, as the second step, an etching treatment was carried out for the sheet substrate having the primary projections thus made. The sheet substrate was moved below spray devices arranged in a straight line, taking 30 seconds. As a result, projections and recesses were formed on the top of the primary projections, thereby obtaining secondary projections. CZ-8100 (organic acid type) manufactured by Mec Co., Ltd. was used as the etching solution. Table 4 shows the conditions for the etching treatment.

TABLE 4

| Conditions | Solution Temperature (° C.) | Spraying Pressure (MPa) | Etching Time (Sec) | Tacking Strength (kgf/cm$^2$) | Capacity Retention Rate (%) |
|---|---|---|---|---|---|
| A | 25 | 0.2 | 30 | 28.0 | 88 |

Figure 33:
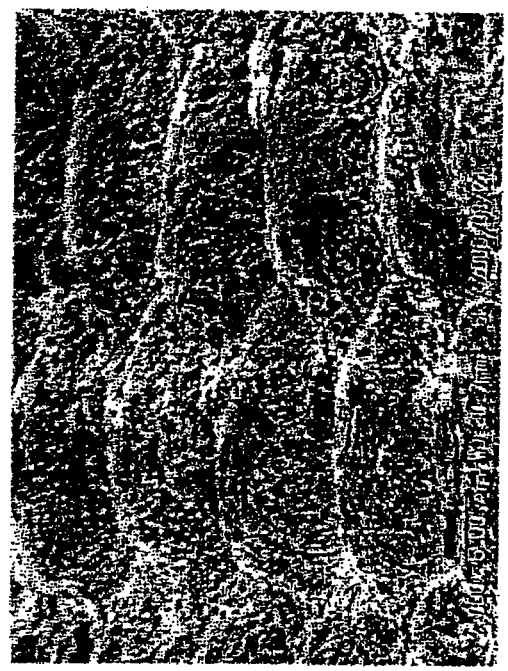
FIG. 33 is an electron micrograph showing a top oblique view of a current collector in Example 1-5.

FIG. 33 is an electron micrograph of the surface of the current collector made in Example 1-5.

The surface roughness (ten-point average height) $Rz_2$ of the top of the primary projections including the secondary projections was 1.8 µm (plane roughness 5.4 µm).

The dimensions of the primary projections after forming the secondary projections were as follows.

Length $P_1$ and $P_2$ of Diagonal Lines of Primary Projections: $P_1$: 26.5 µm, $P_2$: 10.2 µm
  Height H of Primary Projections: 5.2 µm
  Pitch S between Primary Projections: 20 µm
  Pitch $S_1$ between First Virtual Straight Lines: 38 µm
  Pitch $S_2$ between Second Virtual Straight Lines: 19 µm
  Ten-Point Average Roughness $Rz_2$: 1.8 µm (plane roughness 5.4 µm)
  Ratio $P_1/S_1$: 0.70

A negative electrode was made and further a battery was made in the same manner as in Example 1-1, except that the current collector made in this example was used. The obtained negative electrode and battery were evaluated in the same manner as in Example 1-1. The results are shown in Table 4.

Example 1-6

In the preparation of the negative electrode current collector, a roughened copper foil with a surface roughness $Rz_2$ of 3.2 µm (plane roughness 19 µm) and a thickness of 35 µm forming the secondary projections on the flat face thereof in advance was passed between a pair of rollers on each of which substantially diamond-shaped recessed portions were disposed in a regular pattern, thereby forming primary projections. A stainless steel roller was used, and its line pressure was set to 1.0 t/cm. The surface roughness $Rz_0$ of the flat face between the primary projections was 1.5 µm.

Figure 34:
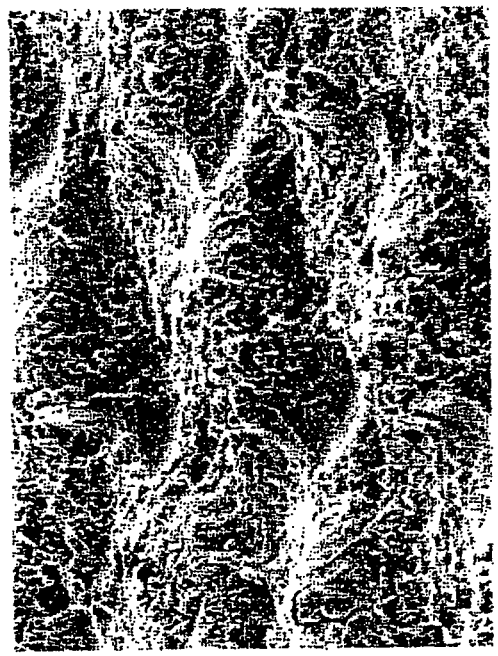
FIG. 34 is an electron micrograph showing a top oblique view of a current collector in Example 1-6.

FIG. 34 is an electron micrograph of an oblique top view of the obtained substrate.

The height of the primary projections was 6 µm, the lengths of two diagonal lines of the substantial diamond were 28 µm and 10 µm, and the pitch (shortest distance between the centers of adjacent primary projections) was 20 µm. The surface roughness (ten-point average height) $Rz_2$ of the top of the primary projections including the secondary projections was 3.2 µm (plane roughness 19 µm). $Rz_2/Rz_0$ was 2.1.

The dimensions of the primary projections and the secondary projections were as follows.

Length $P_1$ and $P_2$ of Diagonal Lines of Primary Projections: $P_1$: 28 µm, $P_2$: 10 µM
  Height H of Primary Projections: 6 µm
  Pitch S between Primary Projections: 20 µm
  Pitch $S_1$ between First Virtual Straight Lines: 38 µm
  Pitch $S_2$ between Second Virtual Straight Lines: 19 µm
  Average Diameter d of Secondary Projections: 2 µm
  Average Height h of Secondary Projections: 2.7 µm
  Average Projection Pitch s of Secondary Projections: 3.1 µm
  Ten-point Average Height $Rz_2$: 3.2 µm (plane roughness 19 µm)
  Arithmetic Average Roughness Ra: 1.8 µm
  Ratio $P_1/S_1$: 0.74

A negative electrode was made and further a battery was made in the same manner as in Example 1-1, except that the current collector made in this example was used. As a result of evaluating the obtained negative electrode and battery in the same manner as in Example 1-1, it was found that the tacking strength of the negative electrode was 28.0 kgf/cm², and the capacity retention rate at the 100th cycle was 90%.

Example 1-7

(i) Current Collector Preparation
First Step
A two-phase plating treatment was carried out for a copper alloy foil as the starting material.

In the first phase, by using a first plating solution having the composition shown in Table 5, plating was carried out under the conditions shown in Table 5, and a particulate precipitate was precipitated on both sides of a copper alloy foil (manufactured by Hitachi Cable, Ltd., Zr amount added 0.02 wt %) with a thickness of 18 µm as the starting material. In the second phase, by using a second plating solution having the composition shown in Table 5, plating was carried out under the conditions shown in Table 5 to form a coating on the surface of the particulate precipitate, thereby obtaining secondary projections. The limiting current density in the first phase was 10 A/dm² when the copper alloy foil was used as the electrode, and the limiting current density in the second phase was 110 A/dm².

TABLE 5

| | | Unit | First Phase | Second Phase |
|---|---|---|---|---|
| Plating Solution Composition | $CuSO_4 \cdot 5H_2O$ Concentration (Copper Ion Concentration) | g/L | 50 (12.7) | 250 (63.6) |
| | $H_2SO_4$ | g/L | 100 | 100 |
| Plating Conditions | Solution Temperature | °C. | 27 | 50 |
| | Current Density | A/dm² | 40 | 20 |
| | Electrodeposition Time | Sec | 60 | 160 |

The copper alloy foil after the second phase was immersed in an ethanol solution containing 3 wt % of 1H-benzotriazole for 15 seconds, washed with water and dried, carrying out a rust preventative treatment.

Second Step
The sheet substrate obtained in the first step was passed between a pair of rollers on which substantially diamond-shaped recessed portions were disposed in a regular pattern. A stainless steel roller was used, and its line pressure was set to 1.0 t/cm. FIG. 35 is an electron micrograph of the surface of the current collector thus made.

After the second step, the height of the substantially diamond-shaped primary projections was 6 µm, the lengths of two diagonal lines of the substantial diamond were 21 µm and 11 µm, and pitch S was 28 µm. The surface roughness (ten-point average height) $Rz_0$ of the flat face between the primary projections was 0.7 µm.

The surface roughness (ten-point average height) $Rz_2$ of the top of the primary projections including the secondary projections was 3 µm (plane roughness 8.8 µm). Therefore, $Rz_2/Rz_0$ was 4.3.

The dimensions of the primary projections and the secondary projections were as follows.
Length $P_1$ and $P_2$ of Diagonal Lines of Primary Projections: $P_1$: 21 µm, $P_2$: 11 µm
Height H of Primary Projections: 6 µm
Pitch S between Primary Projections: 28 µm
Pitch $S_1$ between First Virtual Straight Lines: 50 µm
Pitch $S_2$ between Second Virtual Straight Lines: 24 µm
Ten-point Average Roughness $Rz_0$ of Flat Face between Primary Projections: 0.7 µm
Average Diameter d of Secondary Projections: 1.8 µm
Average Height h of Secondary Projections: 2.5 µm
Average Projection Pitch s of Secondary Projections: 2.6 µm
Ten-point Average Height $Rz_2$: 3 µm (plane roughness 8.8 µm)
Ratio $P_1/S_1$: 0.42

(ii) Negative Electrode Preparation
A negative electrode was obtained by allowing an active material formed of $SiO_{0.5}$ to be carried on both sides of the obtained current collector by a deposition method using an electron beam (EB). A deposition apparatus shown in FIG. 11 and a silicon simple substance target were used, and oxygen was introduced in the chamber of the deposition apparatus.

Figure 36:
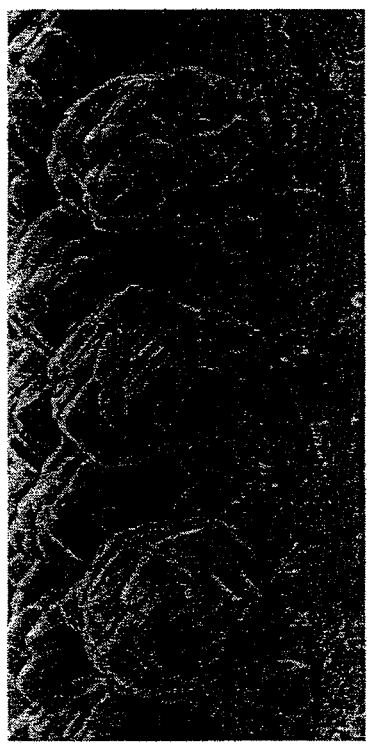
FIG. 36 is an electron micrograph showing a cross-sectional view of a negative electrode plate in Example 1-7.

After carrying out the active material deposition under the following conditions, the current collector was taken out from the pickup roll, set at the feed roll again, and deposition was carried out under the same conditions. This operation was repeated a total of seven times, and an active material layer including columnar particles with six curved portions was obtained. The columnar particles were apparently parallel with respect to the direction normal to the current collector. FIG. 36 is an electron micrograph showing a cross-sectional view of the obtained negative electrode.

The conditions for the deposition were as follows.
Acceleration Voltage of EB Applied to Target: −10 kV
Emission Current: 600 mA
Oxygen Flow Rate: 50 sccm (standard cc/min)
Substrate (Current Collector) Feeding Speed: 14 cm/min
Repeated Times: 7 times A battery was made in the same manner as in Example 1-1, except that the current collector and the negative electrode made in this example were used. As a result of evaluating the obtained negative electrode and battery in the same manner as in Example 1-1, it was found that the tacking strength of the negative electrode was 26.8 kgf/cm², and the capacity retention rate at the 100th cycle was 91%.

Example 1-8

(i) Current Collector Preparation
First Step
A copper alloy foil (manufactured by Hitachi Cable, Ltd., Zr amount added 0.02 wt %) with a thickness of 18 µm as the starting material was passed between a pair of rollers on each of which substantially diamond-shaped recessed portions were disposed in a regular pattern. A stainless steel roller was used, and its line pressure was set to 1.0 t/cm.

After the first step, the height of the substantially diamond-shaped primary projections was 6 µm, the lengths of two diagonal lines of the substantial diamond were 18 µm and 14 µm, and pitch S was 22 µm in the current collector. The surface roughness (ten-point average height) $Rz_0$ of the flat face between the primary projections was 0.4 µm (plane roughness 1.2 µm).

The dimensions of the primary projections immediately after the formation were as follows.
Length $P_1$ and $P_2$ of Diagonal Lines of Primary Projections: $P_1$: 18 µM, $P_2$: 14 µm
Height H of Primary Projections: 6 µm
Pitch S between Primary Projections: 22 µm
Pitch $S_1$ between First Virtual Straight Lines: 40 µm
Pitch $S_2$ between Second Virtual Straight Lines: 20 µm
Ten-point Average Roughness $Rz_0$ of Flat Face between Primary Projections: 0.4 µm (plane roughness 1.2 µm)

A two-phase plating treatment shown below was carried out, as the second step, for the sheet substrate having the primary projections made in the first step.

Second Step

In the first phase, by using a plating solution having the composition shown in Table 6, plating was carried out under the conditions shown in Table 6, and a particulate precipitate was precipitated on both sides of the sheet substrate. In the second phase, by using the plating solution used in the first phase, plating was carried out under the conditions shown in Table 6 to form a coating on the particulate precipitate, thereby obtaining secondary projections.

TABLE 6

| | | Unit | First Phase | Second Phase |
|---|---|---|---|---|
| Plating Solution Composition | $CuSO_4 \cdot 5H_2O$ Concentration (Copper Ion Concentration) | g/L | 250 (63.6) | |
| | $H_2SO_4$ | g/L | 100 | |
| Plating Conditions | Solution Temperature | °C. | 50 | |
| | Potential Relative to Copper | mV | −1950 | −700 |
| | Electrodeposition Time | Sec | 20 | 25 |

The copper alloy foil after the second phase was immersed in an ethanol solution containing 3 wt % of 1H-benzotriazole for 15 seconds, washed with water and dried, carrying out a rust preventative treatment.

The surface roughness (ten-point average height) $Rz_2$ of the top of the primary projections including the secondary projections was 7.2 μm (plane roughness 18.0 μm). Therefore, $Rz_2/Rz_0$ was 18.0 (plane roughness ratio 15.0).

After the formation of the secondary projections (that is, after plating), the dimensions of the primary projections, and the dimensions of the secondary projections were as follows.

Length $P_1$ and $P_2$ of Diagonal Lines of Primary Projections: $P_1$: 21 μm, $P_2$: 17 μm Height H of Primary Projections: 11 μm Pitch S between Primary Projections: 22 μm Pitch $S_1$ between First Virtual Straight Lines: 40 μm Pitch $S_2$ between Second Virtual Straight Lines: 20 μm Average Diameter d of Secondary Projections: 1.9 μm Average Height h of Secondary Projections: 4.6 μm Average Projection Pitch s of Secondary Projections: 2.9 μm Ten-point Average Height $Rz_2$: 7.2 μm (plane roughness 18.0 μm)

Arithmetic Average Roughness Ra: 2.2 μm

Ratio $P_1/S_1$: 0.53

Figure 37:
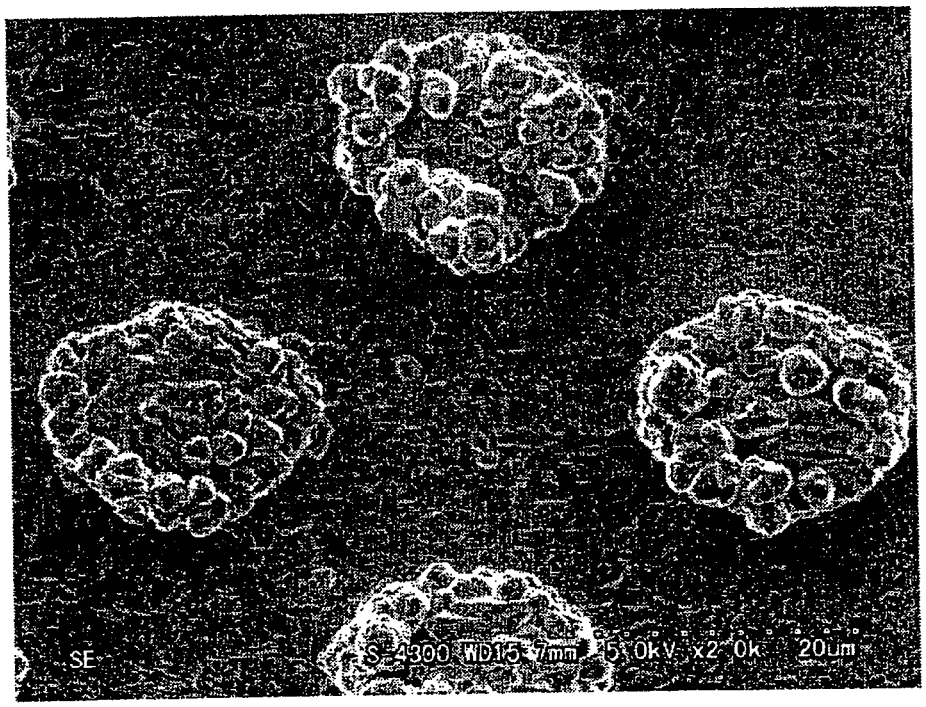
FIG. 37 is an electron micrograph showing a top view of a current collector in Example 1-8.
Figure 38:
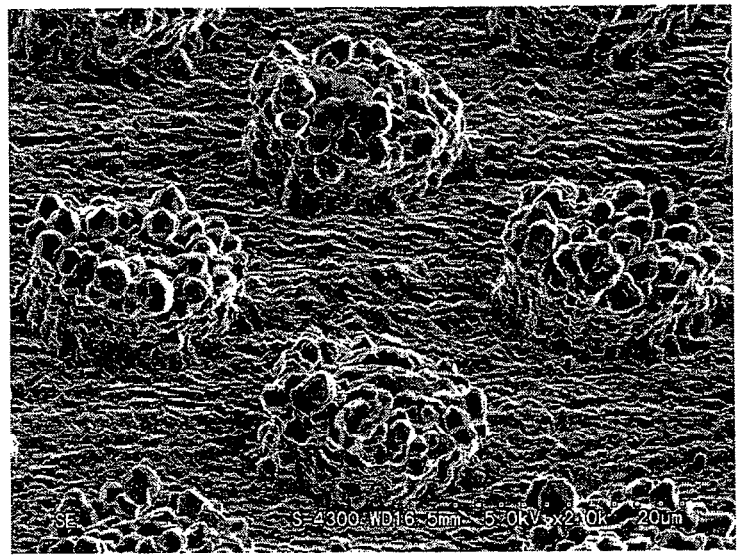
FIG. 38 is an electron micrograph showing a top oblique view of a current collector in Example 1-8.

FIG. 37 is an electron micrograph of the surface of the current collector. FIG. 38 is an electron micrograph of an oblique top view of the current collector. As is clear from FIG. 37, the secondary projections include particulate precipitates formed in a plurality of layers in the direction normal to the current collector. Also, most of their maximum diameters were larger than their root diameters.

A negative electrode was made and further a battery was made in the same manner as in Example 1-7, except that the current collector made in this example was used. As a result of evaluating the obtained negative electrode and battery in the same manner as in Example 1-1, it was found that the tacking strength of the negative electrode was 28.7 $kgf/cm^2$, and the capacity retention rate at the 100th cycle was 93%.

Examples 1-9

First Step

A copper alloy foil (manufactured by Hitachi Cable, Ltd., Zr amount added 0.02 wt %) with a thickness of 18 μm as the starting material was passed between a pair of rollers on each of which substantially diamond-shaped regularly recessed portions that are different from the pattern in Example 1-8 were disposed. A stainless steel roller was used, and its line pressure was set to 1.0 t/cm.

After the first step, the height of the substantially diamond-shaped primary projections was 5 μm, the lengths of two diagonal lines of the substantial diamond were 18 μm and 14 μm, and pitch S was 29 μm in the current collector.

The surface roughness (ten-point average height) $Rz_0$ of the flat face between the primary projections was 0.4 μm (plane roughness 1.3 μm).

The dimensions of the primary projections immediately after the formation were as follows.

Length $P_1$ and $P_2$ of Diagonal Lines of Primary Projections: $P_1$: 18 μm, $P_2$: 14 μm Height H of Primary Projections: 5 μm Pitch S between Primary Projections: 29 μm Pitch $S_1$ between First Virtual Straight Lines: 50 μm Pitch $S_2$ between Second Virtual Straight Lines: 24 μm Ten-point Average Roughness $Rz_0$ of Flat Face between Primary Projections: 0.4 μm (plane roughness 1.3 μm)

A current collector was made in the same manner as in Example 1-8, except that plating was carried out, as the second step, under the conditions shown in Table 7 on the sheet substrate having the primary projections made in the first step.

TABLE 7

| | | Unit | First Phase | Second Phase |
|---|---|---|---|---|
| Plating Solution Composition | $CuSO_4 \cdot 5H_2O$ Concentration (Copper Ion Concentration) | g/L | 250 (63.6) | |
| | $H_2SO_4$ | g/L | 100 | |
| Plating Conditions | Solution Temperature | °C. | 50 | |
| | Potential Relative to Copper | mV | −1750 | −700 |
| | Electrodeposition Time | Sec | 35 | 40 |

The surface roughness (ten-point average height) $Rz_2$ of the top of the primary projections including the secondary projections was 7.9 μm (plane roughness 23.0 μm). Therefore, $Rz_2/Rz_0$ was 19.8 μm (plane roughness ratio 17.6).

The dimensions of the primary projections and the secondary projections after the formation of the secondary projections were as follows.

Length $P_1$ and $P_2$ of Diagonal Lines of Primary Projections: $P_1$: 25 μm, $P_2$: 17 μm Height H of Primary Projections: 12 μm Pitch S between Primary Projections: 29 μm Pitch $S_1$ between First Virtual Straight Lines: 50 μm Pitch $S_2$ between Second Virtual Straight Lines: 24 μm Average Diameter d of Secondary Projections: 4.8 μm Average Height h of Secondary Projections: 6.4 μm Average Projection Pitch s of Secondary Projections: 5.7 µm Ten-point Average Height $Rz_2$: 7.9 µm (plane roughness 23.0 µm)

Arithmetic Average Roughness Ra: 1.8 µm

Ratio $P_1/S_1$: 0.5

Figure 39:
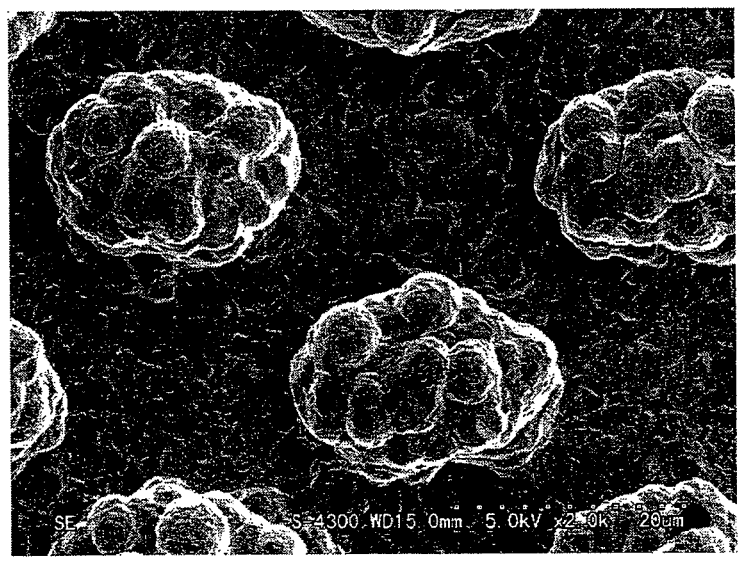
FIG. 39 is an electron micrograph showing a top view of a current collector in Example 1-9.

FIG. 39 is an electron micrograph of the surface of the current collector. As is clear from FIG. 39, the secondary projections include particulate precipitates formed in a plurality of layers in the direction normal to the current collector. Also, most of their maximum diameters were larger than their root diameters.

A negative electrode was made and further a battery was made in the same manner as in Example 1-1, except that the current collector made in this example was used. As a result of evaluating the obtained negative electrode and battery in the same manner as in Example 1-1, it was found that the tacking strength of the negative electrode was 27.4 kgf/cm², and the capacity retention rate at the 100th cycle was 94%.

Example 2-1

(i) Current Collector Formation
Step 1

A negative photoresist was applied onto a rolled copper foil with a thickness of 18 µm, serving as the starting material. Then, the resist on the copper foil was exposed by using a negative mask with a diamond-shaped dot pattern and developed. Then, copper was precipitated in the diamond-shaped grooves thus formed by plating. Afterwards, by removing the resist film, a plurality of diamond-shaped primary projections were formed regularly as shown in FIG. 23 on the base portion.

Height H of the primary projections was 10 µm, lengths $P_1$ and $P_2$ of two diagonal lines were 28 µm and 12 µm, respectively. The surface roughness (ten-point average height) $Rz_1$ of the top of the primary projections was 0.9 µm.

The dimensions of the primary projections immediately after the formation were as follows.

Length $P_1$ and $P_2$ of Diagonal Lines of Primary Projections: $P_1$: 28 µm, $P_2$: 12 µm Height H of Primary Projections: 10 µm Pitch S between Primary Projections: 27 µm Pitch $S_1$ between First Virtual Straight Lines: 50 µm Pitch $S_2$ between Second Virtual Straight Lines: 24 µm Ten-point Average Roughness $Rz_1$ of Top of Primary Projections: 0.9 µm Step 2

Next, a two-phase plating treatment was carried out on a sheet substrate having the primary projections.

First, an aqueous solution (first plating solution) in which 50 g/L of copper sulfate•pentahydrate and 100 g/L of concentrated sulfuric acid were included was prepared. The amount of copper ions contained in the first plating solution was 12.7 g/L. By using the first plating solution and a copper plate as the counter electrode, the rolled copper foil on which the primary projections were formed was plated at a current density of 0.1 A/cm² (that is, 10 A/dm²) at 25° C. for 12 seconds (first plating). In this first plating, copper particles were deposited on the primary projections. The copper foil after the first plating was washed with water.

Next, an aqueous solution (second plating solution) in which 250 g/L of copper sulfate-pentahydrate and 100 g/L of concentrated sulfuric acid were included was prepared. The amount of copper ions contained in the second plating solution was 63.6 g/L. By using the second plating solution and a copper plate as the counter electrode, the copper foil after the first plating was plated at a current density of 0.05 A/cm² (that is, 5 A/dm²) at 50° C. for 40 seconds. In this second plating, a coating (coat plating layer) was formed on the surface of the copper particles, and the copper particles are fixed on the primary projections. The copper foil after the second plating was washed with water.

Step 3

Lastly, the copper foil after the second plating was immersed in an ethanol solution containing 3 wt % of benzotriazole for 15 seconds, carrying out a rust preventative treatment for the copper foil. A negative electrode current collector was thus obtained.

The surface roughness (ten-point average height) $Rz_2$ of the top of the primary projections including the secondary projections was 1.7 µm.

The dimensions of the primary projections and the dimensions of the secondary projections after the formation of the secondary projections (after completion of plating) were as follows.

Length $P_1$ and $P_2$ of Diagonal Lines of Primary Projections: $P_1$: 33 µm, $P_2$: 15 µm Height H of Primary Projections: 14.5 µm Pitch S between Primary Projections: 27 µm Pitch $S_1$ between First Virtual Straight Lines: 50 µm Pitch $S_2$ between Second Virtual Straight Lines: 24 µm Average Diameter d of Secondary Projections: 2.5 µm Average Height h of Secondary Projections: 4.4 µm Average Projection Pitch s of Secondary Projections: 3.4 µm Ten-point Average Roughness $Rz_2$: 1.7 µm Ratio $P_1/S_1$: 0.66

(ii) Negative Electrode Preparation

A negative electrode active material layer was formed on the negative electrode current collector obtained as described above. The formation of the negative electrode active material layer was carried out by using a deposition apparatus (manufactured by ULVAC, Inc.) shown in FIG. 14. Silicon with 99.9999% purity (manufactured by Kojundo Chemical Laboratory Co., Ltd.) was used as the evaporation source. Oxygen gas (manufactured by Air Water Inc) was supplied at a flow rate of 10 sccm between the evaporation source and the current collector from the nozzle.

The negative electrode current collector thus made was fixed on the fixing board, and angle γ formed between the horizontal plane and the fixing board was set to 600.

The acceleration voltage of the electron beam to be applied to the evaporation source was set to −8 kV, and the emission current was set to 250 mA.

Deposition was carried out under the above-described conditions for a predetermined period, thereby forming an active material layer containing columnar particles containing silicon oxide. A negative electrode 2-1 was thus made. The thickness of the negative electrode active material layer was 20 µm.

The amount of oxygen contained in the obtained negative electrode active material was determined by a combustion method. As a result, it was determined that the composition of the negative electrode active material was $SiO_{0.3}$.

The porosity of the negative electrode active material layer was 48%. The porosity in the columnar particles was 4.2%. These porosities were obtained by observing vertical cross-sections of the active material layer with a scanning electron microscope, counting the gap portion and the active material portion from the obtained image data, and calculating the ratio of these. The porosity of the above-described negative electrode active material layer is for a total of the voids in the columnar particles and the gaps between the columnar particles. This also applies to Example 2-2 to 2-5 below.

The maximum diameter of the voids in the columnar particles was 0.5 μm, and the diameter of the columnar particles was 24 μm.

(iii) Battery Preparation

A coin-type battery shown in FIG. 17 was made by using the negative electrode 2-1 and metal lithium as the counter electrode. Although the negative electrode 2-1 functions as the positive electrode in this case because metal lithium was used as the counter electrode, when a counter electrode containing a lithium-containing transition metal oxide such as lithium cobaltate ($LiCoO_2$) as the active material is used, it functions as the negative electrode.

First, metal lithium with a thickness of 300 μm punched out to 15 mmφ was attached to the inner face of a stainless steel (SUS) sealing plate. At this time, no current collector was disposed between the metal lithium and the sealing plate.

A separator was disposed on the metal lithium. A microporous film (manufactured by Asahi Kasei Chemicals Corporation) formed of polyethylene with a thickness of 20 μm was used as the separator. The above-described negative electrode 2-1 formed in a circular shape of 12.5 mmφ was disposed on the separator. Afterwards, a non-aqueous electrolyte was added dropwise thereto. The non-aqueous electrolyte was prepared by dissolving $LiPF_6$ in a 3:5:2 volume ratio solvent mixture of ethylene carbonate, ethylmethyl carbonate, and diethyl carbonate at a concentration of 1.2 mol/L.

A stainless steel plate with a thickness of 100 μm was disposed on the negative electrode 2-1 to adjust the thickness of the electrode assembly, and a stainless steel battery case was disposed thereon. By using a clamping device, the opening end of the battery case was clamped to the sealing plate with a polypropylene insulating packing interposed therebetween, thereby sealing the battery case. A coin-type battery 2-1 was thus made.

Comparative Example 2-1

A comparative negative electrode 2A was made in the same manner as in Example 2-1, except that steps 2 and 3 were not carried out. A comparative battery 2A was made in the same manner as in Example 2-1, except that the comparative negative electrode 2A was used.

The thickness of the active material layer in the comparative negative electrode 2A was 20 μm. The diameter of the columnar particles was 20 μm. The porosity of the negative electrode active material layer was 47.2%.

The dimensions of the primary projections immediately after the formation were as follows.

Length $P_1$ and $P_2$ of Diagonal Lines of Primary Projections: $P_1$: 28 μm, $P_2$: 12 μm
Height H of Primary Projections: 10 μm
Pitch S between Primary Projections: 27 μm
Pitch $S_1$ between First Virtual Straight Lines: 50 μm
Pitch $S_2$ between Second Virtual Straight Lines: 24 μm
Ten-point Average Roughness $Rz_1$ of Top of Primary Projections: 0.9 μm
Ratio $P_1/S_1$: 0.56

[Evaluation]
(Electron Microscope Observation)

Vertical cross-sections of the negative electrode 2-1 and the comparative negative electrode 2A were observed by using a scanning electron microscope (SEM). An electron micrograph of the negative electrode 2-1 is shown in FIG. 40(a), and an electron micrograph of the comparative negative electrode 2A is shown in FIG. 40(b).

As shown in FIG. 40(a), in the negative electrode 2-1, it was confirmed that fine voids and gaps were formed in the columnar particles carried on the primary projections, and at the interface between the columnar particles and the primary projections. On the other hand, in the comparative negative electrode 2A, no voids were formed in the columnar particles carried on the primary projections.

(Charge and Discharge Test)

A charge and discharge test was carried out for the battery 2-1 and the comparative battery 2A by using a charge and discharge device under the following conditions, and the charge capacity at the 1st cycle, the discharge capacity at the 1st cycle, and the charge and discharge efficiency at the 1st cycle were obtained. The value of ratio of the discharge capacity relative to the charge capacity expressed by percentage was regarded as charge and discharge efficiency. The results are shown in Table 8. In Table 8, charge capacity and discharge capacity are shown as a capacity per unit facing area of the metal lithium and the negative electrode.

Constant Current Charge: Charge Electric Current: 0.1 mA, Charge End Voltage: 0 V
Interval after Charge: 30 minutes
Constant Current Discharge: Discharge Electric Current: 0.1 mA,
Discharge End Voltage: 1.5 V Furthermore, the battery 2-1 and the comparative battery 2A after the charge and discharge test were disassembled, and the presence or absence of active material separation and negative electrode deformation were checked visually. The results are shown in Table 8.

TABLE 8

| | Charge Capacity (mAh/cm²) | Discharge Capacity (mAh/cm²) | Charge and Discharge Efficiency (%) | Negative Electrode Deformation | Active Material Separation |
|---|---|---|---|---|---|
| Battery 2-1 | 9.80 | 6.37 | 65 | Absent | Absent |
| Comparative Battery 2A | 7.25 | 1.34 | 19 | Absent | Present |

Table 8 shows that the active material layer of the comparative negative electrode 2A was separated from the current collector after the charge and discharge test in the comparative battery 2A with no voids in the columnar particles. Therefore, the charge and discharge efficiency was particularly low in the comparative battery 2A.

On the other hand, in the battery 2-1, no deformation of the negative electrode 2-1 and active material separation occurred even after the charge and discharge test, and the charge and discharge efficiency was 65%.

Example 2-2

A copper alloy foil with a thickness of 26 μm containing 0.02 wt % of zirconia was used as the base portion instead of the rolled copper foil. A negative electrode 2-2 was made in the same manner as in Example 2-1, except that the same primary projections as in Example 2-1 were formed by using a roll-pressing method instead of plating in step 1. In the roll-pressing, a stainless steel roller on which the diamond-shaped recessed portions of the same pattern as in Example 2-1 were disposed regularly was used. The line pressure of the roller was set to 1.5 t/cm. The thickness of the base portion after the pressing was 20 μm. The height of the primary projections was 6 μm. Pitch $S_1$ and $S_2$ of the primary projections were 42 μm and 28 μm, respectively. The surface roughness $Rz_1$ of the top of the primary projections was 0.2 μm. The surface roughness $Rz_2$ of the top of the primary projections including the secondary projections after the formation of the secondary projections was 3 μm.

The dimensions of the primary projections immediately after the formation were as follows.

Length $P_1$ and $P_2$ of Diagonal Lines of Primary Projections: $P_1$: 28 μm, $P_2$: 12 μm
   Height H of Primary Projections: 6 μm
   Pitch S between Primary Projections: 25 μm
   Pitch $S_1$ between First Virtual Straight Lines: 42 μm
   Pitch $S_2$ between Second Virtual Straight Lines: 28 μm
   Ten-point Average Roughness $Rz_1$ of Top of Primary Projections: 0.2 μm After the formation of the secondary projections, the dimensions of the primary projections and the dimensions of the secondary projections were as follows.

Length $P_1$ and $P_2$ of Diagonal Lines of Primary Projections: $P_1$: 32 μm, $P_2$: 15 μm
   Height H of Primary Projections: 7.2 μm
   Pitch S between Primary Projections: 25 μm
   Pitch $S_1$ between First Virtual Straight Lines: 42 μm
   Pitch $S_2$ between Second Virtual Straight Lines: 28 μm
   Average Diameter d of Secondary Projections: 0.56 μm
   Average Height h of Secondary Projections: 1.1 μm
   Average Projection Pitch s of Secondary Projections: 0.85 μm
   Ten-point Average Roughness $Rz_2$: 3 μm
   Ratio $P_1/S_1$: 0.76

In the negative electrode 2-2, the thickness of the active material layer was 20 μm. The porosity of the active material layer was 49.5%. The porosity in the columnar particles was 4.3%. The maximum diameter of the voids in the columnar particles was 1 μm, and the diameter of the columnar particles was 18 μm.

A battery 2-2 was made in the same manner as in Example 2-1 by using the above-described negative electrode 2-2.

Example 2-3

A negative electrode 2-3 was made in the same manner as in Example 2-2, except that the secondary projections were formed by etching instead of forming the secondary projections by the two-phase plating in step 2. CZ-8100 (manufactured by Mec Co., Ltd.) was used as the etching solution. An etching treatment was carried out by spraying an etching solution with a pressure of 0.2 MPa onto the copper foil, and then washing with pure water. The thickness of the base portion, the height of the primary projections, the pitch between the primary projections, and the surface roughness $Rz_1$ of the top of the primary projections after the pressing were same as in Example 2-2. The surface roughness $RZ_2$ of the top of the primary projections including the secondary projections after the formation of the secondary projections by etching was 1.8 μm.

The dimensions of the primary projections immediately after the formation were as follows.

Length $P_1$ and $P_2$ of Diagonal Lines of Primary Projections: $P_1$: 28 μm, $P_2$: 12 μm
   Height H of Primary Projections: 6 μm
   Pitch S between Primary Projections: 25 μm
   Pitch $S_1$ between First Virtual Straight Lines: 42 μm
   Pitch $S_2$ between Second Virtual Straight Lines: 28 μm
   Ten-point Average Roughness $Rz_1$ of Top of Primary Projections: 0.2 μm The dimensions of the primary projections after forming the secondary projections were as follows.

Length $P_1$ and $P_2$ of Diagonal Lines of Primary Projections: $P_1$: 26.5 μm, $P_2$: 10.2 μm
   Height H of Primary Projections: 5.2 μm
   Pitch S between Primary Projections: 25 μm
   Pitch $S_1$ between First Virtual Straight Lines: 42 μm
   Pitch $S_2$ between Second Virtual Straight Lines: 28 μm
   Ten-point Average Roughness $Rz_2$: 1.8 μm
   Ratio $P_1/S_1$: 0.63

In the negative electrode 2-3, the thickness of the active material layer was 20 μm. The porosity of the active material layer was 48.7%. The porosity in the columnar particles was 1.3%. The maximum diameter of the voids in the columnar particles was 1 μm and the diameter of the columnar particles was 18 μm.

A battery 2-3 was made in the same manner as in Example 2-1 by using the above-described negative electrode 2-3.

Example 2-4

Before forming the primary projections on the current collector, secondary projections were formed in advance.

First, secondary projections were formed on a sheet material (an electrolytic copper foil with a thickness of 18 μm) in the same manner as in step 2 of Example 2-1. Afterwards, primary projections were formed by using the same stainless steel roller as in Example 2-2. Subsequently, a rust preventative treatment was carried out on the copper foil as in step 3 of Example 2-1. In this way, a current collector including the primary projections carrying the secondary projections was obtained.

The thickness of the base portion, the height of the primary projections, and pitch between the primary projections after the pressing were the same as in Example 2-2. The surface roughness $Rz_2$ of the top of the primary projections including the secondary projections was 4.6 μm.

The dimensions of the primary projections, and the dimensions of the secondary projections were as follows.

Length $P_1$ and $P_2$ of Diagonal Lines of Primary Projections: $P_1$: 28 μm, $P_2$: 10 μm
   Height H of Primary Projections: 6 μm
   Pitch S between Primary Projections: 25 μm
   Pitch $S_1$ between First Virtual Straight Lines: 42 μm
   Pitch $S_2$ between Second Virtual Straight Lines: 28 μm
   Average Diameter d of Secondary Projections: 2 μm
   Average Height h of Secondary Projections: 2.7 μm
   Average Projection Pitch of Secondary Projections: 3.1 μm
   Ten-point Average Roughness $Rz_2$: 4.6 μm
   Ratio $P_1/S_1$: 0.67

A negative electrode 2-4 was made in the same manner as in Example 2-1, except that this current collector was used. In the negative electrode 2-4, the thickness of the active material layer was 20 μm. The porosity of the active material layer was 47.6%. The porosity in the columnar particles was 3.5%. The maximum diameter of the voids in the columnar particles was 1.5 μm, and the diameter of the columnar particles was 20 μm.

A battery 2-4 was made in the same manner as in Example 2-1 by using the above-described negative electrode 2-4.

Example 2-5

Active material particles having curved portions were formed by a method as described in the following on a copper alloy foil used in Example 2-2.

First, in the same manner as in Example 2-1, an active material layer of 3 μm was formed by forming a film with the incident angle of the deposition particles fixed at 60° (position A). Afterwards, the copper foil was taken out from the vacuum device, the direction of the copper foil was turned by 180°, and the fixing board of the vacuum device was fixed again (position B), followed by depositing 3 μm of the deposition particles were deposited from the opposite direction at an incident angle of 60°. The deposition was carried out for 7 times by reversing the copper foil by 180°. A negative electrode 2-5 with an active material layer of a total thickness of 21 μm was thus made.

In the negative electrode 2-5, the thickness of the negative electrode active material layer was 21 μm. The porosity of the negative electrode active material layer was 50.2%. The porosity in the columnar particles was 5.2%. The maximum diameter of the voids in the columnar particles was 4 μm, and the diameter of the columnar particles was 24 μm.

A battery 2-5 was made in the same manner as in Example 2-1 by using the above-described negative electrode 2-5.

Comparative Example 2-2

A comparative negative electrode 2B was made in the same manner as in Example 2-2, except that steps 2 and 3 were not carried out.

In the comparative negative electrode 2B, the thickness of the base portion, the height of the primary projections, and the surface roughness $Rz_1$ of the top of the primary projections after the pressing were the same as in Example 2-2. The thickness of the negative electrode active material layer was 20 μm. The porosity of the negative electrode active material layer was 45.6%. The diameter of the columnar particles was 20 μm.

A comparative battery 2B was made by using the above-described comparative negative electrode 2B in the same manner as in Example 2-1.

The dimensions of the primary projections immediately after the formation were as follows.

Length $P_1$ and $P_2$ of Diagonal Lines of Primary Projections: $P_1$: 28 μm, $P_2$: 12 μm Height H of Primary Projections: 6 μm Pitch S between Primary Projections: 25 μm Pitch $S_1$ between First Virtual Straight Lines: 42 μm Pitch $S_2$ between Second Virtual Straight Lines: 28 μm Ten-point Average Roughness $Rz_1$ of Top of Primary Projections: 0.3 μm Ratio $P_1/S_1$: 0.67

[Evaluation]

(Electron Micrograph)

The cross-sectional view of the negative electrodes 2-2 to 2-5 and the comparative negative electrode 2B were observed by using an electron microscope in the same manner as in the above. The obtained electron micrographs are shown in FIG. 41. FIGS. 41 (a), 41(b), 41(c), 41(d), and 41(e) are electron micrographs of cross-sectional views of the negative electrode 2-2, the negative electrode 2-3, the negative electrode 2-4, the negative electrode 2-5, and the comparative negative electrode 2B.

As can be seen in FIG. 41(e), no voids were confirmed in the columnar particles in the comparative negative electrode 2B. On the other hand, in the negative electrodes 2-2 to 2-5, it was confirmed that the voids were formed in the columnar particles especially at the interface with the current collector.

(Charge and Discharge Test)

A charge and discharge test was carried out in the same manner as described above using the batteries 2-2 to 2-5, and the comparative battery 2B. Also, the batteries after the charge and discharge test were disassembled, and the presence or absence of the active material separation from the current collector and the negative electrode deformation were checked visually. The results are shown in Table 9.

TABLE 9

|  | Charge Capacity (mAh/cm²) | Discharge Capacity (mAh/cm²) | Charge and Discharge Efficiency (%) | Negative Electrode Deformation | Active Material Separation |
|---|---|---|---|---|---|
| Battery 2-2 | 8.57 | 6.04 | 70 | Absent | Absent |
| Battery 2-3 | 8.71 | 5.76 | 67 | Absent | Absent |
| Battery 2-4 | 8.53 | 6.03 | 70 | Present | Absent |
| Battery 2-5 | 8.38 | 6.02 | 72 | Absent | Absent |
| Comparative Battery 2B | 7.85 | 2.42 | 31 | Present | Present |

The active material separation occurred in the comparative battery 2B. On the other hand, it was confirmed that no active material separation occurred and charge and discharge efficiency showed high values in the batteries 2-2 to 2-5. Furthermore, no negative electrode deformation was confirmed in the battery 2-2, the battery 2-3, and the battery 2-5 in which the copper alloy foil was used as the current collector. Therefore, a copper alloy foil is further preferably used as the negative electrode current collector.

As described above, it was confirmed that by forming voids in the columnar active material particles and at the interface between the current collector and the active material particles, stress at the time of expansion and contraction of the negative electrode active material particles is eased, and the negative electrode deformation and the active material separation from the current collector can be inhibited.

Example 3-1

(i) Negative Electrode Preparation

Primary projections were formed in the same manner as in Example 2-1. The dimensions of the primary projections immediately after the formation were as follows.

Length $P_1$ and $P_2$ of Diagonal Lines of Primary Projections: $P_1$: 28 μm, $P_2$: 12 μm Height H of Primary Projections: 10 μm Pitch S between Primary Projections: 27 μm Pitch $S_1$ between First Virtual Straight Lines: 50 μm Pitch $S_2$ between Second Virtual Straight Lines: 24 μm Ten-point Average Roughness $Rz_1$ of Top of Primary Projections: 0.9 μm Next, a two-phase plating treatment as described below was carried out for a substrate having the primary projections, thereby roughening the top of the primary projections. Basically, the two-phase plating treatment was carried out in the same manner as in Example 1-1.

In the first phase, by using a first plating solution having the composition shown in Table 10, cathode electrolysis was carried out under the conditions shown in Table 10 at 25° C., and a particulate precipitate was precipitated on the primary projections. In the second phase, by using a second plating solution having the composition shown in Table 10, cathode electrolysis was carried out under the conditions shown in Table 10 at 50° C., thereby forming a coating on the surface of the particulate precipitate.

TABLE 10

| | First Phase | | | | Second Phase | | | | |
| --- | --- | --- | --- | --- | --- | --- | --- | --- | --- |
| | Plating Solution Composition | | Plating Conditions | | Plating Solution Composition | | Plating Conditions | | |
| | Copper Sulfate Concentration ($CuSO_4 \cdot 5H_2O$ Concentration) (g/L) (Copper Ion Concentration (g/L)) | Sulfuric Acid Concentration (g/L) | Current Density ($A/dm^2$) | Electrodeposition Time (s) | Copper Sulfate Concentration ($CuSO_4 \cdot 5H_2O$ Concentration) (g/L) (Copper Ion Concentration (g/L)) | Sulfuric Acid Concentration (g/L) | Current Density ($A/dm^2$) | Electro-deposition Time (s) | Roughening Rate |
| Current Collector 3-1 | 50 (12.7) | 100 | 10 | 6 | 250 (63.6) | 100 | 5 | 12 | 7.0 |
| Current Collector 3-2 | 50 (12.7) | 100 | 10 | 6 | 250 (63.6) | 100 | 5 | 20 | 7.3 |
| Current Collector 3-3 | 100 (25.5) | 100 | 15 | 20 | 250 (63.6) | 100 | 5 | 40 | 7.7 |
| Current Collector 3-4 | 250 (63.6) | 100 | 20 | 40 | 250 (63.6) | 100 | 5 | 80 | 8.5 |
| Current Collector 3-5 | 250 (63.6) | 100 | 20 | 20 | 250 (63.6) | 100 | 5 | 40 | 11.6 |
| Current Collector 3-6 | 150 (38.1) | 100 | 20 | 30 | 250 (63.6) | 100 | 5 | 90 | 13.3 |
| Current Collector 3-7 | 150 (38.1) | 100 | 20 | 30 | 250 (63.6) | 100 | 5 | 60 | 13.9 |

Next, a rust preventative treatment was carried out for the substrate having the secondary projections formed in the same manner as in Example 2-1.

Current collectors 3-1 to 3-7 with a roughening rate of the top of the primary projections of 7 to 13.9 were thus obtained. The roughening rate of the top of the primary projections was determined by using a laser microscope (a super-depth profilometry microscope VK-8500 manufactured by Keyence Corporation) as described above.

Next, a negative electrode active material layer was formed on the current collectors 3-1 to 3-7 in the same manner as in Example 2-1. The thickness of the negative electrode active material layer was set to 22 μm per one side of the current collector.

A silicon simple substance with 99.9999% purity (manufactured by Kojundo Chemical Laboratory Co., Ltd.) was used as the deposition source. The angle formed between the horizontal plane and the fixing board was set to 60°. The acceleration voltage of the electron beam applied to the silicon simple substance deposition source was set to −8 kV, and the emission current was set to 250 mA. The flow rate of oxygen gas was set to 10 sccm.

The amount of oxygen contained in the obtained negative electrode active material layer was determined by a combustion method, to obtain the composition of the negative electrode active material (silicon oxide). As a result, it was determined that the composition of the negative electrode active material was $SiO_{0.3}$.

Negative electrode 3-2 to negative electrode 3-7 were obtained by using the current collector 3-2 to the current collector 3-7 in the same manner as described above.

(ii) Positive Electrode Preparation

A mixture was obtained by mixing 100 parts by weight of lithium cobaltate ($LiCoO_2$) (average particle size 5 μm) and 3 parts by weight of acetylene black (conductive agent). A N-methyl-2-pyrrolidone (NMP) solution of polyvinylidene fluoride (PVdF) as a binder was added to the obtained mixture and kneaded, thereby obtaining a paste positive electrode material mixture. The NMP solution of PVdF was added to the mixture such that 4 parts by weight of PVdF was added.

The obtained positive electrode material mixture was applied on both sides of a positive electrode current collector (thickness 15 μm) of aluminum foil, dried and rolled, thereby obtaining a positive electrode. The thickness of the applied positive electrode material mixture was set to 85 μm per one side of the current collector.

(iii) Battery Assembly

A stack-type battery shown in FIG. 18 was made by using the negative electrode 3-1 and the positive electrode obtained as described above.

The negative electrode 3-1 was cut out to give a size of 15 mm×15 mm, and a nickel negative electrode lead was bonded by spot welding to the side of the negative electrode current collector where the active material layer was not carried. The positive electrode was cut out to give a size of 14.5 mm×14.5 mm, and an aluminum positive electrode lead was spot welded to an exposed portion of the positive electrode current collector provided on the end of the positive electrode. A separator (thickness 16 μm) of a polyethylene microporous film was disposed on both sides of the positive electrode, and on the outside thereof, the negative electrode was disposed so that the positive electrode active material layer and the negative electrode active material layer face each other.

The electrode plate was fixed by a polypropylene adhesive tape so that the stacked electrode plates would not be displaced, thereby obtaining a stack. The obtained stack was placed in a battery case 68 of an aluminum laminate foil (thickness 95 μm, manufactured by Showa Denko Packaging Co., Ltd.). An non-aqueous electrolyte of 1 $cm^3$ was injected in the battery case 68. The non-aqueous electrolyte was prepared by dissolving, at a concentration of 1 mol/L, $LiPF_6$ (manufactured by Mitsubishi Chemical Corporation) in a solvent mixture containing ethylene carbonate, ethyl methyl carbonate, and diethyl carbonate at a volume ratio of 3:5:2.

Then, the opening of the battery case was sealed by heat sealing, thereby obtaining a lithium secondary battery. The obtained battery was used as a battery 3-1.

Batteries 3-2 to 3-7 was obtained in the same manner as described above, except that the negative electrodes 3-2 to 3-7 were used.

Example 3-2

A current collector was made in the same manner as in Example 3-1, except that the surface of the primary projections was roughened by blasting. In the following the conditions for the blast treatment are shown.

Blast Treatment Conditions
Abrasive: alumina, particle size 50 μm
Air Pressure: 0.4 MPa
Treatment Time: 5 sec (current collector 3-8), and 8 sec (current collector 3-9)

A current collector 3-8 with a roughening rate of 2.5, and a current collector 3-9 with a roughening rate of 3.5 were obtained by the blast treatment.

Battery 3-8 and battery 3-9 were made in the same manner as in Example 3-1 by using the current collector 3-8 and the current collector 3-9. The current collector 3-8 and the battery 3-8 are comparative examples.

Comparative Example 3-1

Only primary projections were formed in the same manner as in Example 3-1. The thus obtained current collector was used as a comparative current collector 3A. A comparative battery 3A was obtained in the same manner as in Example 3-1, except that only the comparative current collector 3A was used.

[Evaluation]

The cycle performance of those batteries obtained as described above were evaluated as follows.

(Cycle Performance)

First, the batteries were charged with a constant current and a constant voltage. Specifically, the batteries were charged at a constant current of 15 mA until the battery voltage reached 4.2 V, and afterwards, charged at a constant voltage of 4.2 V until the current value reached 0.75 mA.

After a break of 10 minutes, the charged batteries were discharged at a constant current of 3 mA, until the battery voltage decreased to 2.0 V.

The above-described charge and discharge cycle was repeated a total of 50 times. A 10 minutes break was given between each charge and discharge cycle.

The capacity deterioration rate (%) after 50 cycles is shown in Table 11. The capacity deterioration rate (%) was determined by the formula:

100−{[(discharge capacity at 50th cycle)/(discharge capacity at 1st cycle)]×100}.

Also, the relationships between the roughening rate and the capacity deterioration rate after 50 cycles are as shown in FIG. 42.

TABLE 11

| | Roughening Method | Roughening Rate | Capacity Deterioration Rate (%) after 50 Cycles |
|---|---|---|---|
| Battery 3-1 | Plating | 7.0 | 5.3 |
| Battery 3-2 | Plating | 7.3 | 6.3 |
| Battery 3-3 | Plating | 7.7 | 3.9 |
| Battery 3-4 | Plating | 8.5 | 11.1 |
| Battery 3-5 | Plating | 11.6 | 1.8 |
| Battery 3-6 | Plating | 13.3 | 7.3 |
| Battery 3-7 | Plating | 13.9 | 7.6 |
| Comparative Battery 3-8 | Wet Blast | 2.5 | 85 |
| Battery 3-9 | Wet Blast | 3.2 | 11.4 |
| Comparative Battery 3A | — | 1.1 | 77 |

Table 11 and FIG. 42 show that the capacity deterioration rate after 50 cycles shows excellent values, i.e., about 10% or less when using a current collector with a roughening rate of 3.2 or more of the top of the primary projections. On the other hand, when the current collector with a roughening rate of the primary projections of 2.5 or less was used, the capacity deterioration rate was 77% or more, and cycle performance notably declined.

Furthermore, the batteries were disassembled after the cycle test and the negative electrode was observed visually. As a result, in the case of a current collector with a roughening rate of 3.2 or more, almost no separation of the active material layer from the current collector was observed. On the other hand, in the case of a current collector with a roughening rate of 2.5 or less, the separation of the active material layer from the current collector was observed, and the current collector surface was exposed in most of the batteries.

When using a current collector with a roughening rate of 20 or more, the shape of the top of the primary projections becomes very bulky, and the ratio of thickness of the current collector relative to the active material layer may become large. Thus, the battery energy density may become small. Furthermore, in the case where the grooves on the surface of the primary projections become fine, when depositing the active material precursor or the active material on the surface of the current collector, the active material precursor or the active material may not enter into the grooves easily. Therefore, the high roughening rate may not be used effectively. Thus, a current collector with the roughening rate of the primary projections of more than 20 is not appropriate for practical use.

Industrial Applicability

The present invention can be applied to various batteries, but preferably applied to lithium secondary batteries. An electrode and a current collector of the present invention are especially suitable for a negative electrode and a current collector for negative electrodes in lithium secondary battery. According to the present invention, even when a high capacity active material that undergoes a large expansion at the time of lithium ion absorption is used, the active material separation from the current collector can be inhibited, and therefore battery reliability improves. A battery of the present invention including the above-described electrode may be used for, for example, a power source of a personal digital assistants, mobile electronic devices, small household electrical energy storage devices, motorcycles, electric cars, and hybrid electric vehicles, but its application is not particularly limited.

The invention claimed is:

1. A current collector for an electrode, comprising:
   a base portion;
   a plurality of primary projections projecting from the base portion, each of the plurality of primary projections having a top surface and a side surface connecting the top surface and the base portion and being connected to the base portion from each of bottom surfaces of the plurality of primary projections; and a plurality of secondary projections projecting from the top surface of each of the plurality primary projections, wherein:

each of the plurality of primary projections has a cylindrical shape of which base shape is circular ellipsoidal or polygonal, the plurality of primary projections are disposed, in a matrix pattern on the base portion in a plan view:
at intersection points of a grid having a first pitch in a first direction and a second pitch in a second direction perpendicular to the first direction, the second pitch being smaller than the first pitch; and
at the center of the grid, and the plurality of primary projections are made of a material having a same composition as the base portion.

2. The current collector for an electrode in accordance with claim 1, wherein:
a height and a diameter of each of the plurality of secondary projections are smaller than a height and a diameter of the plurality of primary projections.

3. The current collector for an electrode in accordance with claim 1, wherein a height of the primary projections is 3 to 15 μm.

4. The current collector for an electrode in accordance with claim 1, wherein a surface roughness $Rz_2$ of the top surface of the plurality of primary projections including the plurality of secondary projections is 0.9 to 9 μm.

5. The current collector for an electrode in accordance with claim 1, wherein a surface roughness $Rz_2$ of the top surface of each of the plurality of primary projections including the plurality of secondary projections is 1.3 times or more surface roughness $Rz_0$ of a flat face of the base portion.

6. The current collector for an electrode in accordance with claim 1, wherein:
a diameter of the plurality of primary projections is 1.3 times or more a diameter of the plurality of secondary projections.

7. The current collector for an electrode in accordance with claim 1, wherein a maximum diameter of the plurality secondary projections is larger than a root diameter of the plurality of secondary projections.

8. The current collector for an electrode in accordance with claim 1, wherein the plurality of secondary projections include a plurality of particulate precipitates.

9. The current collector for an electrode in accordance with claim 8, wherein the particulate precipitates are formed in a plurality of layers in the direction normal to the current collector.

10. The current collector for an electrode in accordance with claim 1, wherein the base portion comprises a copper alloy foil.

11. The current collector for an electrode in accordance with claim 1, wherein:
the base portion extends in a longitudinal direction, and either one of the first direction and the second direction is parallel to the longitudinal direction of the base portion.

12. The current collector for an electrode in accordance with claim 11, wherein the first direction is parallel to the longitudinal direction.

13. The current collector for an electrode in accordance with claim 11, wherein a maximum dimension of the plurality of primary projections in the width direction of the base portion is ½ or more of the first pitch.

14. An electrode comprising the current collector for an electrode in accordance with claim 1, and an active material layer carried on the current collector.

15. The electrode in accordance with claim 14, wherein the active material layer includes a plurality of columnar particles each disposed at least on the plurality of secondary projections of each of the plurality of primary projections.

16. The electrode in accordance with claim 15, wherein the columnar particles are tilted with respect to the direction normal to the current collector.

17. The electrode in accordance with claim 15, wherein the columnar particles include a stack of a plurality of grain layers that are tilted with respect to the direction normal to the current collector.

18. The electrode in accordance with claim 15, wherein the columnar particles are bonded to the plurality of primary projections.

19. An electrode comprising:
a current collector; and
an active material layer carried on the current collector, wherein the current collector includes:
a base portion;
primary projections projecting from the base portion, each of the primary projections having a top surface and a side surface connecting the top surface and the base portion and being connected to the base portion from each of bottom surfaces of the plurality of primary projections; and
secondary projections projecting from the top surface of each of the primary Projections,
wherein each of the plurality of primary projections has a cylindrical shape of which base shape is circular, ellipsoidal or polygonal,
the plurality of primary projections are disposed, in a matrix pattern on the base portion in a plan view:
at intersection points of a grid having a first pitch in a first direction and a second pitch in a second direction perpendicular to the first direction, the second pitch being smaller than the first pitch; and
at the center of the grid,
wherein the active material layer includes columnar particles each carried on the top surface of each of the primary projections,
wherein a void exists between the top surface of each of the primary projections and each of the columnar particles and exists inside each of the columnar particles, and
wherein the plurality of primary projections are made of a material having a same composition as the base portion.

20. The electrode in accordance with claim 19, wherein each of primary projections carries only one columnar particle.

21. The electrode in accordance with claim 19, wherein the top surface of the primary projections has a surface roughness $Rz_2$ of 1 to 7 μm.

22. The electrode in accordance with claim 19, wherein in the active material layer, gaps are present between the columnar particles.

23. The electrode in accordance with claim 19, wherein a porosity of the active material layer is 10% or more and below 70%.

24. The electrode in accordance with claim 14, wherein the active material layer includes a material including silicon element.

25. The electrode in accordance with claim 24, wherein the material including silicon element includes at least one selected from the group consisting of a silicon simple substance, a silicon alloy, a compound containing silicon and oxygen, and a compound containing silicon and nitrogen.

26. A battery including the electrode in accordance with claim 14, a counter electrode of the electrode, and an electrolyte.

27. The current collector of claim 1, wherein the plurality of secondary projections are formed by a different process from a process forming the plurality of primary projections.

28. The current collector of claim 1, wherein three or more of the plurality of secondary projections project from the top surface of each of the plurality of primary projections.

29. The current collector of claim 1, wherein an area of the top surface is larger than a bottom area of each of the plurality of secondary projections.

30. The electrode in accordance with claim 19, wherein each of the primary projection is integrally formed with the base portion.

31. The current collector of claim 1, wherein the base portion and the plurality of primary projections are formed by roll-pressing a base material.

32. The electrode of claim 19, wherein the base portion and the primary projections are formed by roll-pressing a sheet material.

33. The current collector of claim 1, wherein each of the plurality of primary projections is integrally formed with the base portion.

34. The current collector of claim 1, wherein each of the plurality of primary projections has a cylindrical shape of which base shape is polygonal with rounded corners.

35. The electrode of claim 19, wherein each of the plurality of primary projections has a cylindrical shape of which base shape is polygonal with rounded corners.

* * * * *